(12) United States Patent
Izumi et al.

(10) Patent No.: US 8,004,404 B2
(45) Date of Patent: Aug. 23, 2011

(54) INFORMATION STORAGE DEVICE, INFORMATION STORAGE PROGRAM, VERIFICATION DEVICE AND INFORMATION STORAGE METHOD

(75) Inventors: Yukio Izumi, Tokyo (JP); Keiki Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 594 days.

(21) Appl. No.: 11/989,699

(22) PCT Filed: Aug. 3, 2006

(86) PCT No.: PCT/JP2006/315427
§ 371 (c)(1),
(2), (4) Date: Jan. 30, 2008

(87) PCT Pub. No.: WO2007/023657
PCT Pub. Date: Mar. 1, 2007

(65) Prior Publication Data
US 2009/0033510 A1    Feb. 5, 2009

(30) Foreign Application Priority Data
Aug. 26, 2005   (JP) .................. 2005-246253

(51) Int. Cl.
G08B 21/00 (2006.01)
(52) U.S. Cl. .................. 340/540; 340/539.26
(58) Field of Classification Search ............. 340/539.22, 340/539.26–539.28, 540, 584, 601, 602, 340/545.1, 545.6; 705/4, 13
See application file for complete search history.

(56) References Cited

U.S. PATENT DOCUMENTS

| | | | |
|---|---|---|---|
| 5,797,134 | A | 8/1998 | McMillan et al. |
| 6,064,970 | A | 5/2000 | McMillan et al. |
| 2002/0023223 | A1 | 2/2002 | Schmidt et al. |
| 2002/0178033 | A1 | 11/2002 | Yoshioka et al. |
| 2003/0018905 | A1 | 1/2003 | Schneider et al. |
| 2005/0173523 | A1 | 8/2005 | Yushio et al. |

FOREIGN PATENT DOCUMENTS

| | | |
|---|---|---|
| JP | 63-150800 A | 6/1988 |
| JP | 9-102088 A | 4/1997 |
| JP | 11-348647 A | 12/1999 |
| JP | 2001-255953 A | 9/2001 |
| JP | 2002-7718 A | 1/2002 |

(Continued)

OTHER PUBLICATIONS

Full English language machine-generated translation for JP-2003-168006-A.

Primary Examiner — Thomas J Mullen
(74) Attorney, Agent, or Firm — Birch, Stewart, Kolasch & Birch, LLP.

(57) ABSTRACT

An information storage device which can record highly reliable information is provided. The moving object information storage device 3 is an information storage device equipped in a moving object 1, and includes: a moving object information storage unit 32 storing moving object information based on information detected by sensors which detect information related to the moving object 1; a tamper preventing unit 20 obtaining specifying information which can specify the moving object 1, and generating integrity information to be used for verifying if at least either the specifying information or the moving object information is tampered or not based on the obtained specifying information and the moving object information stored in the moving object information storage unit 32; and an integrity information storage unit 33 storing the integrity information generated by the tamper preventing unit 20.

26 Claims, 55 Drawing Sheets

FOREIGN PATENT DOCUMENTS

| | | |
|---|---|---|
| JP | 2002-183456 A | 6/2002 |
| JP | 2002-279298 A | 9/2002 |
| JP | 2002-297910 A | 10/2002 |
| JP | 2002-358425 A | 12/2002 |
| JP | 2002-373258 A | 12/2002 |
| JP | 2003-21536 A | 1/2003 |
| JP | 2003-22218 A | 1/2003 |
| JP | 2003-168006 A | 6/2003 |
| JP | 2004-145489 A | 5/2004 |
| JP | 2004-237814 A | 8/2004 |
| JP | 2004-318370 A | 11/2004 |
| JP | 2004-338607 A | 12/2004 |
| JP | 2004-352128 A | 12/2004 |

| | MOVING OBJECT INFORMATION X (VELOCITY) | MOVING OBJECT INFORMATION Y (TRAVEL DISTANCE) | MOVING OBJECT INFORMATION Z (NUMBER OF REVOLUTIONS OF ENGINE) |
|---|---|---|---|
| SERVICE A | 1 | 1 | 0 |
| SERVICE B | 1 | 0 | 1 |

1402

INFORMATION STORAGE DEVICE, INFORMATION STORAGE PROGRAM, VERIFICATION DEVICE AND INFORMATION STORAGE METHOD

TECHNICAL FIELD

The present invention relates to an information storage device, an information storage program, and an information storage method for collecting and storing information detected by sensors, and a verification device for verifying the correctness of the information.

The present invention relates to, for example, an information storage device for collecting and storing moving object information related to moving status of a moving object.

Further, the present invention relates to an environment information storage device for collecting and storing environment information, that is, information related to environment such as temperature, humidity, illuminance, time, location, tilt, weight, yawing, sound, wind force, impurity rate, opening/closing of a door or a cover, etc. of the transportation or storage of an object such as food (vegetables, fish, wine, etc.), animals (a racehorse or a fighting dog, etc.), breakables, medicals, photos, arts, antiques, official documents (paper documents or testament, etc.), garbage, etc. and an environment information guaranteeing system for processing these information.

BACKGROUND ART

Conventionally, amount of automobile tax has been determined based on a type, a use, engine displacement, etc. Recently, the amount of automobile tax is changed according to performance of emission gas or fuel cost. This is not determined by driving status, but it can be said it is determined by the specification of an automobile used. For example, if an automobile is good fuel cost performance, the automobile tax is favorable even if a driver does aggressive driving such as sudden starting, sudden stopping, etc. Further, automobile insurance is also determined by a type and a use, an age of a driver, traffic accident history, a travel distance, etc. of an automobile. In the case of automobile insurance, insurance premium may be low when a driver has not caused any traffic accident even if the driver drives aggressively; a method for calculating insurance premium does not match the driving status showing how the driver actually drives.

To solve the above problems, there are some solutions/inventions have been provided.

JP2004-145489 (Patent Document 1) discloses a system related to a method for determining automobile insurance premium. In the system disclosed by the above Patent Document 1, it is assumed that a traffic accident rate is low in the case of a highly safe automobile of which tire pressure, etc. is frequently managed or an owner of the automobile, so that the insurance premium is reduced. Namely, the system includes an in-vehicle device having a vehicle status analyzing unit obtaining time-sequential information related to tire pressure of an automobile and a communication device to send the information obtained by the vehicle status analyzing unit to the outside, and a central unit having a vehicle management status diagnosing unit evaluating tire pressure management status of the automobile based on the received information and an insurance premium calculating unit calculating insurance premium and/or insurance of the automobile insurance based on an evaluated result by the vehicle management status diagnosing unit. By this, information such as tire pressure, etc. is sent to a server of an insurance company through the Internet, the vehicle management status is diagnosed based on the received information, and the insurance premium is calculated such that the insurance premium is reduced for an owner of the automobile of which traffic accident rate is low.

Further, JP2002-279298 (Patent Document 2) shows a method, as a business method based on vehicle history information, to record vehicle history information such as driving history or maintenance history of a vehicle together with personal information in a storage medium provided at the vehicle and to set insurance premium using this information at the time of automobile inspection/maintenance, or contracting/updating an insurance policy. This document describes an example of using storage medium having a data protecting function which disables a user side to tamper with driving history of an automobile which is processed by an in-vehicle management computer from various sensor information. Further, JP2002-183456 (Patent Document 3) discloses an example of protecting by encryption or password in order to prevent people outside the insurance company from decoding the contents of the record, that is, to maintain the confidentiality of the contents of the record in a driving evaluation device calculating driving evaluation result based on driving status information of an automobile obtained, position information by GPS (Global Positioning System), map information, traffic regulation information and recording the calculated result.

However, according to the conventional system, an owner of the automobile can modify the in-vehicle device and send fake information to an insurance company. Namely, there is a problem that it is possible to get low insurance premium by pretending to frequently manage air pressure of a tire, etc., though the owner actually does not, or by sending information of another automobile.

Further, information may be tampered during communication, that is, the integrity of the information cannot be maintained, and thus there is another problem that the reliability may lack, that is, the information actually used by the insurance company cannot be reliable.

Further, there is another problem that it is impossible for the insurance company, etc. to detect tampering with the received information when the information is tampered during communication or when the information recorded in the in-vehicle device is tampered. This problem occurs regardless of encryption of the information. Namely, although the encryption can maintain the confidentiality of the information, the integrity cannot be maintained, since the tampering cannot be detected.

Further, conventionally, a requesting person who requests transportation or storage of an object (a requesting person, hereinafter) trusts a dealer to carry out transportation or storage (a dealer, hereinafter) and requests the transportation or storage. For example, when fresh fish is transported from the fish market to a marketplace, a requesting person who requests the transportation at the fish market cannot know the environment of fish during the transportation, that is, if the temperature, humidity, etc. are kept so as to keep the fresh status. Further, a person (a user, hereinafter) who receives an object such as a restaurant which uses fish cannot confirm the fresh status of the transported fish, either, but the fresh status is grasped by confirming with eye-observation based on experience.

Further, in the case of storing an object in a rental warehouse, a user (sometimes the same as a requesting person) estimates the status of the object during the storage by measuring or comparing the statuses at the time of putting in/out the object to be stored.

Further, JP11-348647 related to a driving management device of an insulated truck describes an invention to reduce the load of the driver by sending/managing temperature information detected by a temperature sensor in the insulated truck to an office from the vehicle, and further describes that the information of the temperature sensor is recorded in a memory card provided at the vehicle, which enables to certify afterwards the record during the driving.

According to these known systems, there is no way, but to trust the dealer, for a requesting person or a user to confirm the environment during the transportation or storage. Further, there is a problem that the dealer can tamper with the environment information recorded in recording medium such as a memory card and submit tampered fake information which is convenient to the dealer to the requesting person or the user, which makes the information appear to have no problem.

Patent Document 1: JP2004-145489
Patent Document 2: JP2002-279298
Patent Document 3: JP2002-183456
Patent Document 4: JP2002-7718
Patent Document 5: JP2002-373258
Patent Document 6: JP2002-297910
Patent Document 7: JP11-348647

SUMMARY OF THE INVENTION

The present invention aims to provide a moving object information storage device which can record highly reliable moving object information of a moving object. Further, it aims to provide a moving object information verification device and a system which enables a service provider who provides a user with service related to insurance, tax, traffic offense, etc. to securely use the moving object information recorded by the moving object information storage device and to detect whether or not the moving object information has been tampered with.

Further, the present invention aims to provide a highly reliable environment information storage device or an environment information guaranteeing system which can record information related to the environment of the object during the transportation or storage and of which the information can be confirmed by a requesting person or a user.

According to the present invention, an information storage device equipped in a moving object and storing information related to the moving object includes: a sensor information storage unit storing sensor information based on information detected by a sensor which detects information related to the moving object; a tamper verifying information generating unit obtaining specifying information which can specify the moving object, and based on the specifying information obtained and the sensor information stored by the sensor information storage unit, generating tamper verifying information used for verifying if at least either the specifying information or the sensor information is tampered or not; and a tamper verifying information storage unit storing the tamper verifying information generated by the tamper verifying information generating unit.

The information storage device further includes: a device-side specifying information storage unit storing the specifying information as device-side specifying information, and the tamper verifying information generating unit obtains the device-side specifying information stored by the device-side specifying information storage unit.

The moving object includes a moving-object-side specifying information storage unit storing the specifying information as moving-object-side specifying information, and the tamper verifying information generating unit obtains the moving-object-side specifying information stored by the moving-object-side specifying information storage unit.

The information storage device further includes a separation detecting unit detecting if the information storage device itself is separated from the moving object.

The information storage device further includes a moving object judging unit judging if the equipped moving object which is the moving object in which the information storage device itself is equipped is an appointed moving object which is previously appointed to equip or not.

The information storage device further includes an information deleting unit deleting the sensor information stored by the sensor information storage unit when the moving object judging unit judges the equipped moving object is not the appointed moving object.

The equipped moving object includes a moving-object-side specifying information storage unit storing moving-object-side specifying information which can specify the moving object itself, the information storage device further comprises a device-side specifying information storage unit storing device-side specifying information which can specify the specified moving object, and the moving object judging unit inputs the device-side specifying information stored by the device-side specifying information storage unit and the moving-object-side specifying information stored by the moving-object-side specifying information storage unit, and judges if the equipped moving object is the specified moving object based on the device-side specifying information and the moving-object-side specifying information.

The tamper verifying information generating unit, when the moving object judging unit judges that the equipped moving object is the appointed moving object, selects as an object to be selected and obtains either the device-side specifying information or the moving-object-side specifying information inputted by the moving object judging unit, and generates tamper verifying information used for verifying if at least either the object to be selected or the sensor information is tampered or not based on the object to be selected obtained and the sensor information stored by the sensor information storage unit.

The equipped moving object includes a moving-object-side authenticating unit receiving an authenticating request by communication and performing authentication process based on a prescribed rule, and the moving object judging unit sends the authenticating request to the moving-object-side authenticating unit, and judges if the equipped moving object is the appointed moving object or not by performing authentication process with the moving-object-side authenticating unit based on the prescribed rule.

The information storage device further includes a sensor confirming unit confirming if the sensor is correct.

According to the present invention, an information storage device equipped in a moving object and storing information related to the moving object includes: a selecting unit inputting respective sensor information based on respective information detected respectively by a plurality of sensors which detects information related to the moving object, and selecting at least one sensor information out of the respective sensor information based on a prescribed condition; a selected information group storage unit storing a selected information group showing a group composed of the sensor information selected by the selecting unit; a tamper verifying information generating unit obtaining specifying information which can specify the moving object, and based on the specifying information obtained and the selected information group stored by the selected information group storage unit, generating tamper verifying information used for verifying if at least either the specifying information or the sensor information included in the selected information group is tampered or not; and a tamper verifying information storage unit for storing the tamper verifying information generated by the tamper verifying information generating unit.

According to the present invention, an information storage device equipped in a moving object and storing information related to the moving object includes: a sensor information storage unit storing respective sensor information based on respective information detected respectively by a plurality of sensors which detects information related to the moving object; a selecting unit selecting at least one sensor information out of the respective sensor information stored by the sensor information storage unit based on a prescribed condition; a tamper verifying information generating unit obtaining specifying information which can specify the moving object, and based on the specifying information obtained and the selected information group showing a group composed of the sensor information selected by the selecting unit, generating tamper verifying information used for verifying if at least either the specifying information or the sensor information included in the selected information group is tampered or not; and a tamper verifying information storage unit for storing the tamper verifying information generated by the tamper verifying information generating unit.

The information storage device further includes: a condition judging unit inputting the sensor information, judging if the sensor information inputted matches prescribed condition or not, and if it is judged to match the condition, storing the sensor information inputted in the sensor information storage.

The information storage device further includes: an outputting unit for outputting the sensor information stored by the sensor information storage unit, the specifying information obtained by the tamper verifying information generating unit, and the tamper verifying information stored by the tamper verifying information storage unit.

The outputting unit comprises an outputting destination authenticating unit authenticating if an outputting destination is an appointed device which is previously appointed or not when the sensor information, the specifying information, and the tamper verifying information are outputted.

The outputting unit outputs the sensor information, the specifying information, and the tamper verifying information to a portable storage medium which is portable as well as capable of storing information.

The outputting unit outputs the sensor information, the specifying information, and the tamper verifying information at a predetermined interval.

The information storage device further includes: a commanding unit receiving an operation by an operator, and based on the operation received, commanding an output to the outputting unit, and the outputting unit, when the commanding unit commands the output, outputs the sensor information, the specifying information, and the tamper verifying information.

The information storage device further includes: an operator authenticating unit authenticating if the operator is correct based on the operation by the operator received by the commanding unit, and the commanding unit, when the operator is authenticated to be correct by the operator authenticating unit, commands the output to the outputting unit.

According to the present invention, an information storage program has an information storage device which is a computer equipped in a moving object and storing information related to the moving object execute the following processes:

(1) a process to store sensor information based on information detected by a sensor which detects information related to the moving object;
(2) a process to obtain specifying information which can specify the moving object, and based on the specifying information obtained and the sensor information stored, to generate tamper verifying information used for verifying if at least either the specifying information or the sensor information is tampered or not; and
(3) a process to store the tamper verifying information generated.

According to the present invention, an information storage device includes: an information inputting unit inputting information detected by a sensor from the sensor which detects information; a sensor information storage unit storing sensor information based on the information inputted from the sensor by the information inputting unit; a tamper verifying information generating unit, based on the sensor information stored by the sensor information storage unit, generating tamper verifying information used for verifying if the sensor information is tampered or not; and a tamper verifying information storage unit storing the tamper verifying information generated by the tamper verifying information generating unit.

The information storage device further includes: a device-side specifying information storage unit storing predetermined information, and the tamper verifying information generating unit, based on the sensor information stored by the sensor information storage unit and the predetermined information stored by the device-side specifying information storage unit, generates tamper verifying information used for verifying if at least either the predetermined information or the sensor information is tampered or not.

The sensor detects information related to an environment in which the sensor itself is provided, and the device-side specifying information storage unit stores specifying information which can specify at least either the environment in which the sensor is provided or a place in which the environment information storage device which is the information storage device itself is provided.

The information storage device further includes: an existence detecting unit detecting if a predetermined object is continuously placed in the environment in which the sensor is provided or not, and the tamper verifying information generating unit, based on the sensor information stored by the sensor information storage unit and detected result detected by the existence detecting unit, generates tamper verifying information used for verifying if at least either the sensor information or the detected result is tampered or not.

The information storage device further includes: an outputting unit outputting the sensor information stored by the sensor information storage unit, the predetermined information stored by the device-side specifying information storage unit, and the tamper verifying information stored by the tamper verifying information storage unit to another device.

The outputting unit includes an outputting destination authenticating unit authenticating the another device when the sensor information, the predetermined information, and the tamper verifying information are outputted.

The information storage device further includes: a sensor confirming unit confirming if the sensor is correct or not.

The information storage device further includes: an external interface unit inputting predetermined information from a storage equipment storing the predetermined information; and a storage control unit authenticating if the storage equipment is correct or not by communicating with the storage equipment when the predetermined information is inputted from the storage equipment by the external interface unit, and if it is judged to be correct, storing the predetermined information in the device-side specifying information storage unit.

The information storage device further includes: an external interface unit inputting predetermined information from a storage equipment storing the predetermined information; and a storage control unit authenticating if the predetermined information inputted by the external interface unit is correct or not, and if it is judged to be correct, storing the predetermined information in the device-side specifying information storage unit.

According to the present invention, a verification device includes: a verifying unit inputting sensor information and tamper verifying information outputted by an information storage device, and verifying correctness of the sensor information using the sensor information and the tamper verifying information inputted, the information storage device includes: an information inputting unit inputting information detected by a sensor from the sensor which detects information; a sensor information storage unit storing sensor information based on the information inputted from the sensor by the information inputting unit; a tamper verifying information generating unit, based on the sensor information stored by the sensor information storage unit, generating tamper verifying information used for verifying if the sensor information is tampered or not; a tamper verifying information storage unit storing the tamper verifying information generated by the tamper verifying information generating unit; and an outputting unit outputting the sensor information stored by the sensor information storage unit and the tamper verifying information stored by the tamper verifying information storage unit.

According to the present invention, an information storage method performed by an information storage device which is a computer, the method includes: by an information inputting unit, inputting information detected by a sensor from the sensor which detects information; by a sensor information storage unit, storing sensor information based on the information inputted from the sensor by the information inputting unit; by a tamper verifying information generating unit, based on the sensor information stored by the sensor information storage unit, generating tamper verifying information used for verifying if the sensor information is tampered or not; and by a tamper verifying information storage unit, storing the tamper verifying information generated by the tamper verifying information generating unit.

According to the present invention, an information storage program has a computer execute the following processes:
(1) a process to input information detected by a sensor from the sensor which detects information;
(2) a process to store sensor information based on the information inputted from the sensor;
(3) a process, based on the sensor information stored, to generate tamper verifying information used for verifying if the sensor information is tampered or not; and
(4) a process to store the tamper verifying information generated.

Effect of the Invention

The present invention can provide a moving object information storage device of which relationship with a moving object is clear and which can record highly reliable moving object information against tampering.

DETAILED DESCRIPTION OF THE INVENTION

Referring to FIGS. 1 through 4, the first embodiment will be explained. The first embodiment relates to a moving object information storage device (an information storage device) storing moving object information (sensor information) which is information related to a moving object detected by a sensor. Here, "moving object information" means information related to moving conditions and moving status such as velocity, distance, the number of revolutions of an engine, GPS (GPS location), gyro, air pressure of a tire, intervehicle distance, yawing, steering (rudder angle), acceleration, degree of elevation, racing of accelerator, distance and time of meandering driving, the number of harsh brakings, the number of sudden starts, dozing state of a driver, braking pressure, wearing of seatbelts, etc. of a moving object such as an automobile, a motorcycle, a boat, an airplane, play equipments (a jet-coaster (registered trademark), for example), etc.

Figure 1:
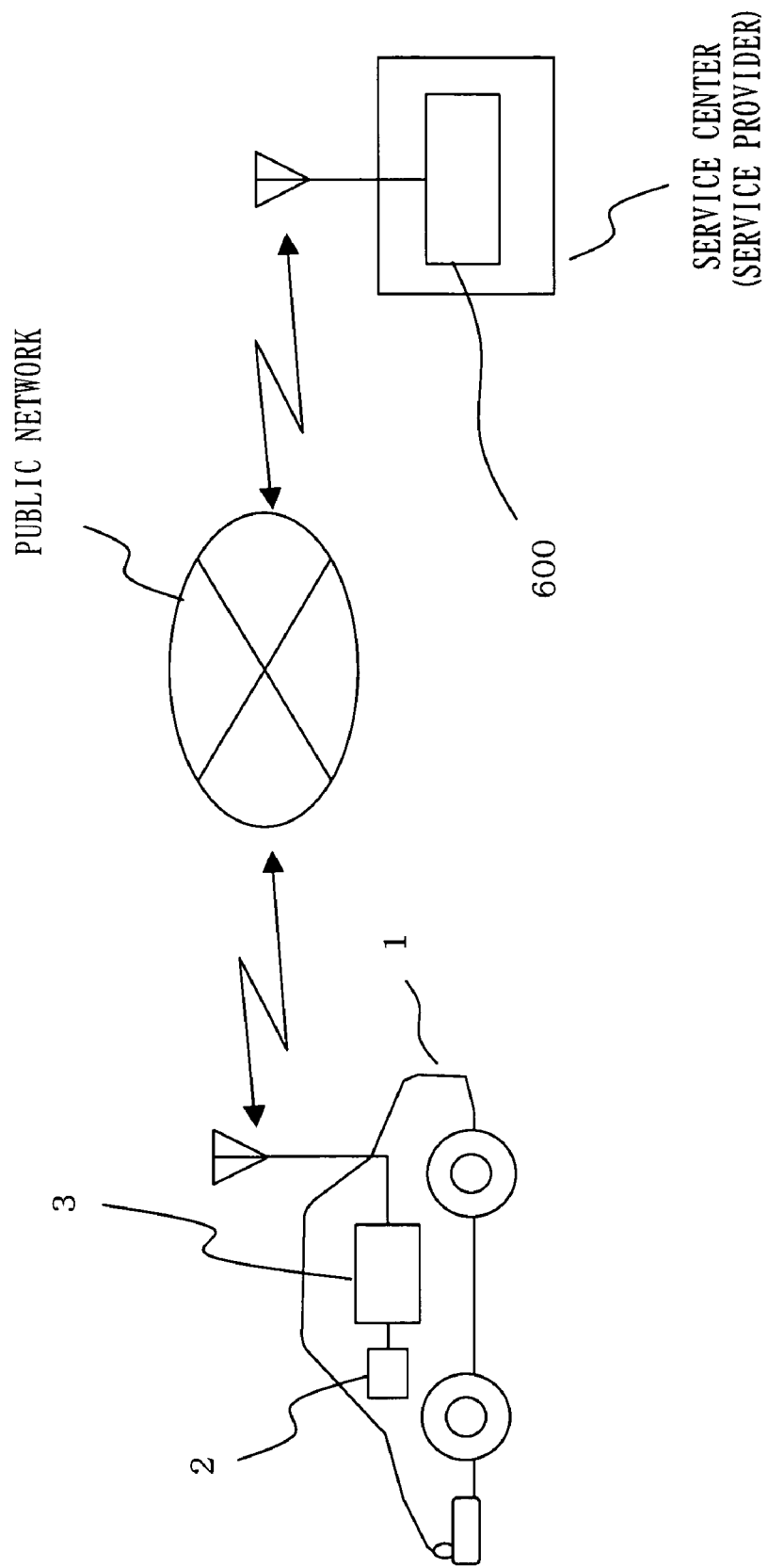
FIG. 1 shows an example of using status of a moving object information storage device 3 according to the first embodiment.

FIG. 1 shows an example of using status of a moving object information storage device 3 according to the first embodiment. The moving object information storage device 3 is equipped in a moving object such as an automobile. In the following, a moving object in which the moving object information storage device 3 is equipped is sometimes called as "an equipped moving object". Further, a moving object in which the moving object information storage device 3 is equipped is previously appointed. The moving object which is previously appointed to equip the moving object information storage device 3 is sometimes called as "an appointed moving object".

The moving object information storage device 3 is equipped in a moving object 1 which is an equipped moving object as shown in FIG. 1. The moving object information storage device 3 receives and stores each moving object information detected by each sensor of a group of sensors 2 composed of a plurality of sensors. The group of sensors 2 includes, for example, sensor 2a, sensor 2b, and sensor 2c as discussed below. The moving object information storage device 3 generates "integrity information" discussed later based on the stored moving object information and unique information discussed later, and sends "the integrity information", "the moving object information" and "the unique information" to a moving object information verification device 600 placed at a service center of an insurance company through, for example, a public line. The moving object information verification device 600 verifies the correctness of "the moving object information" based on "the integrity information" received.

Figure 2:
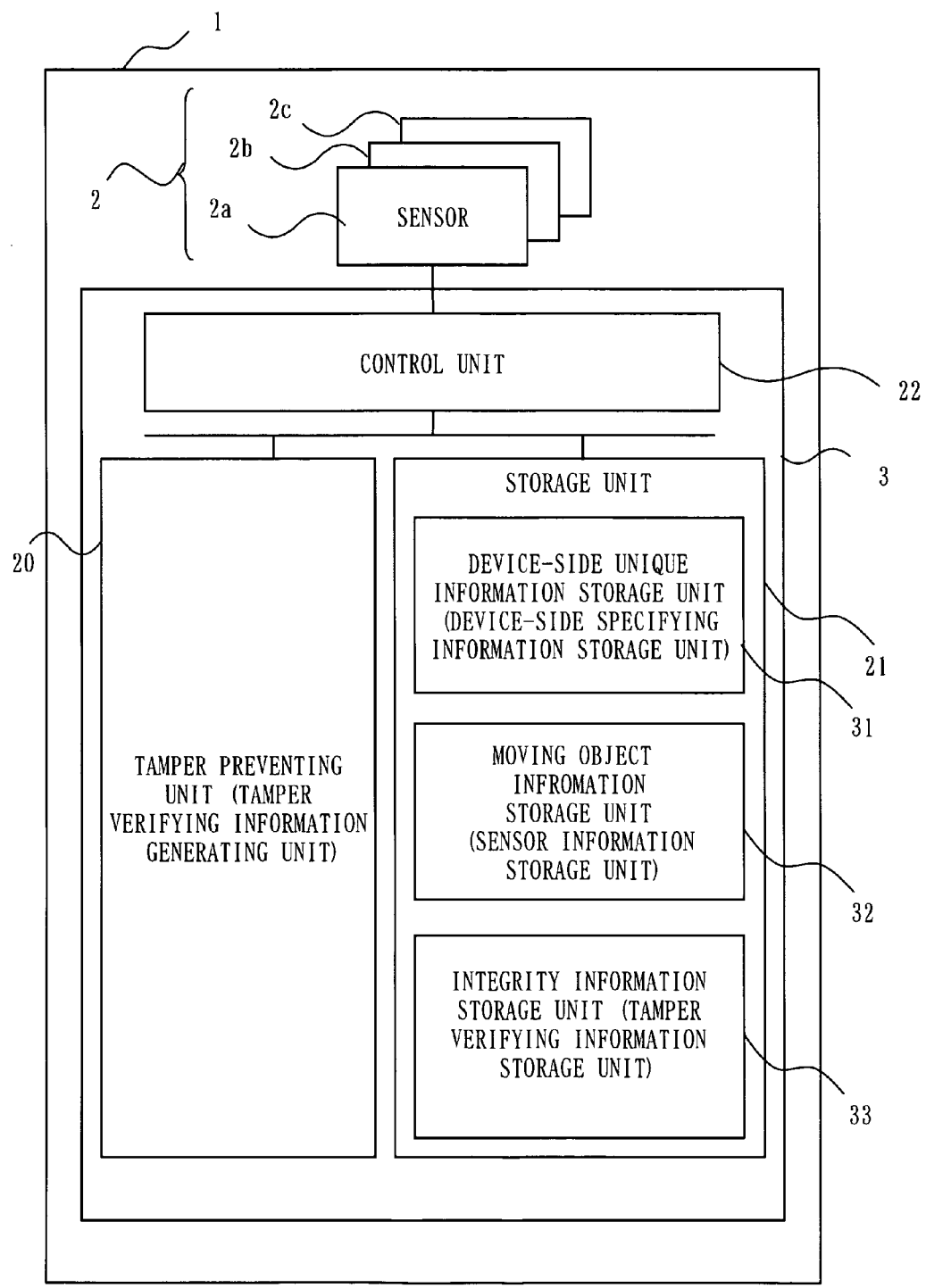
FIG. 2 is a configuration diagram of the moving object information storage device 3 according to the first embodiment.

FIG. 2 is a block diagram showing a configuration of the moving object information storage device 3 according to a first embodiment. FIG. 2 shows a state that the moving object information storage device 3 is equipped in the moving object 1. The moving object information storage device 3 receives the moving information from the sensors 2a through 2c.

In FIG. 2, the moving object 1 is man-ridable such as an automobile, a motorcycle, a boat, an airplane, play equipments (a jet-coaster (registered trademark) or a Ferris wheel, for example).

The sensors 2a, etc. are provided at the moving object 1 and detect "the moving object information" showing moving conditions and moving status such as velocity, travel distance, the number of revolutions of an engine, location by GPS, gyro, air pressure of a tire or a passenger cabin, intervehicle distance, yawing, altitude, tilt, steering (rudder angle), temperature, humidity, and the like of the moving object 1. The twentieth embodiment which will be discussed later shows another example in which the moving object information storage device 3 has a built-in sensor.

According to the first embodiment, the sensors 2a, etc. can calculate information detected by the sensors themselves and output the calculated result to the moving object information storage device 3 as the moving object information. The moving object information obtained by such calculated result includes, for example, an acceleration, a degree of elevation, racing of an accelerator, a distance and time of meandering driving, the number of harsh brakings, the number of sudden starts, video information of inside/outside of the automobile, etc.

The second embodiment will discuss another case in which the sensors 2a, etc. do not calculate the information detected by themselves, but the moving object information storage device 3 calculates. Although in the second embodiment discussed below, the calculated result by the device-side operating unit 201 of the moving object information storage device 3 is stored as "the moving object information", the information detected by the sensors themselves is also "the moving object information". Like this, in this specification, "the moving object information" includes both the information detected by the sensors themselves and the result of processing the information detected by the sensors themselves (the calculated result). Namely, "the moving object information (sensor information)" is the information based on the information detected by the sensors detecting information related to the moving object. Here "based on" means to include both the information detected by the sensors themselves and the calculated result of the information as discussed above.

The moving object information storage device 3 (an information storage device) includes a storage unit 21 storing moving object information, a control unit 22, and tamper preventing unit 20 (a tamper verifying information generating unit). The storage unit 21 includes a device-side unique information storage unit 31 (a device-side specifying information storage unit), and a moving object information storage unit 32 (a sensor information storage unit), and an integrity information storage unit 33 (a tamper verifying information storage unit). Although in FIG. 2, the storage unit 21 includes the device-side unique information storage unit 31, the moving object information storage unit 32, and the integrity information storage unit, the information can be stored independent of each other. The storage unit 21 is, for example, a hard disk, or a semi-conductor memory such as an EEPROM (Electronically Erasable and Programmable Read Only Memory), a RAM, etc.

The device-side unique information storage unit 31 stores "device-side unique information (device-side specifying information)" discussed later. The moving object information storage unit 32 stores "the moving object information". The integrity information storage unit 33 stores "integrity information" discussed later.

The tamper preventing unit 20 generates "the integrity information" based on "the device-side unique information" stored in the device-side unique information storage unit 31 and "the moving object information" recorded in the moving object information storage unit 32 to prove the integrity of these information.

A control unit 22 controls these operation.

Figure 3:
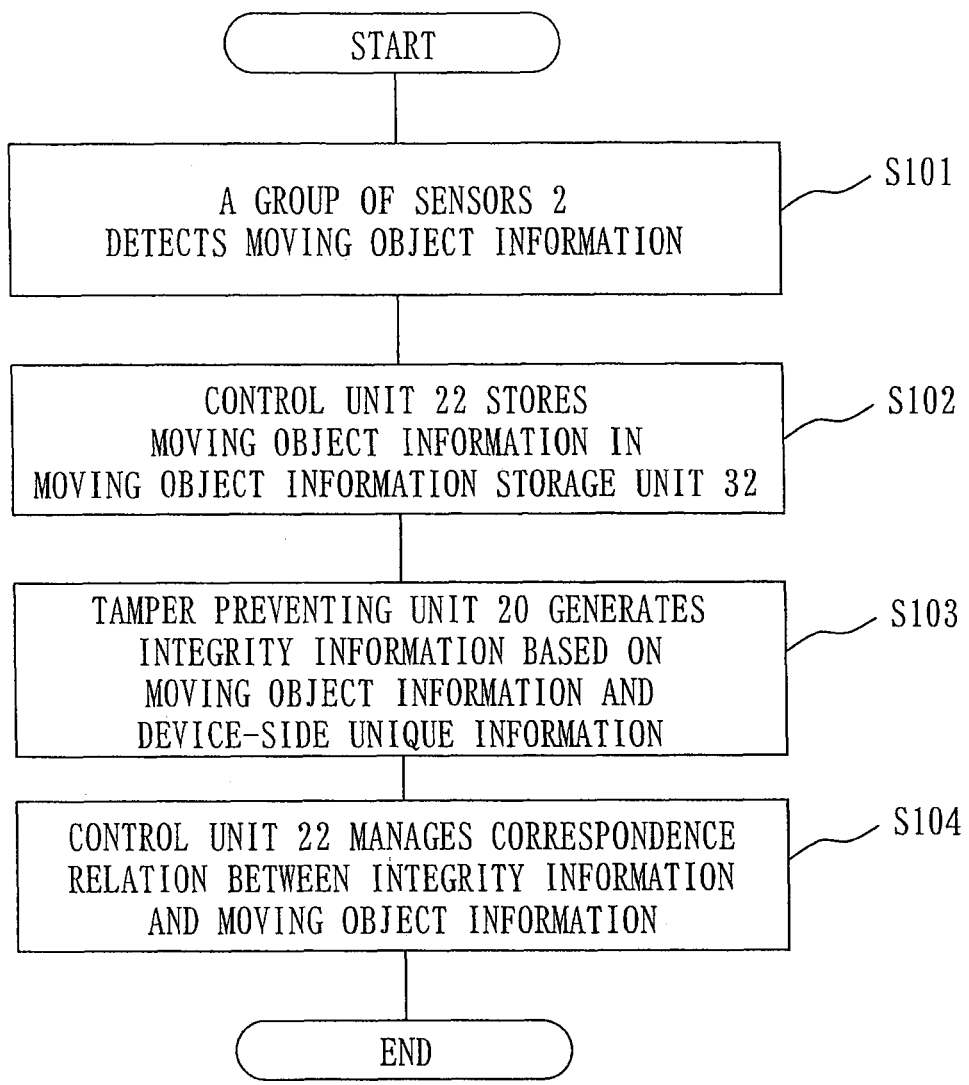
FIG. 3 is a flowchart showing an operation of the moving object information storage device 3 according to the first embodiment.

Next, the operation of the moving object information storage device 3 will be explained by referring to FIG. 3. FIG. 3 is a flowchart explaining the operation of the moving object information storage device 3.

The moving object information storage device 3 starts recording the moving object information detected by the sensors 2a, etc. (S101) at a necessary timing. This timing can be upon starting an engine in the cases of an automobile or a motorcycle, etc. and/or when the power turns to ON in the cases of a jet-coaster (registered trademark), etc. These are determined by a service provider. The control unit 22 receives the moving object information detected by all of the sensors 2a, etc. that are connected to the storage device. The control unit 22 stores the moving object information in the moving object information storage unit 32 (S102). And, at the necessary timing, by command from the control unit 22, the tamper preventing unit 20 generates "the integrity information" based on "the device-side unique information" stored in the device-side unique information storage unit 31 and "the moving object information" stored in the moving object information storage unit 32 (S103). Here, "the device-side unique information" is information which can specify "an appointed moving object" that is a moving object which is previously appointed to equip the moving object information storage device 3. "The device-side unique information" is, concretely, if "the appointed moving object" is an automobile, information which can uniquely distinguish the appointed moving object such as license plate information, a vehicle identification number, a production number, etc.

(4) Further, "the integrity information (tamper verifying information)" means information to confirm that "the moving object information" and "the device-side unique information" are not tampered. Namely, "the integrity information" is information used for verifying if at least either "the device-side unique information" or "the moving object information" is tampered or not. For example, a digital signature is such information. Concrete examples of generation of "the integrity information" will be described in detail in the sixth embodiment which is a system including a moving object information verification device 600.

(5) "The integrity information" generated is stored in the integrity information storage unit 33 by the control unit 22 according to necessity. On recording "the integrity information", the control unit 22 can manage correspondence relation between "the integrity information" and "the moving object information" which is a base for generating the integrity information. By managing the correspondence relation, the correspondence relation becomes clear between "the moving object information" and "the integrity information" (S104).

Figure 4:
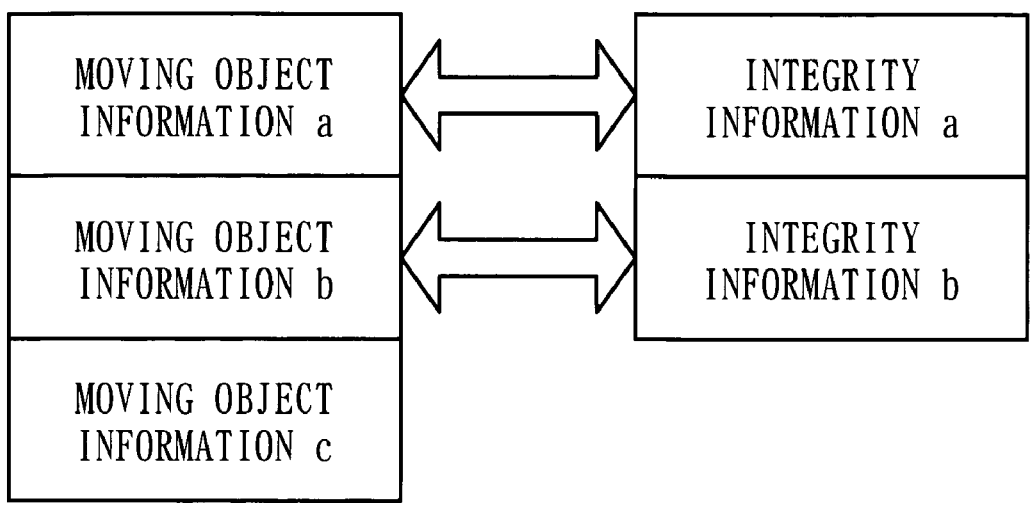
FIG. 4 shows correspondence relation between moving object information and integrity information according to the first embodiment.

(6) FIG. 4 shows an example of managing the correspondence relation between "the moving object information" and "the integrity information". In FIG. 4, "the moving object information a" corresponds to "the integrity information a", and "the moving object information b" corresponds to "the integrity information b". It shows "the integrity information c" corresponding to "the moving object information c" has not been generated yet. Such management makes the correspondence relation clear between "integrity information" and "the moving object information" which is a base for generating the integrity information.

(7) Timings for generating "the integrity information" depends on what this first embodiment is applied to, and can be, for example, when "the moving object information" for which "the integrity information" has not been generated at the time of starting an engine is included in the moving object information storage unit 32, when "the moving object information" is outputted to the outside of the moving object information storage device 3, when "the moving object information" is inputted to the moving object information storage device 3, when an accident or a problem occurs in the moving object 1, and so on.

As discussed above, since inside the moving object information storage device 3, the tamper preventing unit 20 generates "the integrity information" to prove the integrity of "the moving object information" and "the device-side unique information", the correspondence between the moving object 1 and "the moving object information" is made clear, which enables to provide a service provider with the moving object information storage device 3 that stores highly reliable "moving object information".

Embodiment 2

Figure 5:
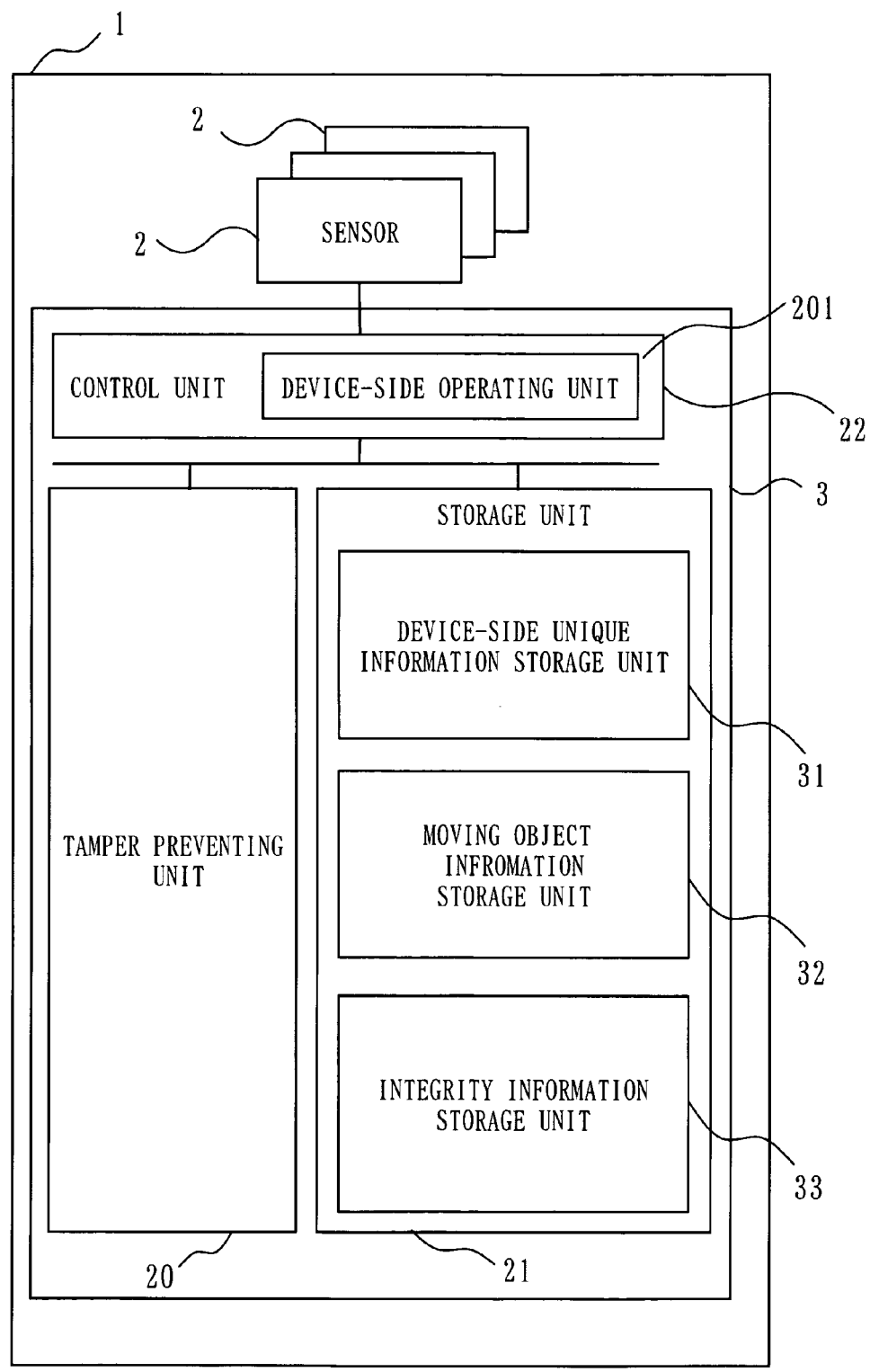
FIG. 5 is a configuration diagram of the moving object information storage device 3 according to the second embodiment.

In the following, the second embodiment will be explained by referring to FIG. 5. The second embodiment is a case when the control unit 22 includes a device-side operating unit 201 calculating signals detected by the group of sensors 2.

The device-side operating unit 201 includes a function to calculate information detected by the group of sensors 2 connected. In such a configuration, the information detected by the sensor 2 is calculated by the device-side operating unit 201, and the calculated result is stored in the storage unit 21 as "the moving object information".

The information obtained from such calculated result is, for example, an acceleration, a degree of elevation, racing of an accelerator, a distance and a time of meandering driving, the number of harsh breakings, the number of sudden startings, video information inside/outside of the automobile, etc.

For example, an acceleration can be obtained by calculating signals of a velocity sensor. Because of this, an acceleration sensor becomes unnecessary. Therefore, the embodiment has an effect that there is no need to add a sensor if such sensor is substituted by calculation of the signals detected by the group of sensors 2.

Embodiment 3

In the following, the third embodiment will be explained by referring to FIGS. 6 through 10. The third embodiment is an embodiment in which the moving object information storage device 3 is provided with separation preventing means for preventing separation of the moving object information storage device 3 from the moving object 1 when the moving object information storage device 3 is equipped in the moving object 1 which is an appointed moving object that is previously appointed to equip the moving object information storage device 3.

(1. Special Screw)

Figure 6:
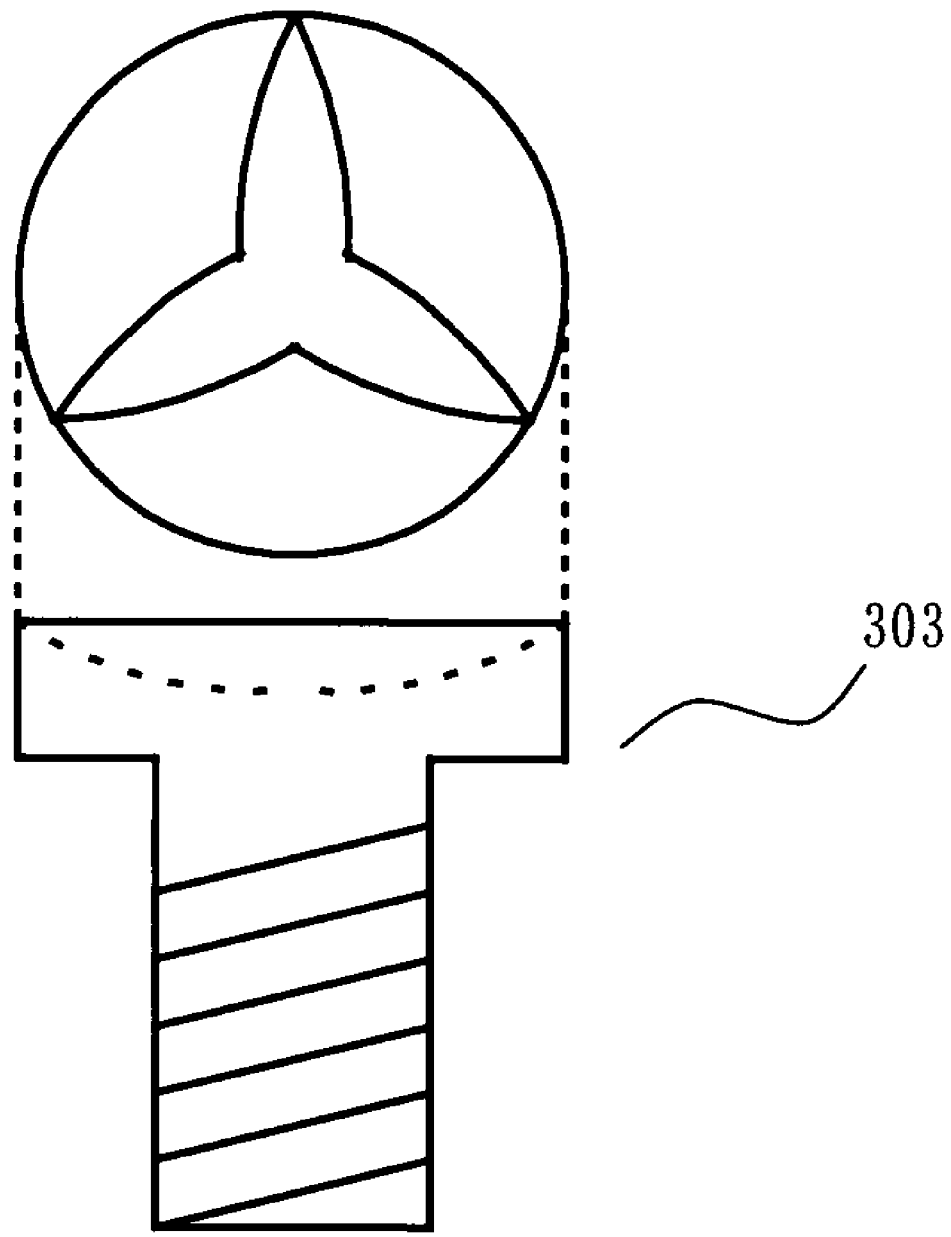
FIG. 6 shows an example of a special screw according to the third embodiment.

Use of a special screw can be noted as one example of the separation preventing means. FIG. 6 shows an example of "a special screw 303". Not "a Phillips screw" nor "a slotted head screw" which are available in the market, but using "the special screw 303" having a special shape like this, the moving object information storage device 3 is fixed to the moving object 1 which is the appointed moving object. By this, a tool such as a special screwdriver suitable to "the special screw 303" is necessary to remove the moving object information storage device 3, which makes it difficult to remove the moving object information storage device 3.

(2. Separation Preventing Seal)

Figure 7:
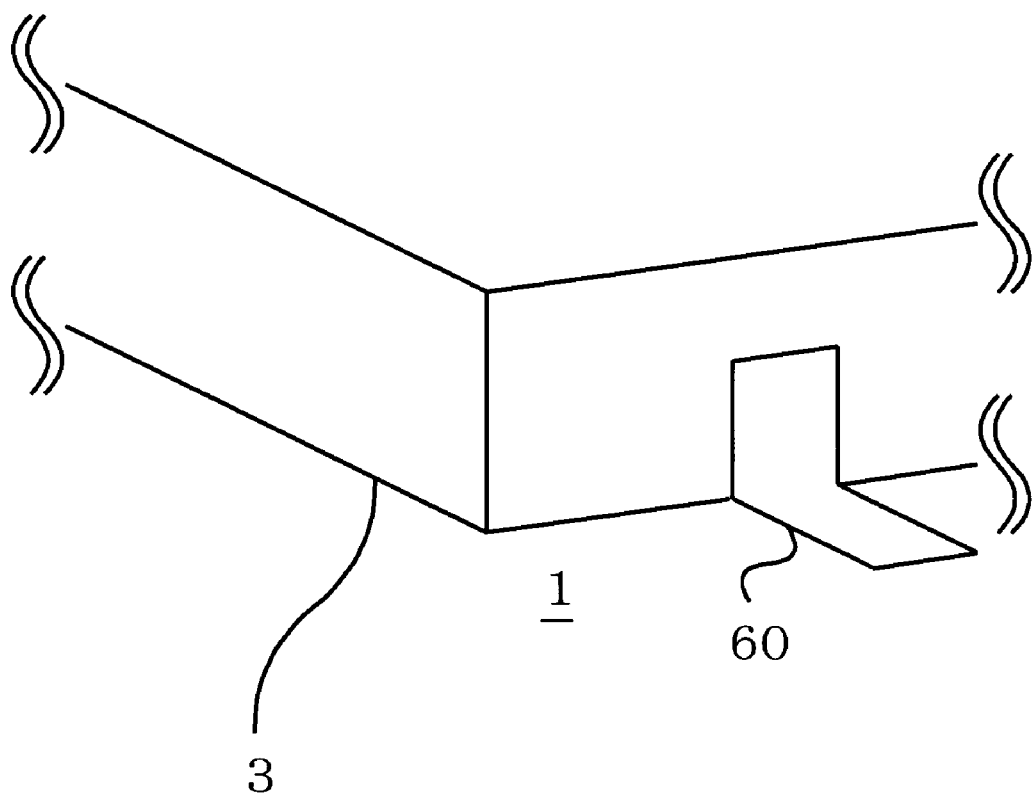
FIG. 7 shows a seal according to the third embodiment.

Another separation preventing means will be explained. FIG. 7 shows attached status of the moving object information storage device 3 to the moving object 1 when the moving object information storage device 3 is sealed by "a seal 60" such as a tamper proof seal or a sealing seal, etc. If opened after once sealed, letters such as "opened" appear on the surface of "the seal 60". After the moving object information storage device 3 is fixed to the moving object 1, "the seal 60" is stuck so as to cross both the moving object 1 and the moving object information storage device 3. By this, letters such as the above "opened" appear on "the seal 60" when the moving object information storage device 3 is removed from the moving object 1. Therefore, it is possible for a service provider to detect the moving object information storage device 3 is removed. Further, since such a seal is stuck, an attempt to remove the moving object information storage device 3 from the moving object 1 by a user, etc. can be prevented.

(3. Lockup)

Another separation preventing means, though not illustrated, can be implemented by simultaneously locking up both of the moving object information storage device 3 and the moving object 1 using a physical lock or by fixing the moving object information storage device 3 to the moving object 1 using a physical lock.

(4. Electrical Separation Prevention)

Figure 8:
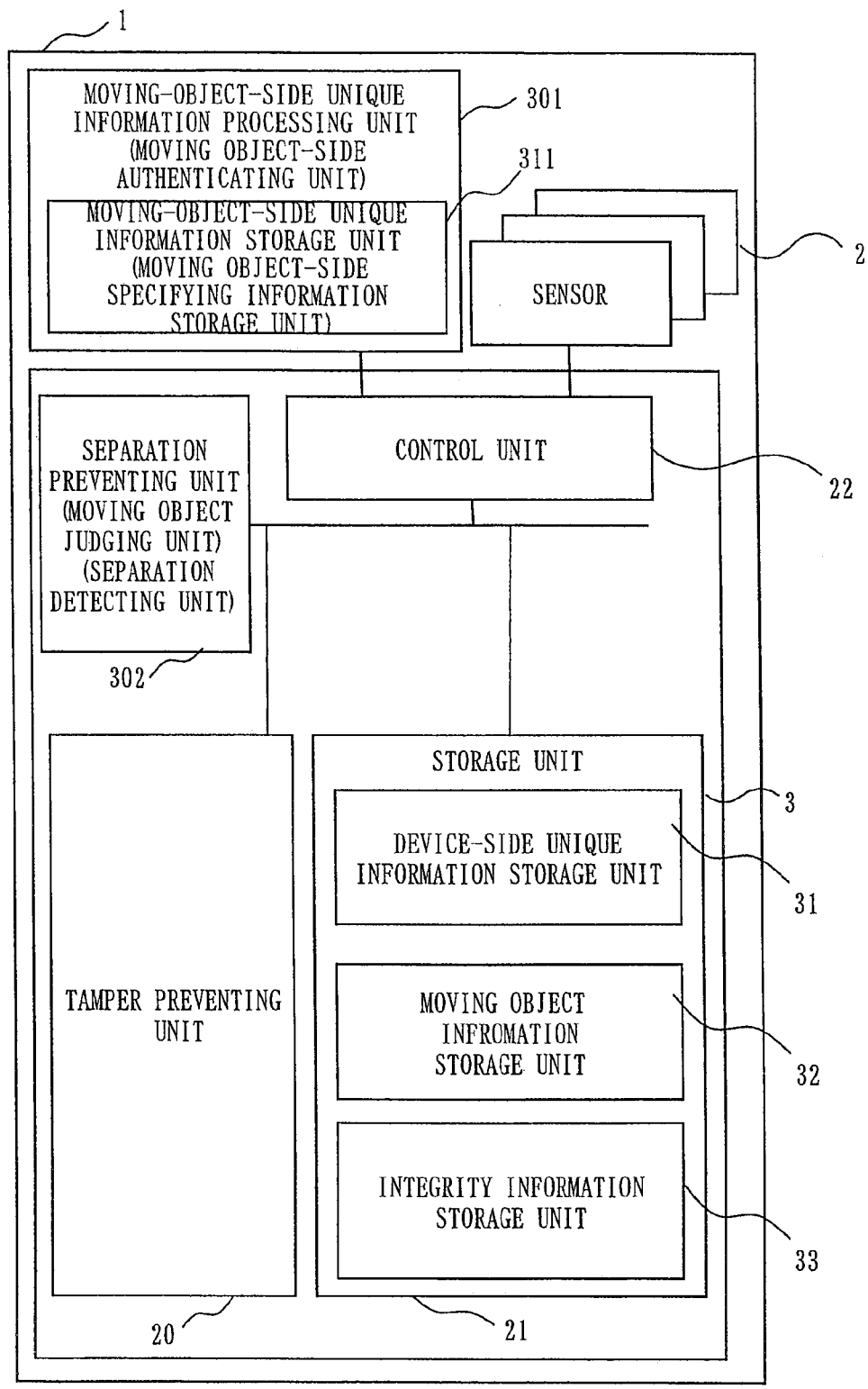
FIG. 8 is a configuration diagram of the moving object information storage device 3 according to the third embodiment.

Further, an electrically implemented example will be explained as another separation preventing means. FIG. 8 is a block diagram showing a configuration of the moving object information storage device 3 according to the third embodiment. The moving object information storage device 3 shown in FIG. 8 includes a separation preventing unit 302 (an example of a separation detecting unit, an example of a moving object judging unit) in addition to the moving object information storage device 3 of the first embodiment shown in FIG. 2. The separation preventing unit 302 is to judge an equipped moving object is an appointed moving object or not as well as to prevent separation from the appointed moving object.

The moving object 1 includes a moving-object-side unique information processing unit 301 (an example of a moving-object-side authenticating unit). The moving-object-side unique information processing unit 301 includes a moving-object-side unique information storage unit 311. The moving-object-side unique information storage unit 311 stores moving-object-side unique information (moving-object-side specifying information). "The moving-object-side unique information" is information kept by the moving object 1 and information which can specify the moving object 1. "The moving-object-side unique information" means, if the moving object 1 is an automobile, information which can uniquely distinguish the moving object 1 such as license plate information, a vehicle identification number, a production number, etc.

The moving-object-side unique information processing unit 301 carries out authentication process with the separation preventing unit 302. In FIG. 8, the moving-object-side unique information processing unit 301 of the moving object 1 is connected to the control unit 22 of the moving object information storage device 3. Further, the separation preventing unit 302 is configured to communicate with the moving-object-side unique information processing unit 301 through the control unit 22. However, the configuration is not limited to this, but another configuration in which the separation preventing unit 302 is directly connected to the moving-object-side unique information processing unit 301 and communicated.

Figure 9:
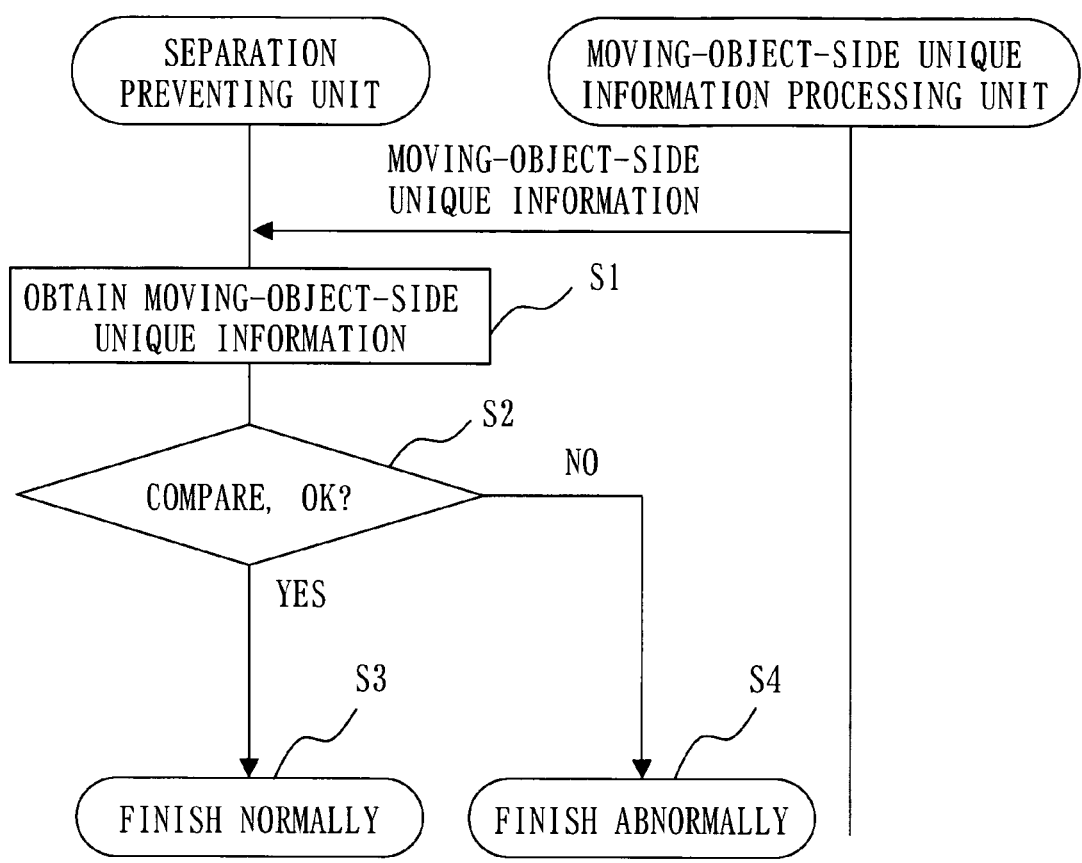
FIG. 9 is a sequence for comparing unique information of a moving-object-side unique information processing unit and a separation preventing unit according to the third embodiment.

Next, the operation will be explained using FIG. 9. FIG. 9 is a sequence diagram showing transaction between the moving-object-side unique information processing unit 301 and the separation preventing unit 302. In FIG. 9, the separation preventing unit 302 inputs device-side unique information stored by the device-side unique information storage unit 31 and moving-object-side unique information stored by the moving-object-side unique information storage unit 311 and judges if the moving object 1 is the appointed moving object or not based on the device-side unique information and the moving-object-side unique information inputted. Concrete explanation will be done by referring to FIG. 9.

(1) The moving-object-side unique information processing unit 301 stores "the moving-object-side unique information" of the moving object 1 in the moving-object-side unique information storage unit 311. This "moving-object-side unique information" must have identity with the device-side unique information stored in the device-side unique information storage unit 31 of the moving object information storage device 3 if the moving object 1 is the appointed moving object. Here, the identity does not mean to have to be identical but means to be able to specify the identical moving object.

(2) The separation preventing unit 302 communicates with the moving-object-side unique information processing unit 301 at a necessary timing and obtains "the moving-object-side unique information" kept by the moving object 1 (S1).

(3) Then, the separation preventing unit 302 compares "the moving-object-side unique information" obtained and "the device-side unique information" maintained in the device-side unique information storage unit 31 (S2).

(3) It finishes normally if the compared result shows identical (S3), and the contents which has been finished normally is recorded in, for example, the storage unit 21. It finishes abnormally if the compared result shows not identical (S4), and that it finishes abnormally is recorded in, for example, the storage unit 21.

Here, timing when the separation preventing unit 302 communicates with the moving-object-side unique information processing unit 301 are at the time of starting the engine, generating "the integrity information", with a predetermined or random interval, etc. By this, it is possible to detect that the moving object information storage device 3 is removed from the moving object 1 and is equipped in another moving object. Therefore, notifying the user that this function is mounted on the moving object information storage device 3 prevents a trial to remove the moving object information storage device 3 from the moving object.

Figure 10:
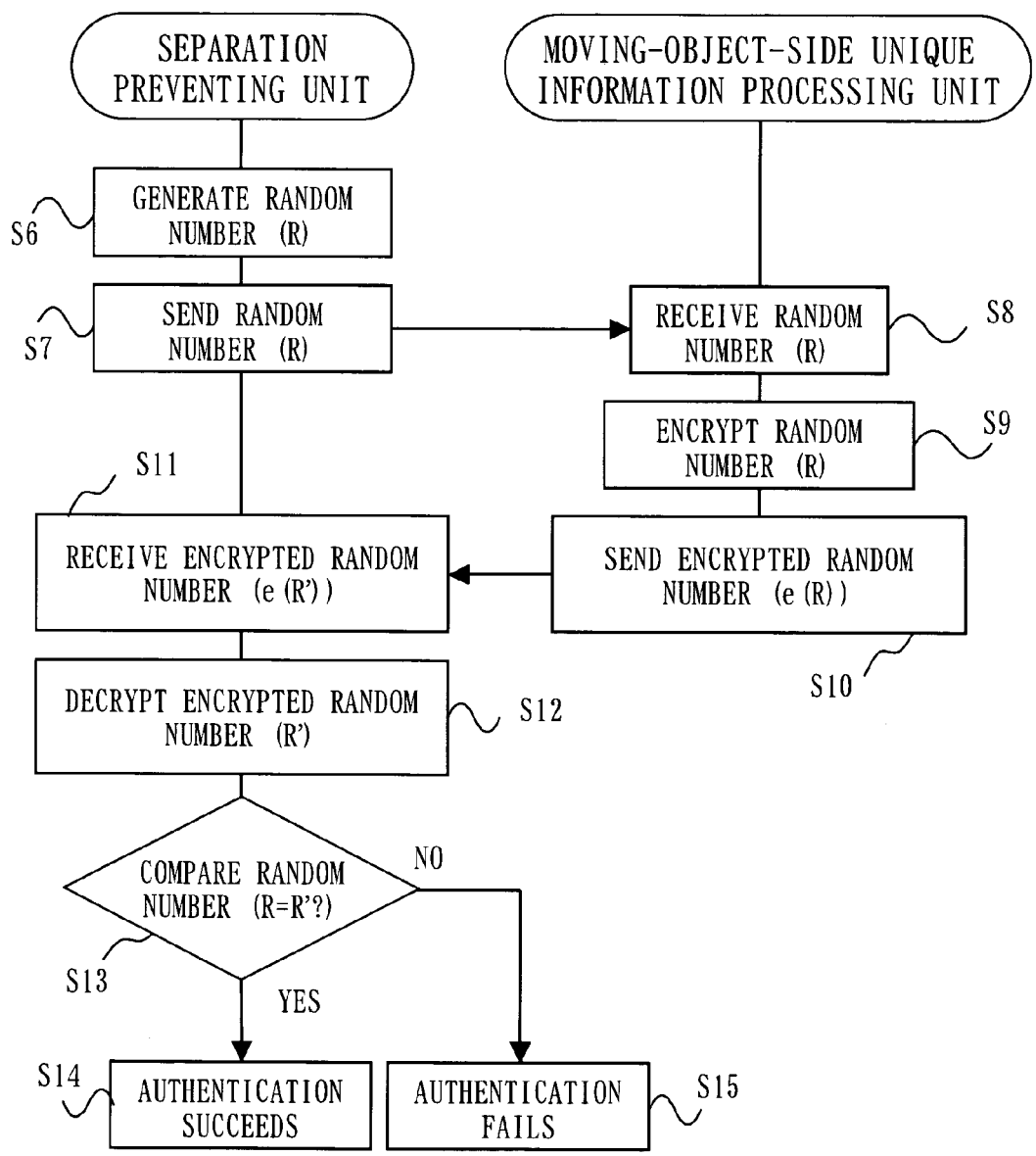
FIG. 10 shows a sequence for authentication process of the moving-object-side unique information processing unit and the separation preventing unit according to the third embodiment.

Next, by referring to FIG. 10, an example of authentication process between the moving-object-side unique information processing unit 301 and the separation preventing unit 302 will be explained. FIG. 10 is a flowchart showing the authentication process between the moving-object-side unique information processing unit 301 and the separation preventing unit 302. The separation preventing unit 302 sends authentication request to the moving-object-side unique information processing unit 301 (a moving-object-side authenticating unit). Then, by carrying out the authentication process with the moving-object-side unique information processing unit 301 based on "a predefined rule", the separation preventing unit 302 judges if the equipped moving object in which the device itself (the moving object information storage device 3) is equipped is the appointed moving object. Further explanation will be done in the following.

FIG. 10 shows the case when "the predefined rule" is "encryption/decryption of random numbers". The moving object information storage device 3 and the moving-object-side unique information processing unit 301 of the moving object 1 have an encryption key (not illustrated).

(1) The separation preventing unit 302 of the moving object information storage device 3 generates a random number (R) (S6), and sends to the moving-object-side unique information processing unit 301 of the moving object 1 (an example of authentication request) (S7).

(2) The moving-object-side unique information processing unit 301 receives the random number (R) (S8), and after encrypting (e(R)) (S9), sends to the moving object information storage device 3 (S10).

(3) The separation preventing unit 302 of the moving object information storage device 3 receives response data (e(R')) (S11), decrypts it (S12), and compares with the random number generated previously (S13).

(4) By the compared result, the separation preventing unit 302 judges if the moving object 1 which is the equipped moving object is an appointed moving object or not. If the compared result shows matched, the separation preventing unit 302 judges the moving object 1 as the appointed moving object; if the compared result shows mismatched, the moving object 1 is judged not to be the appointed moving object.

(5) If the compared result shows matched (S14), the process finishes normally; if mismatched (S15), the process finishes abnormally.

Another Example 1

Next case is considered as "the predefined rule". In the case of FIG. 10, at the moving object information storage device 3, the encrypted random number received from the moving-object-side unique information processing unit 301 is decrypted (S12), and then the comparison is done (S13). However, the generated random number can be encrypted at the separation preventing unit 302 of the moving object information storage device 3, the result can be compared with the encrypted random number received from the moving-object-side unique information processing unit 301.

Another Example 2

Next case is considered as "the predefined rule". In the case of FIG. 10, the random number encrypted by the movingobject-side unique information processing unit 301 (S9) is confirmed at the separation preventing unit 302. However, it is also possible to generate a message authentication code or a digital signature for the random number received at the moving-object-side unique information processing unit 301, and the separation preventing unit 302 can verify them.

Another example 3

"The predefined rule" can be implemented by combining with a method to confirm the unique information explained in the above discussed FIG. 9. Namely, the method can be, when the random number is encrypted by the moving-object-side unique information processing unit 301, both the random number and moving-object-side unique information can be encrypted, and the random number and the moving-object-side unique information decrypted by the separation preventing unit 302 can be compared with the generated random number and the maintained device-side unique information.

By "the predefined rule" discussed above, the separation preventing unit 302 can detect that the moving object information storage device 3 is separated from the moving object 1 and equipped in a different moving object. Further, by performing encryption, it is possible to accomplish a more reliable moving object information storage device 3 than the above-discussed confirmation of the moving-object-side unique information and the device-side unique information. Notifying the user that this function is mounted on the moving object information storage device 3 prevents a trial to remove the moving object information storage device 3.

As has been discussed, by providing the separation preventing unit 302 at the moving object information storage device 3, the correspondence relation between the moving object information storage device 3 and the moving object 1 is made clear, which prevents equipping the moving object information storage device 3 in another moving object to collect false "moving object information". Therefore, it is possible to provide a service provider with a highly reliable moving object information storage device 3. Further, by configuring to provide the service provider with the device-side unique information maintained by the moving object information storage device 3, the obtained moving-object-side unique information of another moving object, and information showing that the moving object information storage device 3 is equipped in another moving object, it is possible for the service provider to warn the user based on these information.

Embodiment 4

Figure 11:
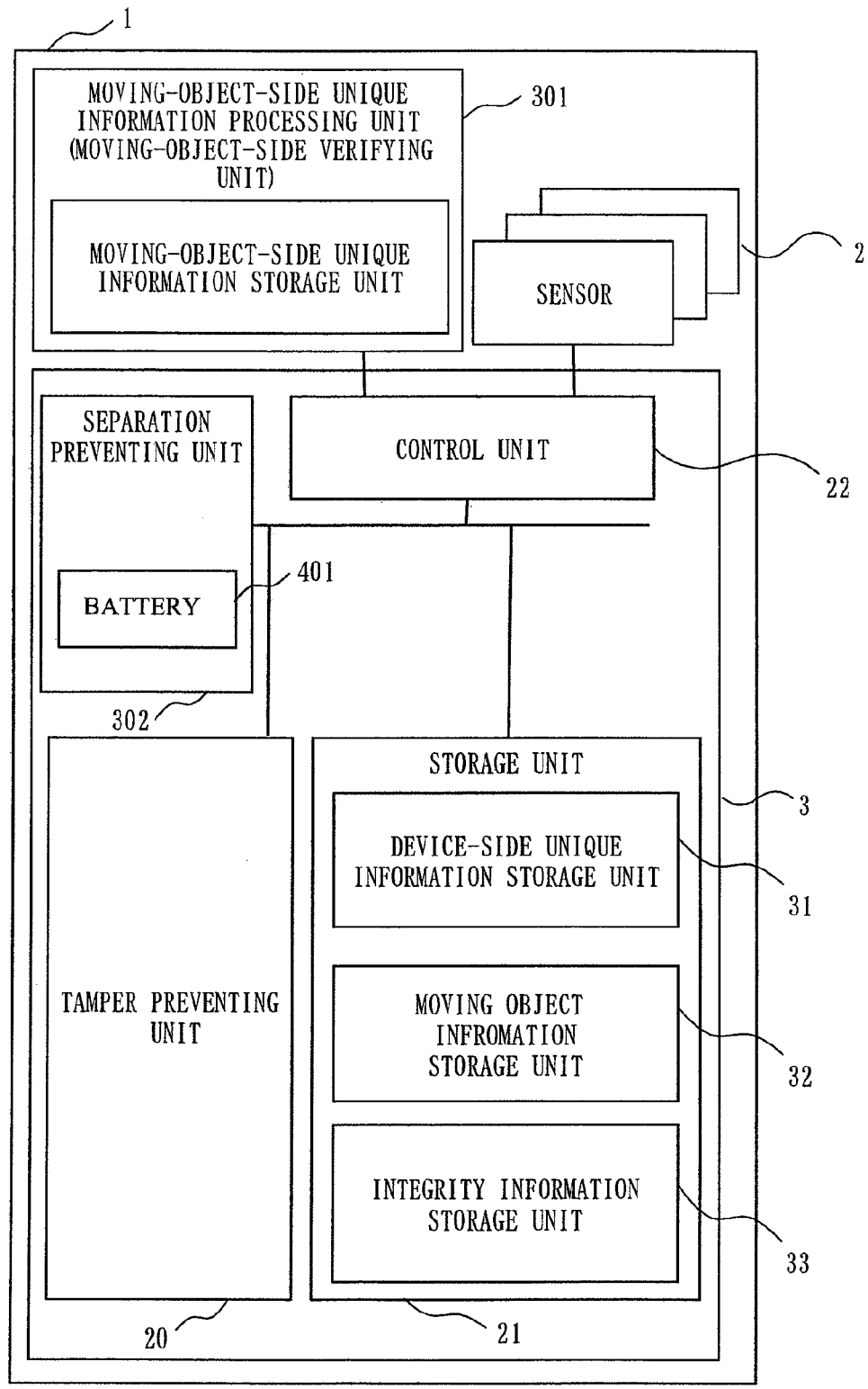
FIG. 11 is a configuration diagram of the moving object information storage device 3 according to the fourth embodiment.
Figure 12:
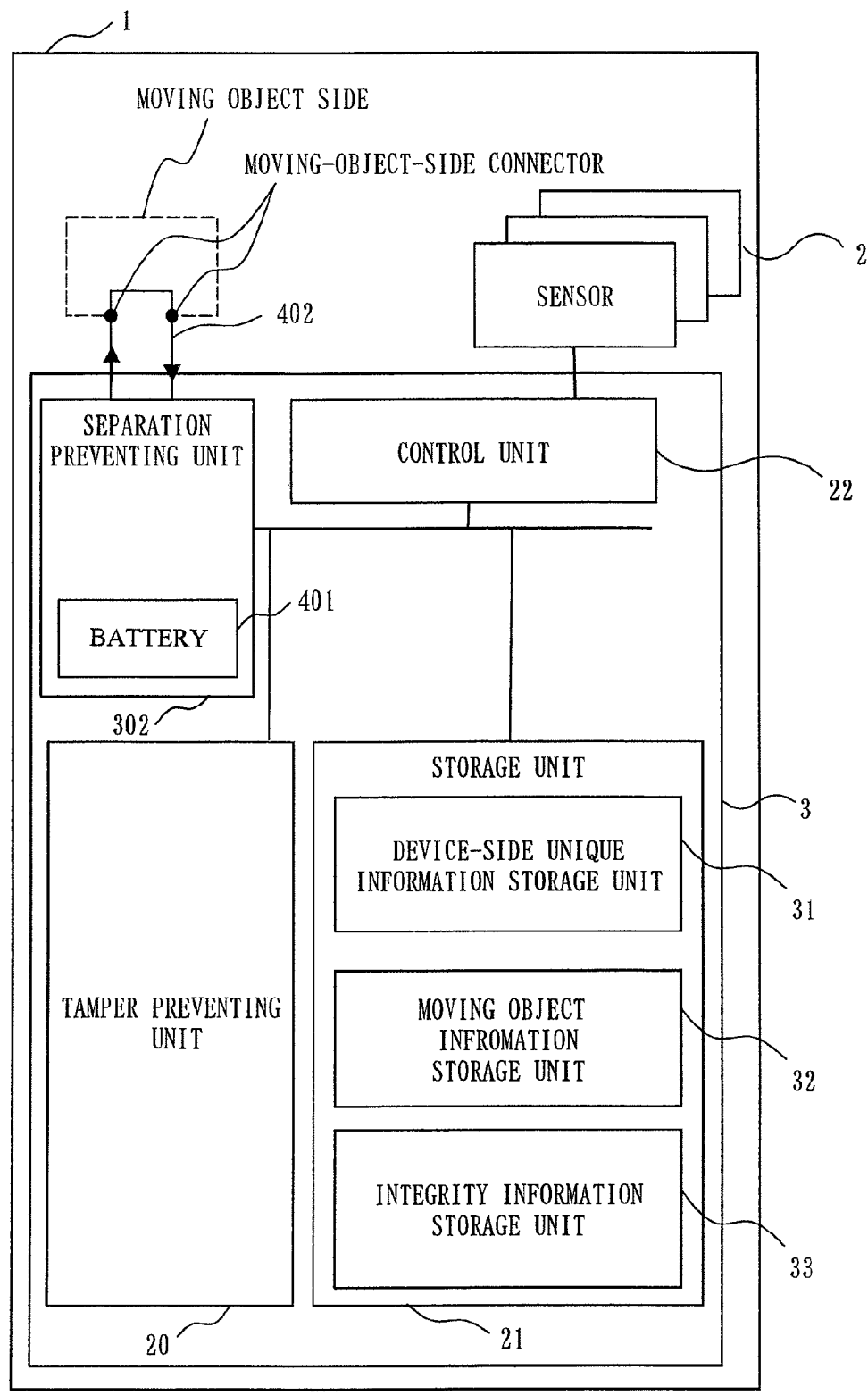
FIG. 12 is a configuration diagram of another example of the moving object information storage device 3 according to the fourth embodiment.

In the following, the fourth embodiment will be explained by referring to FIGS. 11 and 12. The fourth embodiment is an embodiment in which the separation preventing unit 302 shown in FIG. 8 is provided with a battery 401 (power source) supplying electric power. FIG. 11 is a block diagram showing a configuration of the moving object information storage device 3 according to the fourth embodiment. Different from FIG. 8 of the third embodiment, the separation preventing unit 302 is provided with the battery 401 in FIG. 11.

In FIG. 11, the battery 401 is embedded in the separation preventing unit 302, but this is merely one of examples. It is enough that the battery 401 is included in the moving object information storage device 3. Namely, it is enough that the configuration is to supply power source even if the moving object information storage device 3 is separated from the moving object 1.

The separation preventing unit 302 of FIG. 11 obtains the moving-object-side unique information of the moving object 1 shown in FIG. 9 of the third embodiment at a predetermined or random interval of time or carries out authentication using the random number as shown in FIG. 10. Configured like this, even if the moving object information storage device 3 is separated from the moving object 1, the separation preventing unit 302 can obtain the moving-object-side unique information or authenticate at a necessary timing using the battery 401 as operable power source. However, since the moving object information storage device 3 is not connected to the moving object 1, the separation preventing unit 302 cannot receive a response from the moving object 1. By this, the separation preventing unit 302 can detect that it is separated from the moving object 1.

That is, the moving object information storage device 3 is provided with the battery 401 (power source) supplying electric power. The battery 401 is not limited to be included in the separation preventing unit 302 as written above, but it is enough to be included in the moving object information storage device 3. Even if separated, by supplying electric power from the battery 401 (power source), the separation preventing unit 302 sends "a transmission requesting signal" requesting transmission of the moving-object-side unique information to the moving-object-side unique information processing unit 301 of the moving object to have a response, or sends "an authentication start requesting signal" requesting start of authentication process to have a response. "The transmission requesting signal" or "the authentication start requesting signal" which are sent by the separation preventing unit 302 function as "a separation confirming signal" confirming that the moving object information storage device 3 is equipped in the moving object or not, namely, separated from the moving object or not. The moving-object-side unique information processing unit 301 of the moving object functions as "a responding unit" responding to "the separation confirming signal". Like this, the separation preventing unit 302 asks the moving-object-side unique information processing unit 301 to respond by sending "the separation confirming signal" to the moving-object-side unique information processing unit 301 (responding unit), and if no response is received, judges that it is separated from the moving object.

Next, by referring to FIG. 12, another example of the separation preventing unit 302 will be explained. FIG. 12 shows a block diagram showing another example of the separation preventing unit 302 in the moving object 1. A signal line 402 is inputted again to the separation preventing unit 302 from the separation preventing unit 302 through the moving object 1. The moving object 1 and the separation preventing unit 302 are connected, for example, by a connector as shown in the figure. The operation in this configuration will be explained in the following.

The separation preventing unit 302 feeds electric current to the signal line 402 using the buttery 401 as the power source. When the moving object information storage device 3 is equipped in the moving object 1, electric current runs through the signal line 402. However, when the moving object information storage device 3 is separated from the moving object 1, the signal line 402 is blocked. Therefore, the electric current does not run. Namely, by observing the electric current running through the signal line 402, it is possible for the separation preventing unit 302 to detect that the moving object information storage device 3 is separated from the moving object 1.

As discussed above, by providing the buttery 401 at the moving object information storage device 3, it is possible to correctly detect the fact that the moving object information storage device 3 is separated from the moving object 1. Because of this, it is also possible to provide a highly reliable moving object information storage device 3 to the service provider. Further, it is configured so as to provide the device-side unique information maintained by the moving object information storage device 3, the moving-object-side unique information obtained from the moving object, and the information that the moving object information storage device 3 is separated from the moving object 1 to the service provider, which enables the service provider to warn the user based on these information.

Embodiment 5

In the following, the fifth embodiment will be explained by referring to FIG. 13. The fifth embodiment will explain an embodiment which includes the separation preventing unit 302 for deleting the information stored in the moving object information storage device 3 when the separation preventing unit 302 detects the separation from the moving object.

Figure 13:
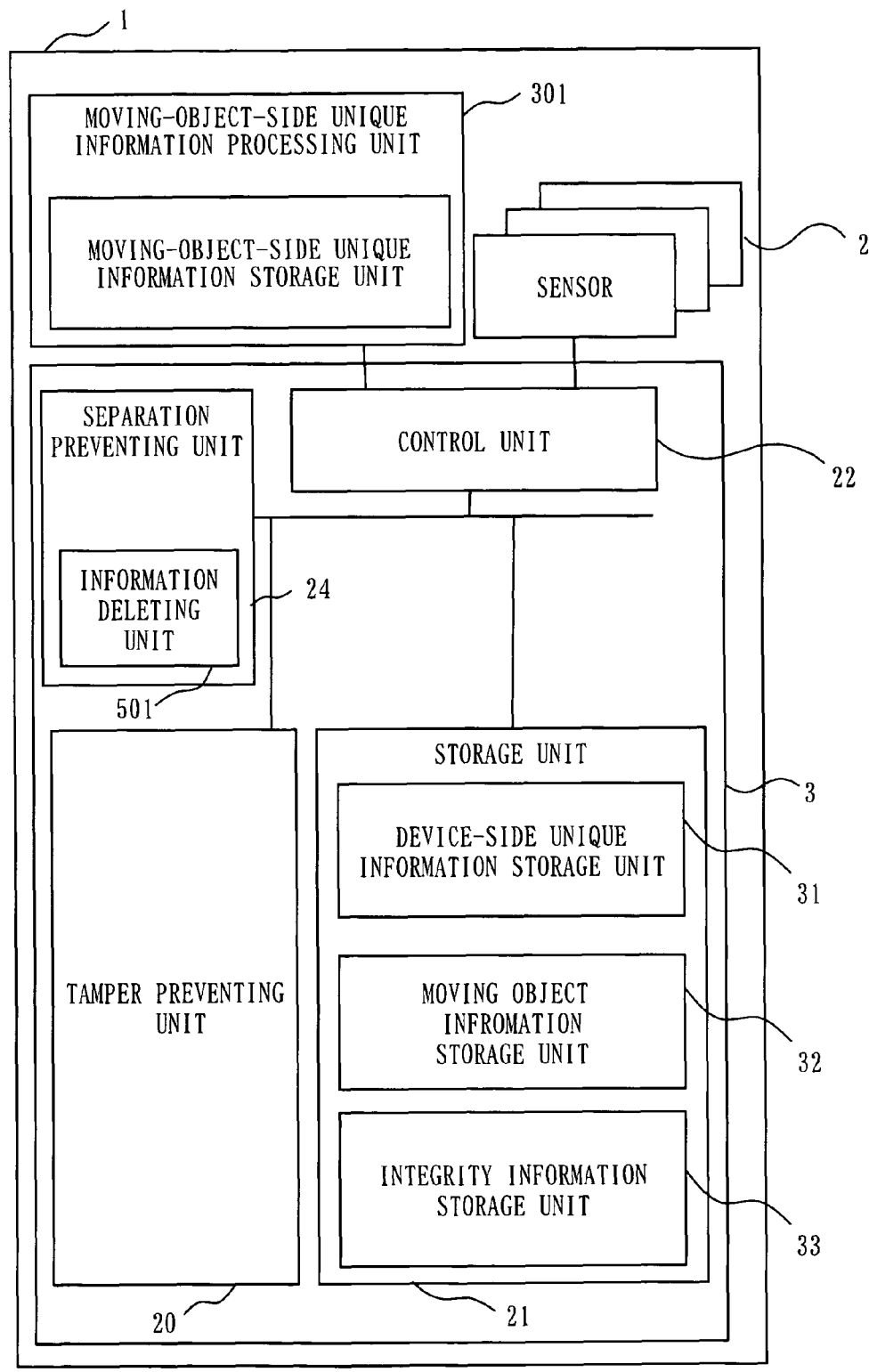
FIG. 13 is a configuration diagram of the moving object information storage device 3 according to the fifth embodiment.

As shown in FIG. 13, the separation preventing unit 302 includes an information deleting unit 501. The information deleting unit 501 deletes the information of the storage unit 21 when the separation preventing unit 302 detects the separation from the moving object 1. For example, when the separation preventing unit 302 judges that the equipped moving object which the device itself (the moving object information storage device 3) is equipped is not the appointed moving object, the information deleting unit 501 deletes the moving object information stored in the moving object information storage unit 32.

In the above configuration, the separation preventing unit 302 detects the separation by the obtainment of the moving-object-side unique information of the moving object 1 shown in FIG. 9 which is carried out with a predetermined or random interval as has been discussed in the second and third embodiments, the authentication using the random number shown in FIG. 10, etc. Then, the information in the moving object information storage device 3, for example, "the moving object information", etc. stored in the moving object information storage unit 32 as discussed above is deleted. It is possible to prescribe which information should be deleted.

As discussed above, when the moving object information storage device 3 is separated from the moving object, the information deleting unit 501 deletes the information in the storage unit 21. Consequently, the service provider certainly knows the separation, and the service provider can warn the user based on the information. Therefore, it is possible to provide a highly reliable moving information storage device 3 to the service provider.

Embodiment 6

Figure 14:
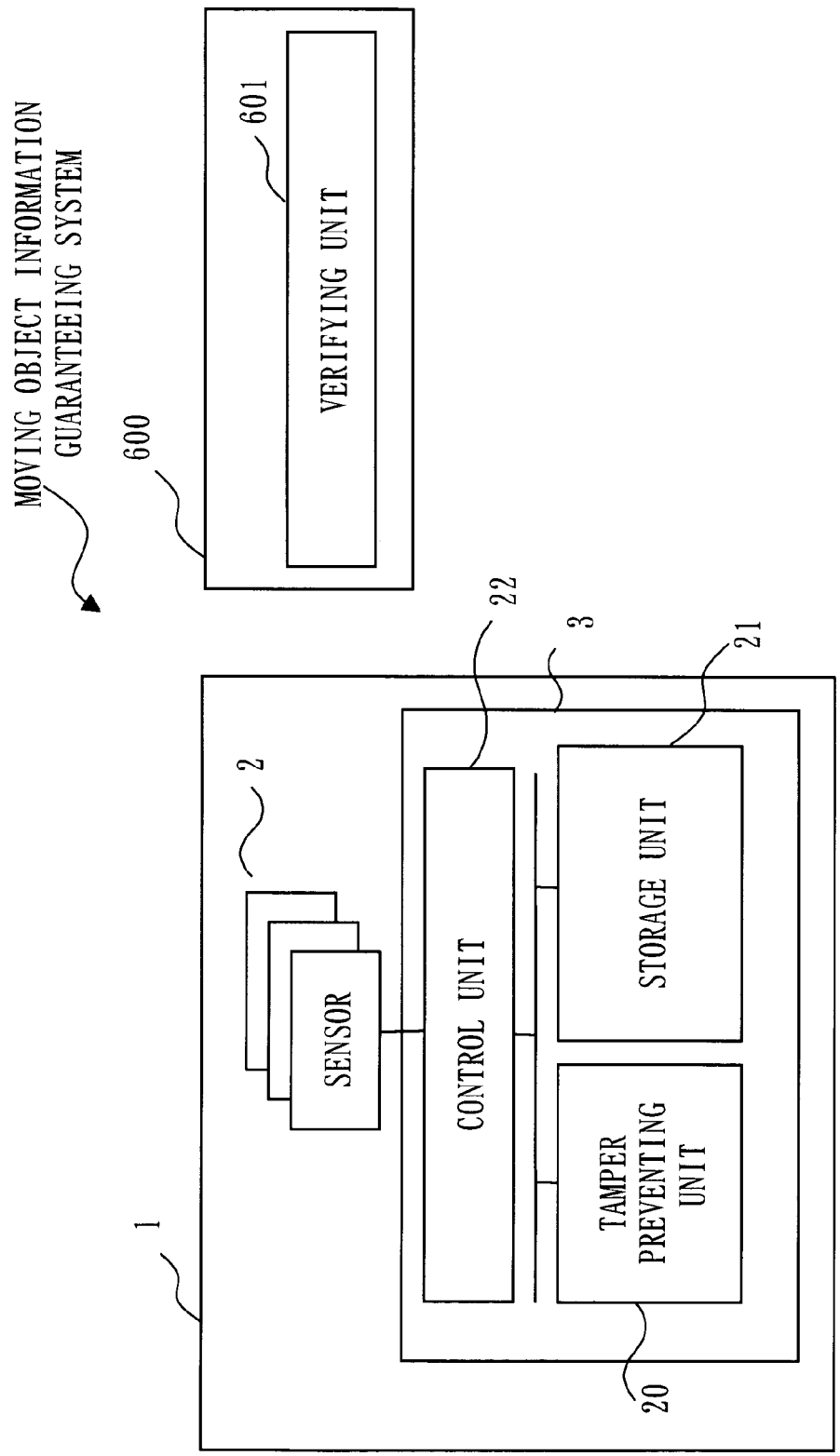
FIG. 14 is a configuration diagram of a moving object information guaranteeing system according to the sixth embodiment.

In the following, the sixth embodiment will be explained by referring to FIGS. 14 and 15. The sixth embodiment is an embodiment of a moving object information guaranteeing system including the moving object information storage device 3 and the moving object information verification device 600. The sixth embodiment corresponds to the first embodiment and is made as a system by additionally including the moving object information verification device 600 to the first embodiment.

The moving object information verification device 600 includes a verifying unit 601. FIG. 14 is a configuration diagram of a moving object information guaranteeing system according to the sixth embodiment. The moving object information storage device 3 of FIG. 14 is the same as the moving object information storage device 3 of FIG. 2. In FIG. 14, the moving object information verification device 600 is kept by the service provider. The verifying unit 601 verifies if the information inputted is tampered or not. Here, as well as other embodiments, the moving object information storage device 3 can include the separation preventing unit 302.

Next, the operation of the moving object information guaranteeing system according to the sixth embodiment will be explained by referring to FIG. 15.

The operation of the moving object information storage device 3 is the same as the one of the first embodiment. Namely, the moving object information storage device 3 maintains "the moving object information" and generates "the integrity information". Further, the verifying unit 601 of the moving object information verification device 600 confirms that "the moving object information" is not tampered using "the integrity information".

Here, it is assumed that the information is exchanged between the moving object information storage device 3 and the moving object information verification device 600 using "communication" which will be described later in the eighth embodiment or "an IC card" which will be described later in the tenth embodiment.

Figure 15:
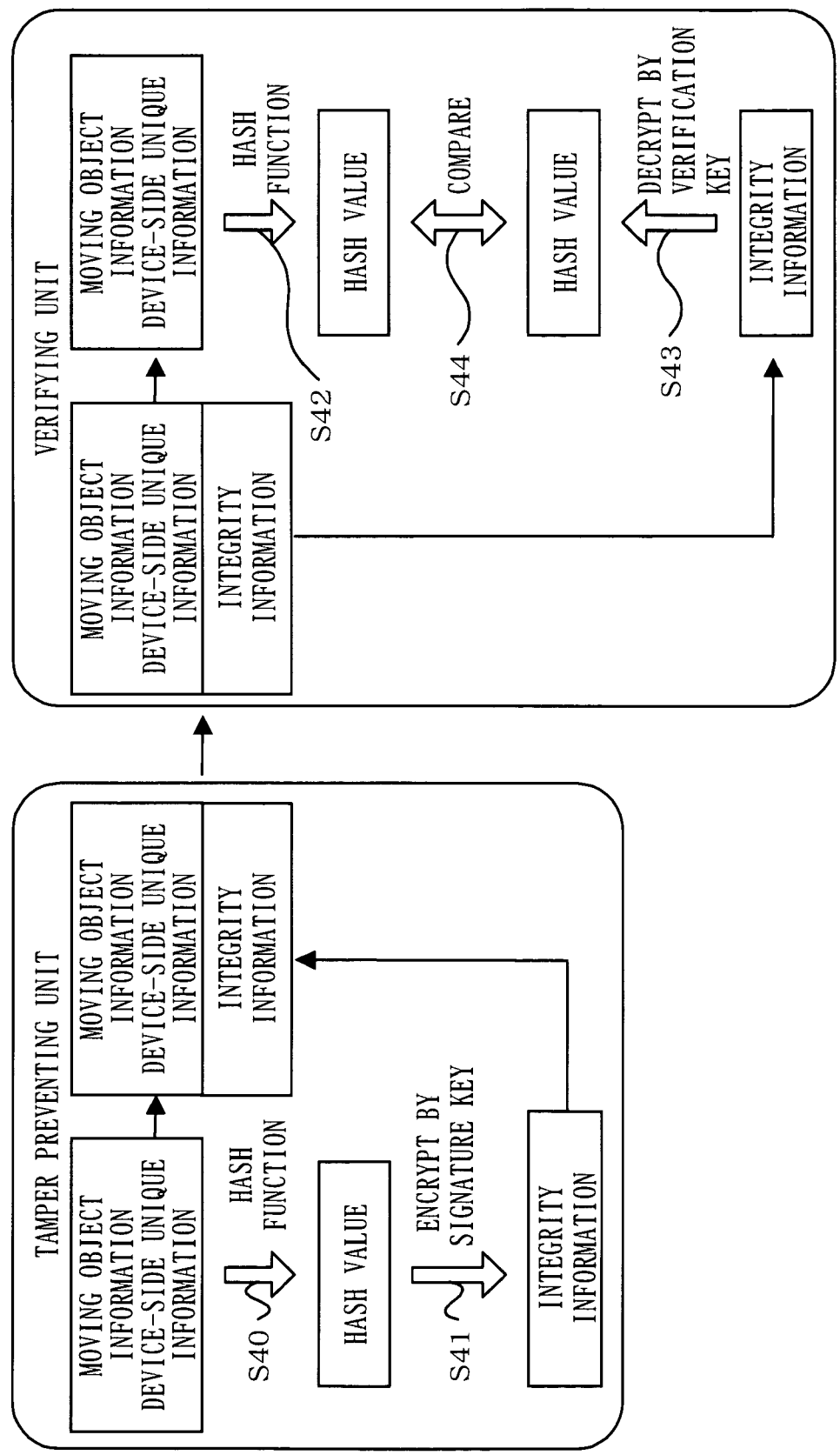
FIG. 15 shows an interaction between the moving object information storage device 3 and a moving object information verification device according to the sixth embodiment.

FIG. 15 shows a flow of the processes of the tamper preventing unit 20 and the verifying unit 601. FIG. 15 shows a case in which a digital signature is used. The digital signature is an example of a case in which "the integrity information" is generated.

(1) Tamper preventing unit 20 inputs "moving object information" and "device-side unique information" to a hash function to obtain a hash value (S40). Then, "the integrity information" is generated by encrypting the hash value using a signature key (S41). The signature key is stored in the storage unit 21 of the moving object information storage device 3 beforehand.

(2) The verifying unit 601 obtains the hash value from "the moving object information" and "the device-side unique information" similarly to the tamper preventing unit 20 (S42).

(3) On the other hand, "the integrity information" is decrypts using a verification key (S43), and the above hash value and the hash value which is a result of decryption are compared (S44).

(4) As a result of the comparison, if the hash values are the same, the verifying unit 601 judges that "the moving object information" is correct information, namely, it is not tampered. If the hash values are different, the verifying unit 601 judges at least either "the moving object information" or "the device-side unique information" is tampered.

In FIG. 15, the tamper preventing unit 20 generates "the integrity information" based on "the moving object information" and "the device-side unique information". Another example which is different from the process by the tamper preventing unit 20 shown in FIG. 15 will be explained. Although the tamper preventing unit 20 uses "the device-side unique information", "the integrity information" can be generated from the moving-object-side unique information" and "the moving object information". In this case, it is a premise that the moving object 1 includes the moving-object-side unique information storage unit 311 as shown in FIG. 8.

In FIG. 15, the tamper preventing unit 20 generates "the integrity information" based on "the moving object information" and "the device-side unique information". Another example which is different from the process by the tamper preventing unit 20 shown in FIG. 15 will be explained. First, in the moving object information storage device 3, the separation preventing unit 302 carries out a comparing/verifying process between "the device-side unique information" and "moving-object-side unique information" shown in FIG. 9. Then, as a result of the verification by the separation preventing unit 302, if it is judged that "the device-side unique information" and "moving-object-side unique information" are the information related to the same moving object, the tamper preventing unit 20 selects and obtains either "the device-side unique information" or "the moving-object-side unique information" as an object to be selected. Subsequently, the tamper preventing unit 20 generates the integrity information based on the obtained object to be selected and the moving object information stored by the moving object information storage unit 32. In this case, since the integrity information is generated after the moving object is judged to be correct, the reliability of moving information can be increased.

As discussed above, it is possible to verify that "moving object information" and "device-side unique information" (or the moving-object-side unique information) is not tampered, which enables to provide a highly reliable moving object information verification device 600 and a highly reliable moving object information guaranteeing system to the service provider.

Here, although FIG. 15 shows an example of using the digital signature, not only the digital signature, but a message authentication code, a digital watermark, a CRC (Cyclic Redundancy Check) can be used for "the integrity information" as long as it can confirm that "moving object information" and "device-side unique information" are not tampered.

Embodiment 7

Figure 16:
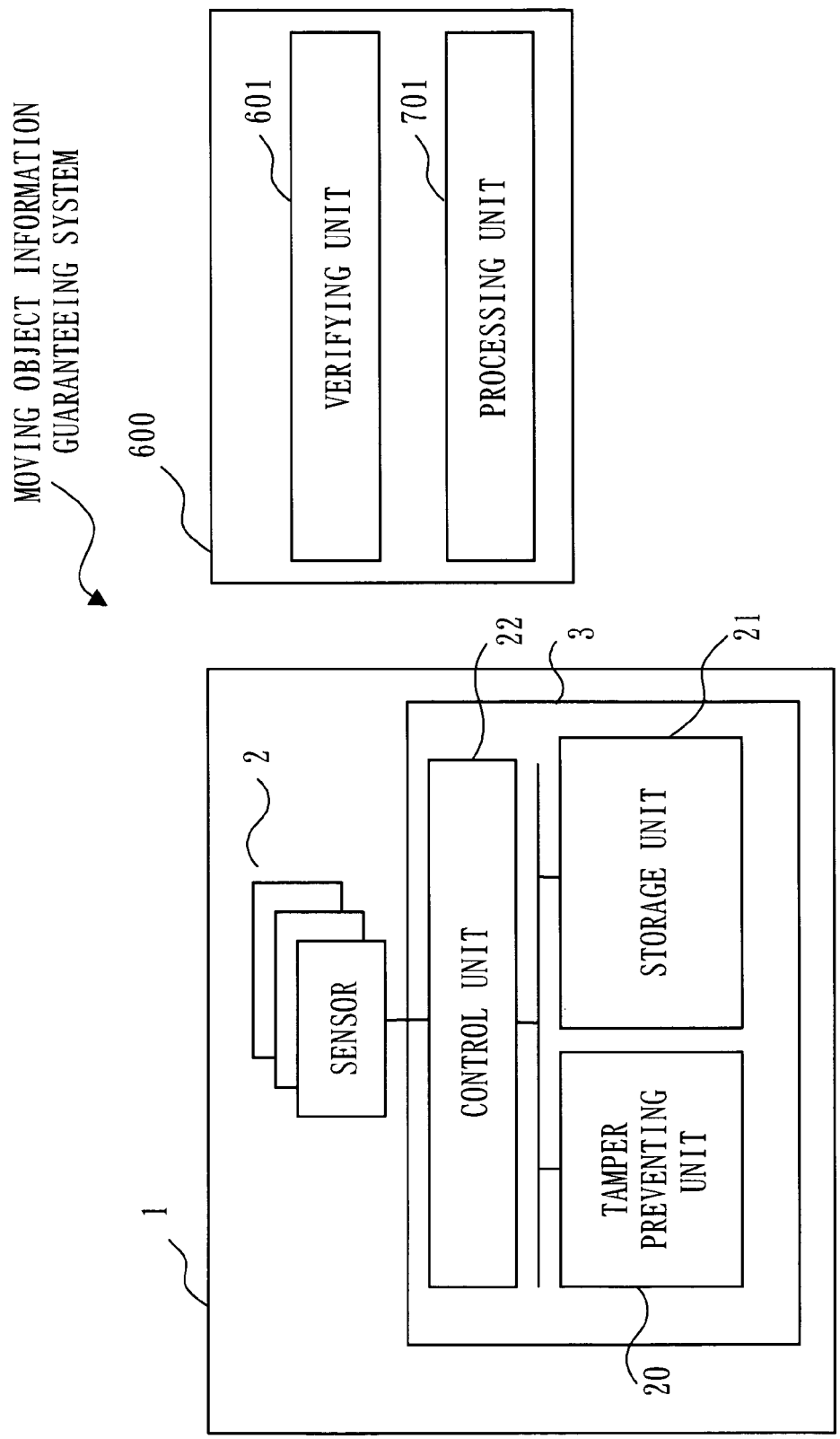
FIG. 16 is a configuration diagram of the moving object information guaranteeing system according to the seventh embodiment.

In the following, the seventh embodiment will be explained by referring to FIG. 16. The seventh embodiment is configured to further include a processing unit 701 in the moving object information verification device 600 of the sixth embodiment. FIG. 16 is a configuration diagram of a moving object information guaranteeing system according to the seventh embodiment. Different from FIG. 14, FIG. 16 further includes the processing unit 701 provided at the moving object information verification device 600.

In FIG. 16, the processing unit 701 processes "the moving object information" based on the verified result by the verifying unit 601. Here, as well as other embodiments, the moving object information storage device 3 can include the separation preventing unit 302.

Next, the operation will be explained.
(1) The operation of the moving object information storage device 3 is similar to the first embodiment or the sixth embodiment. Namely, the moving object information storage device 3 maintains "the moving object information" and generates "the integrity information".
(2) Further, by, for example, the method shown in the sixth embodiment, the service provider confirms that "the moving object information" and "the device-side unique information" are not tampered using "the integrity information" in the verifying unit 601 of the moving object information verification device.
(3) Then, if these information are not tampered, the processing unit 701 processes "the moving object information" and "the device-side unique information". This "process" is considered to be to determine an insurance premium, determine an automobile tax, or to detect traffic violation at the police station, etc based on "the moving object information" and "the device-side unique information".

As discussed above, since the moving object information verification device 600 includes the processing unit 701, after verifying that "the moving object information" and "the device-side unique information" (or "moving-object-side unique information") are not tampered, it is possible to determine a service for the user by reflecting the verified result. Therefore, the service provider can provide detailed service to the user using a highly reliable moving information guaranteeing system.

Embodiment 8

Figure 17:
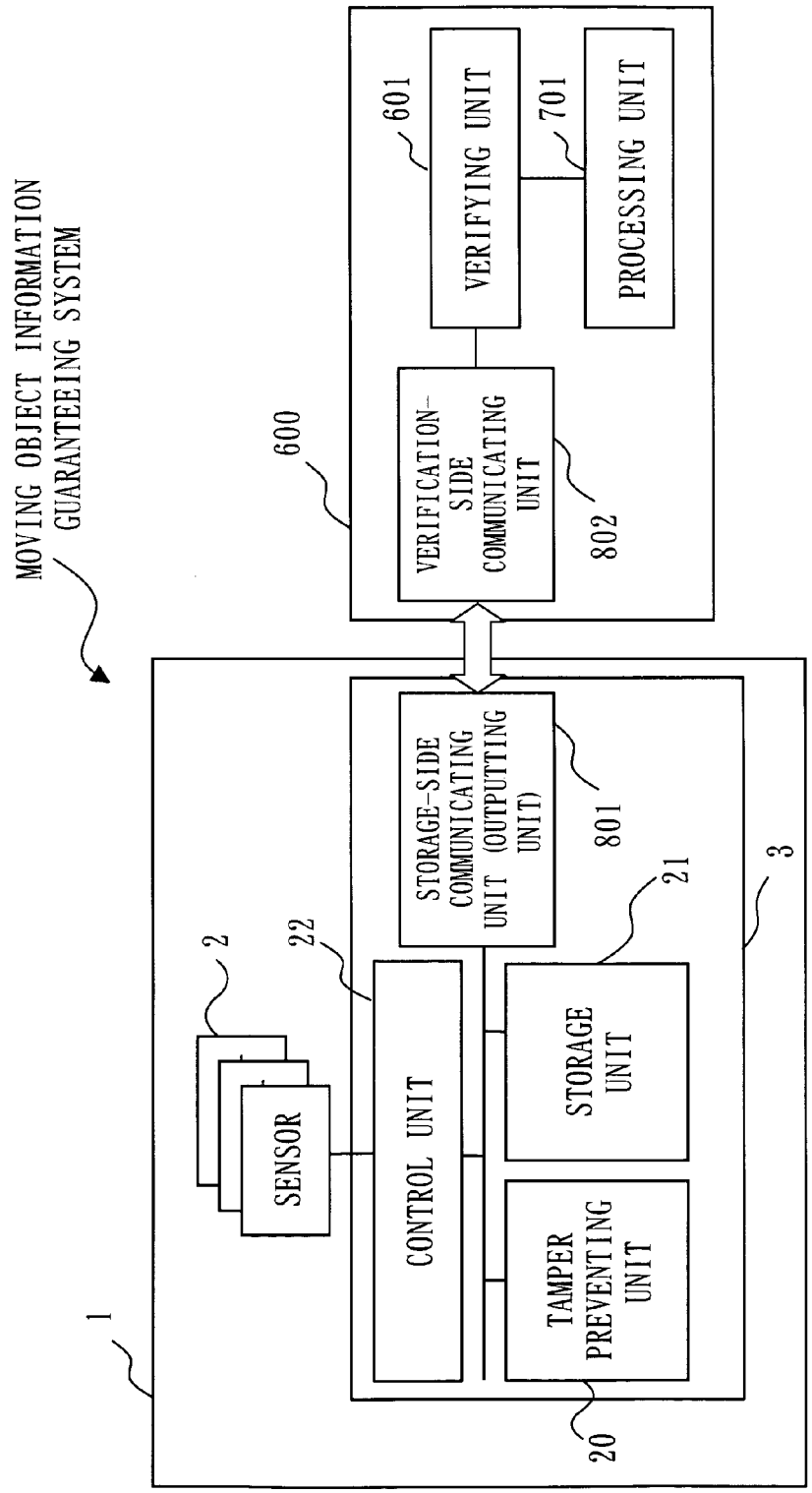
FIG. 17 is a configuration diagram of the moving object information guaranteeing system according to the eighth embodiment.

In the following, the eighth embodiment will be explained by referring to FIGS. 17 and 18. The eighth embodiment is an embodiment in which the moving object information storage device 3 and the moving object information verification device 600 communicate. FIG. 17 is a configuration diagram of a moving object information guaranteeing system according to the eighth embodiment. FIG. 17 is configured to include a storage-side communicating unit 801 (an example of an outputting unit) provided at the moving object information storage device 3 and a verification-side communicating unit 802 provided at the moving object information verification device 600 in FIG. 16 of the seventh embodiment. The storage-side communicating unit 801 sends (outputs) "the moving object information", "the device-side unique information", and "the integrity information". The storage-side communicating unit 801 sends to, for example, the moving object information verification device 600. Here, the storage-side communicating unit 801 carries out communication using wireless/wired LAN, RS232C, Bluetooth (registered trademark), DSRC (Dedicated Short Range Communication), a mobile phone, PHS (registered trademark), etc. The verification-side communicating unit 802 is a communicating unit of the moving object information verification device 600 which communicates with the storage-side communicating unit 801 of the moving object information storage device 3. Here, as well as other embodiments, the moving object information storage device 3 can include the separation preventing unit 302.

Next, the operation of the moving object information guaranteeing system according to the eighth embodiment will be explained by referring to FIG. 18. FIG. 18 is an example of a flow in the case of applying the digital signature which has been discussed in the sixth embodiment to the tamper preventing unit 20 and the verifying unit 601.
(1) The moving object information verification device 600 (the service provider) stores a signature key in the moving object information storage device 3 and maintains a verification key (S30).
(2) The moving object information storage unit 32 of the moving object information storage device 3 records "the moving object information" (S31).
(3) Further, the tamper preventing unit 20 of the moving object information storage device 3 generates "the integrity information" using the signature key at a necessary timing (S32).
(4) Then, the control unit 22 sends "the moving object information", "the device-side unique information", and "the integrity information" to the moving object information verification device 600 (the service provider) via the storage-side communicating unit 801 (S33).
(5) The moving object information verification device 600 of the service provider receives "the moving object information", "the device-side unique information", and "the integrity information" by the verification-side communicating unit 802 (S34).
(6) The verifying unit 601 verifies using the verification key (S35), and then (7) the processing unit 701 processes "the moving object information" and "the device-side unique information" (S36).

Figure 18:
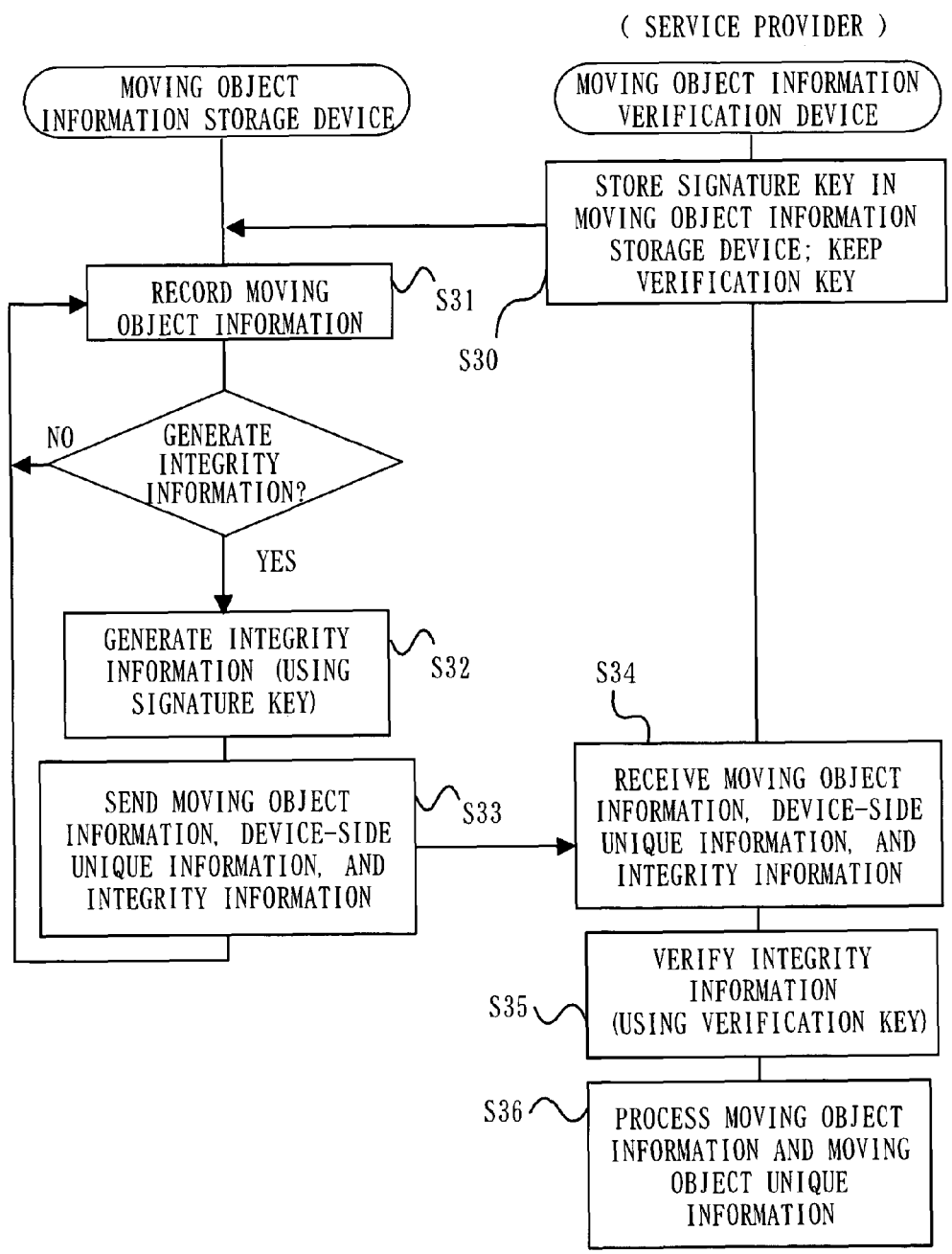
FIG. 18 shows an interaction between the moving object information storage device 3 and the moving object information verification device according to the eighth embodiment.

(8) Here, although in the example of FIG. 18, after "the integrity information" is generated, "the moving object information", "the device-side unique information", and "the integrity information" are sent, it is also possible to send these information together after generating plural "integrity information" as shown in FIG. 4.

As discussed above, "the moving object information", "the moving object unique information", and "the integrity information" are sent to the moving object information verification device 600 by the storage-side communicating unit 801, and the service to the user can be determined after verifying that no tampering is done, so that the service provider can provide detailed service to the user using a highly reliable moving object information guaranteeing system.

Embodiment 9

Figure 19:
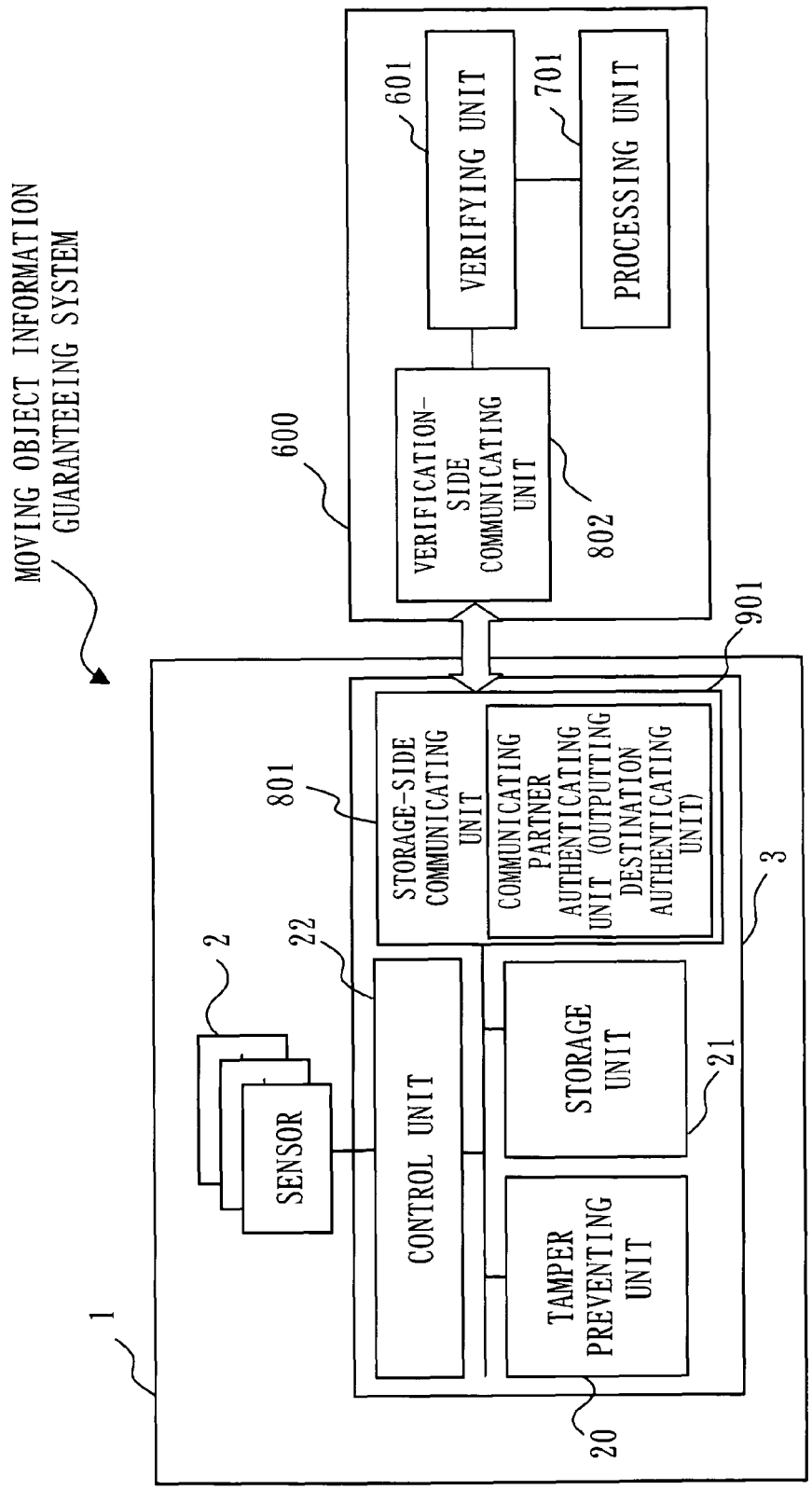
FIG. 19 is a configuration diagram of the moving object information guaranteeing system according to the ninth embodiment.

In the following, the ninth embodiment will be explained by referring to FIG. 19. FIG. 19 is a configuration diagram showing the moving object information guaranteeing system according to the ninth embodiment. The ninth embodiment is configured to include a communicating partner authenticating unit 901 (an outputting destination authenticating unit) which authenticates a communication partner (an outputting destination) provided at the storage-side communicating unit 801 of the moving object information storage device 3, compared with FIG. 17 of the eighth embodiment. Here, as well as other embodiments, the moving object information storage device 3 can include the separation preventing unit 302.

The communicating partner authenticating unit 901 authenticates a sending destination (an outputting destination) when "the moving object information", "the device-side unique information", and "the integrity information" are outputted.

Next, the operation will be explained. The operation of the moving object information storage device 3 is the same as the one of the first embodiment or the eighth embodiment.
(1) Namely, the moving object information storage device 3 maintains "the moving object information" and generates "the integrity information".
(2) Further, before the storage-side communicating unit 801 transfers "the moving object information", "the device-side unique information", and "the integrity information" to the moving object information verification device 600 (the service provider), the communicating partner authenticating unit 901 authenticates the moving object information verification device 600 (the verification-side communicating unit 802) which is a communicating partner. An authentication method can be a method using a random number as shown in FIG. 10.
(3) Further, if the authentication succeeds, the storage-side communicating unit 801 sends "the moving object information", "the device-side unique information", and "the integrity information" to the moving object information verification device 600.
(4) If the authentication fails, transmission of "the moving object information", etc. is not done. For example, the control unit 22 records information for which the authentication fails by the communicating partner authenticating unit 901 in the storage unit 21.
(5) Then, the moving object information verification device 600 carries out verification and process using "the moving object information", "the device-side unique information", and "the integrity information" received by the verification-side communicating unit 802. The subsequent process is the same as the one of the eighth embodiment.

As discussed above, the moving object information storage device 3 sends (outputs) "the moving object information", "the device-side unique information", and "the integrity information" after authenticating the communicating partner (outputting destination) by the storage-side communicating unit 801 and confirming that it a correct communicating partner. Therefore, improper actions such as analyzing communication data can be prevented, so that a highly reliable moving object information storage device 3 or a highly reliable moving object information guaranteeing system can be provided to the service provider.

Embodiment 10

In the following, the tenth embodiment will be explained by referring to FIGS. 20 and 21. The tenth embodiment is an application of the eighth embodiment and further includes an IC card 1001 in the eighth embodiment shown in FIG. 17. According to the tenth embodiment, the storage-side communicating unit 801 communicates with the IC card 1001. Here, the IC card 1001 is an example of portable storage medium which is portable as well as capable of storing information. For example, it can be a portable memory card, or it can be a mobile phone which can store information.

Figure 20:
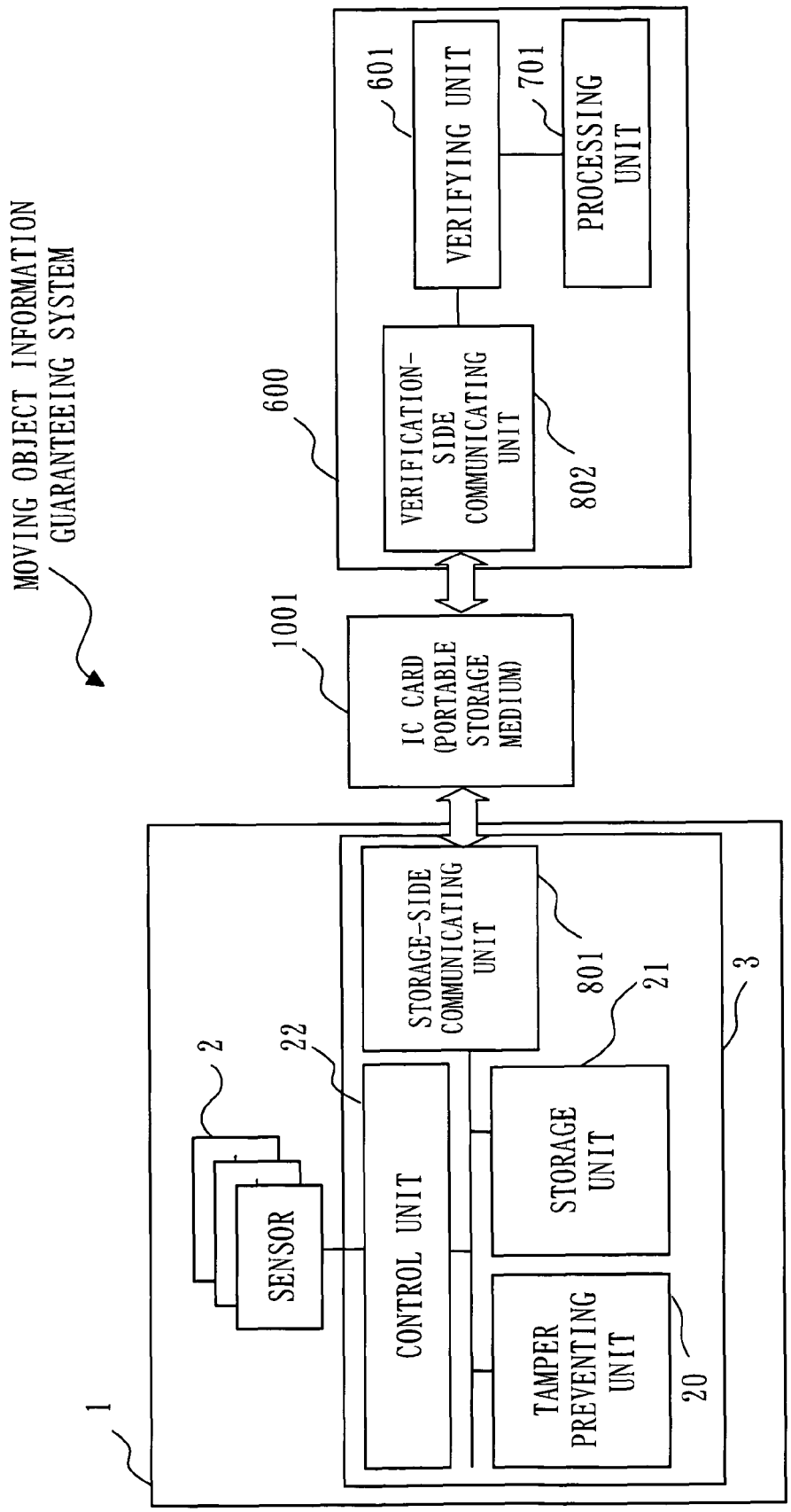
FIG. 20 is a configuration diagram of the moving object information guaranteeing system according to the tenth embodiment.

FIG. 20 is a configuration diagram showing the moving object information guaranteeing system according to the tenth embodiment. Different from FIG. 17 of the eighth embodiment, the tenth embodiment additionally includes the IC card.

The storage-side communicating unit 801 communicates with the IC card 1001 and sends (outputs) "the moving object information", "the device-side unique information", and "the integrity information" to the IC card 1001.

The verification-side communicating unit 802 communicates with the IC card 1001 and reads information inside the IC card 1001.

The IC card 1001 is an exchangeable storage medium.

The verification-side communicating unit 802 can be configured so as to receive "the moving object information", etc. from a PC (Personal Computer) through the Internet or the mobile phone when the IC card 1001 is connected to the PC of the user's home.

In another way, the verification-side communicating unit 802 can be configured so as to receive "the moving object information", etc. from an exclusive terminal through the Internet or the mobile phone when the IC card 1001 is connected to an exclusive terminal provided at an office of the service provider or an exclusive terminal of the service provider provided at a gas station, a convenience store, an automobile dealer, a car maintenance factory. If the Internet is used, in order to form a safe communication channel, such as SSL (Secure Socket Layer) or a virtual private network should be employed.

Here, as well as other embodiments, the moving object information storage device 3 can include the separation preventing unit 302 or the communicating partner authenticating unit 901. In such a case, the communicating partner authenticating unit 901 authenticates the IC card 1001.

Next, the operation will be explained by referring to FIG. 21. FIG. 21 is an example of a flow in the case of applying the digital signature shown in the sixth embodiment to the tamper preventing unit 20 and the verifying unit 601.

(1) The moving object information verification device 600 (the service provider) stores the signature key in the moving object information storage device 3 and maintains the verification key.
(2) The moving object information storage unit 32 of the moving object information storage device 3 records "the moving object information".
(3) The tamper preventing unit 20 generates "the integrity information" using the signature key at a necessary timing.
(4) Then, the storage-side communicating unit 801 sends "the moving object information", "the device-side unique information", and "the integrity information" to the IC card 1001 (S33).
(5) These information is recorded in the IC card 1001 (S40).
(6) The information inside the IC card 1001 is read by the verification-side communicating unit 802 (S34).
(7) After the verifying unit 601 of the moving object information verification device 600 verifies using the verification key, the processing unit 701 processes "the moving object information" and "the device-side unique information".

Figure 21:
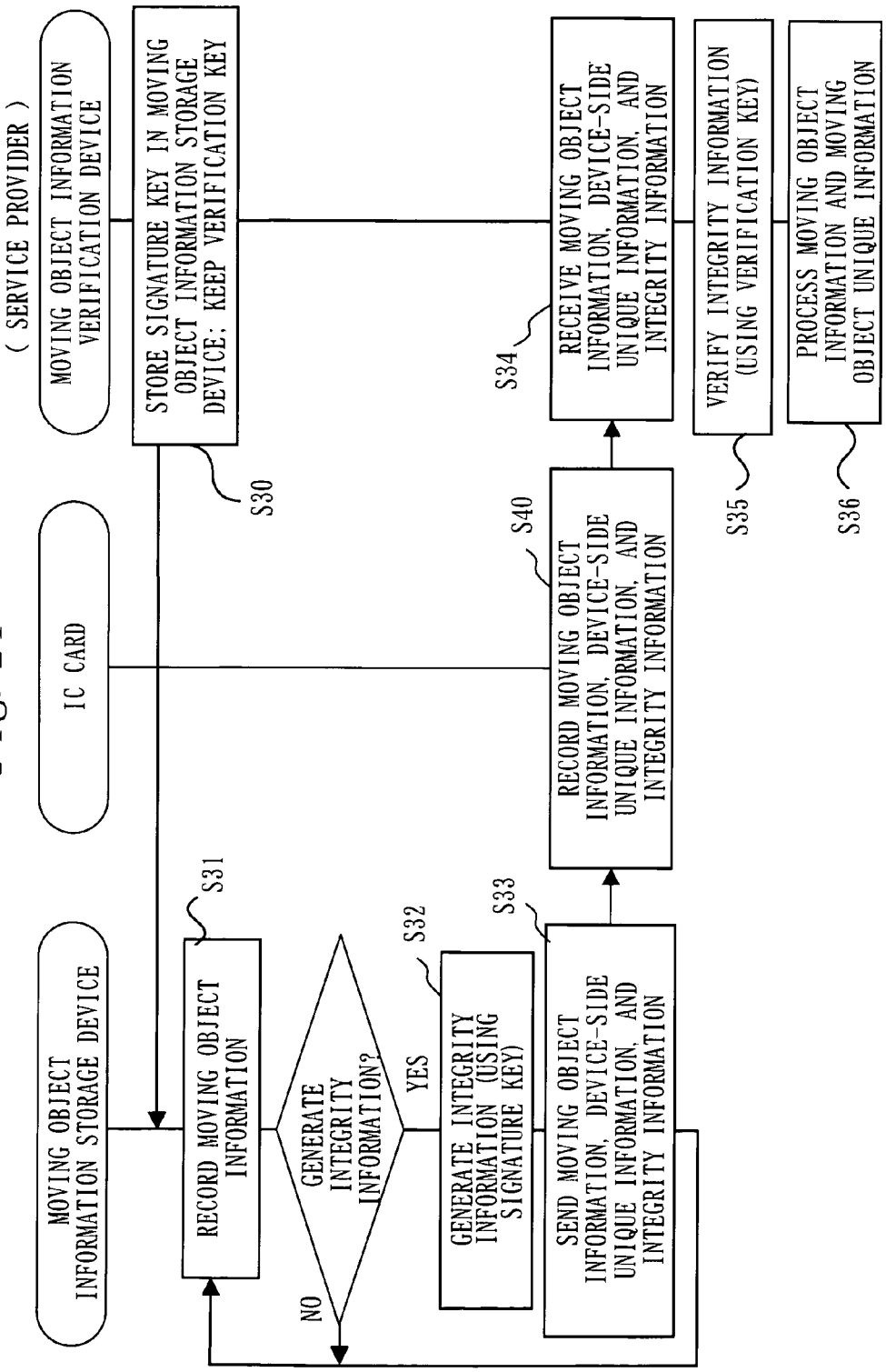
FIG. 21 shows an interaction between the moving object information storage device 3 and the moving object information verification device according to the tenth embodiment.

Although in an example of FIG. 21, after "integrity information" is generated, "the moving object information", "the device-side unique information", and "the integrity information" are sent, these information can be sent together after plural "integrity information" are generated as shown in FIG. 4.

As discussed above, by using the IC card 1001, it is possible to construct the system easily.

Embodiment 11

In the following, the eleventh embodiment will be explained by referring to FIG. 22. A system configuration is the same as the one shown in FIG. 17 of the eighth embodiment. Here, as well as other embodiments, the moving object information storage device 3 can include the separation preventing unit 302 or the communicating partner authenticating unit 901.

The eleventh embodiment is an embodiment in which the storage-side communicating unit 801 sends (outputs) "the moving object information", "the device-side unique information", and "the integrity information" at a prescribed time interval.

As "prescribed time interval", "time interval" is defined as
first, "moving object information a", "integrity information a", and "device-side unique information a" are sent;
next, "moving object information b", "integrity information b", and "device-side unique information a" are sent; and
then, "moving object information c", "integrity information c", and "device-side unique information a" are sent, so that the storage-side communicating unit 801 possibly always does transmission without a halt. Here, only "device-side unique information a" is not changed, but "device-side unique information a" is information to specify the moving object, which is usually unchanged.

Figure 22:
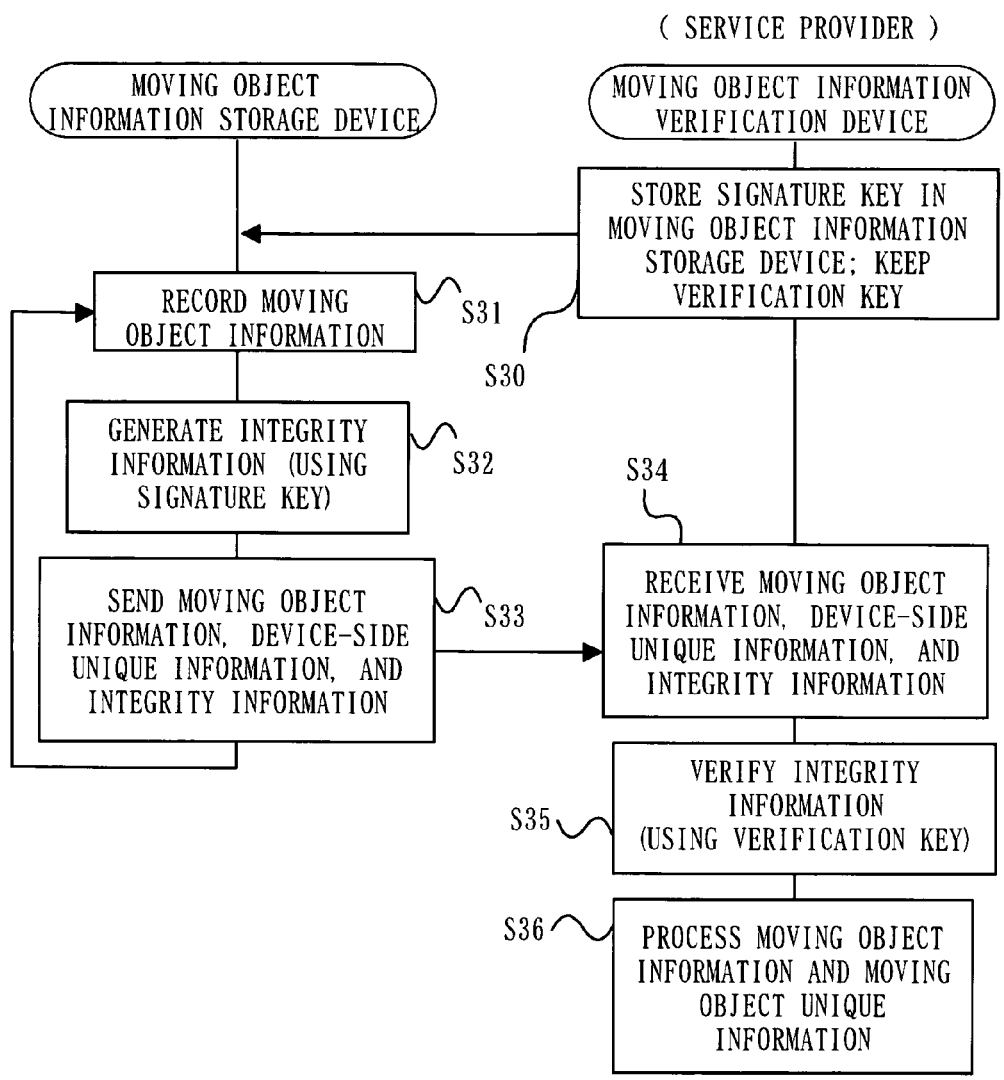
FIG. 22 shows an interaction between the moving object information storage device 3 and the moving object information verification device according to the eleventh embodiment.

FIG. 22 is an example of a flow in the case of always sending "the moving object information", etc. when the digital signature shown in the sixth embodiment is applied to the tamper preventing unit 20 and the verifying unit 601.
(1) The moving object information verification device 600 (the service provider) stores the signature key in the moving object information storage device 3 and maintains the verification key (S30).
(2) The moving object information storage unit 32 of the moving object information storage device 3 records "the moving object information" (S31).
(3) The tamper preventing unit 20 of the moving object information storage device 3 generates "the integrity information" using the signature key (S32).
(4) Further, the storage-side communicating unit 801 sends "the moving object information", "the device-side unique information", and "the integrity information" to the moving object information verification device 600 (the service provider) (S33).
(5) The moving object information storage device 3 repeats this process. The moving object information verification device 600 receives "the moving object information", "the device-side unique information", and "the integrity information" by the verification-side communicating unit 802 (S34).
(6) The verifying unit 601 verifies using the verification key (S35), and
(7) then, the processing unit 701 processes "the moving object information" and "the device-side unique information" (S36).

Here, needless to say, the above can be implemented using the same configuration with FIG. 19 which includes the communicating partner authenticating unit 901. In such a case, the communicating destination should be authenticated when the communication is started or when the communication channel is disconnected and connected again.

As discussed above, since the storage-side communicating unit 801 always sends "the moving object information", "the device-side unique information", and "the integrity information" to the moving object information verification device 600 (the service provider) at a time interval of transmission, the memory capacity of the storage unit 21 can be reduced.

Embodiment 12

In the following, the twelfth embodiment will be explained by referring to FIG. 23. In the above embodiments, the integrity of the information outputted from the moving object information storage device 3 is verified; however, it is not effective when the sensors, 2a, etc. provided at the moving object 1 are tampered. Then, the twelfth embodiment will show an embodiment in which the sensors 2a, etc. are confirmed to be correct.

Figure 23:
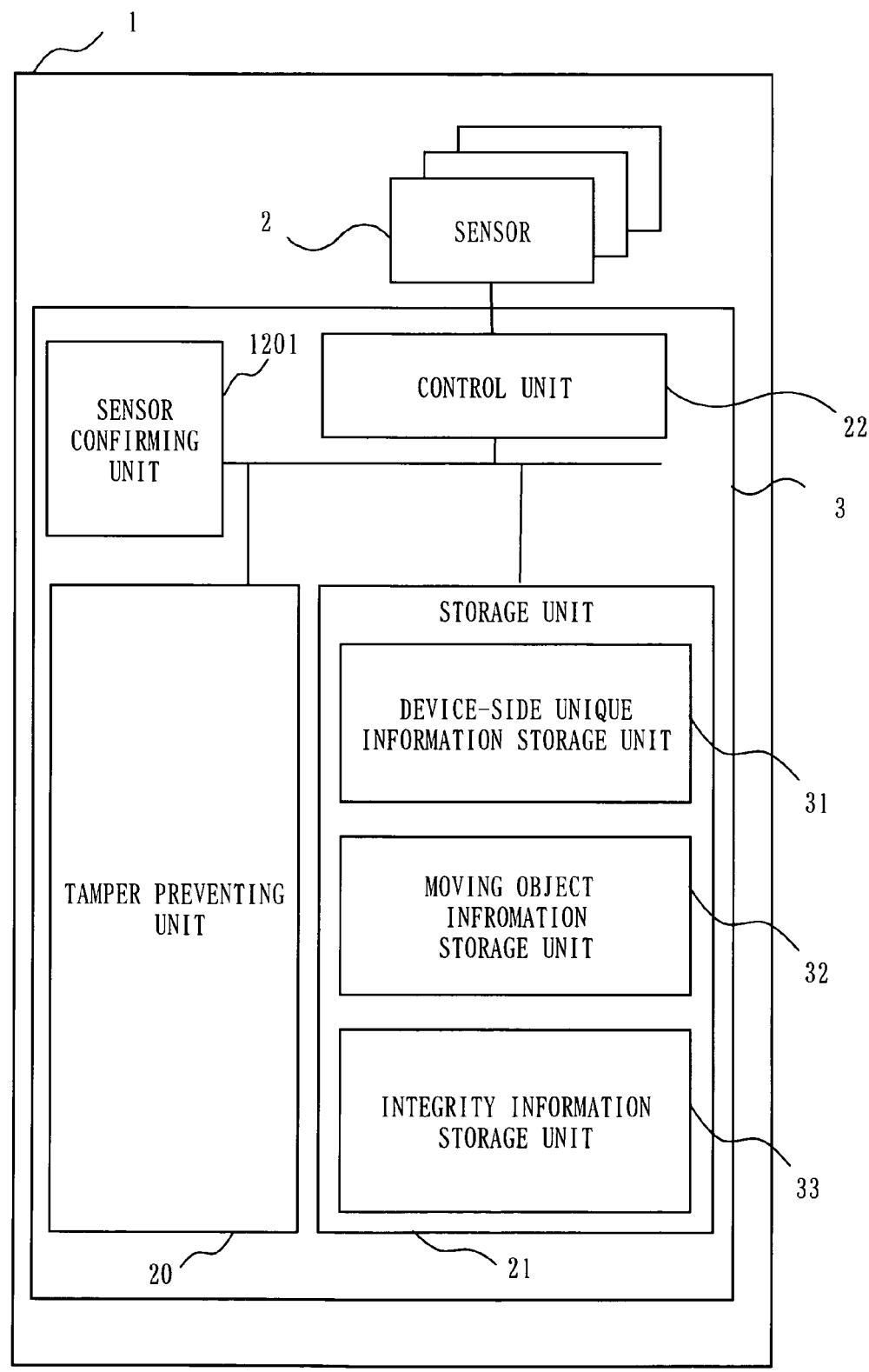
FIG. 23 is a configuration diagram of the moving object information guaranteeing system according to the twelfth embodiment.

FIG. 23 is a configuration diagram of the moving object information storage device 3 in the moving object information guaranteeing system in the case of authenticating the sensors. FIG. 23 is configured to include a sensor confirming unit 1201 in addition to FIG. 2 showing the first embodiment. Here, as well as other embodiments, the moving object information storage device 3 can include the separation preventing unit 302, the storage-side communicating unit 801, the communicating partner authenticating unit 901, etc.

The sensor confirming unit 1201 is provided at the moving object information storage device 3 and has a function to confirm the sensors 2a, etc. connected to the moving object information storage device 3. In FIG. 23, it is configured so that the sensor confirming unit 1201 confirms the sensors 2a, etc. through the control unit 22; however another configuration can be done so as to confirm the sensors 2a, etc. by directly connecting to them.

Next, the operation will be explained.
(1) The sensor confirming unit 1201 confirms the sensor 2a, the sensor 2b, the sensor 2c, etc. connected to the moving object information storage device 3 at a necessary timing. The same confirmation method can be taken as a method to confirm the moving object as shown in FIG. 9 or FIG. 10. Namely, a method can be the one shown in FIG. 9 using "sensor unique information" kept by the sensors 2a, etc. or can be the one shown in FIG. 10 using random numbers.

(2) As a result of confirmation by the sensor confirming unit 1201, if the sensors 2a, etc. are correct, the control unit 22 records "the moving object information" in the moving object information storage unit 32. The above process is done by the moving object information storage device 3 for all sensors connected.

The timing for confirming the sensors can be at the time of starting the engine, at a predetermined or random time interval, or at the time of extracting "the moving object information". When no response is obtained or the confirmed result shows the sensors are wrong, the process depends on the service provider; however, it is also possible to cancel recording "the moving object information". Or that no response is obtained can be recorded in the storage unit 21 and send to the moving object information verification device 600 with "the device-side unique information". Or that the sensors are wrong is recorded in the storage unit 21 and send to the moving object information verification device 600 with "the device-side unique information".

As discussed above, in the moving object information storage device 3, the sensor confirming unit 1201 confirms that the connected sensors are correct or not, which prevents incorrect action to the sensors, and further increases reliability of information.

Embodiment 13

In the following, the thirteenth embodiment will be explained by referring to FIGS. 24 and 25. In the above embodiments, in the moving object information storage device 3, all of "the moving objection information" are recorded in the moving object information storage unit 32. Namely, if the moving object information is velocity information, any velocity is recorded. The thirteenth embodiment is an embodiment, in which conditions are prescribed for the moving object information to be stored, and the moving object information should be recorded only when it matches the prescribed conditions.

Figure 24:
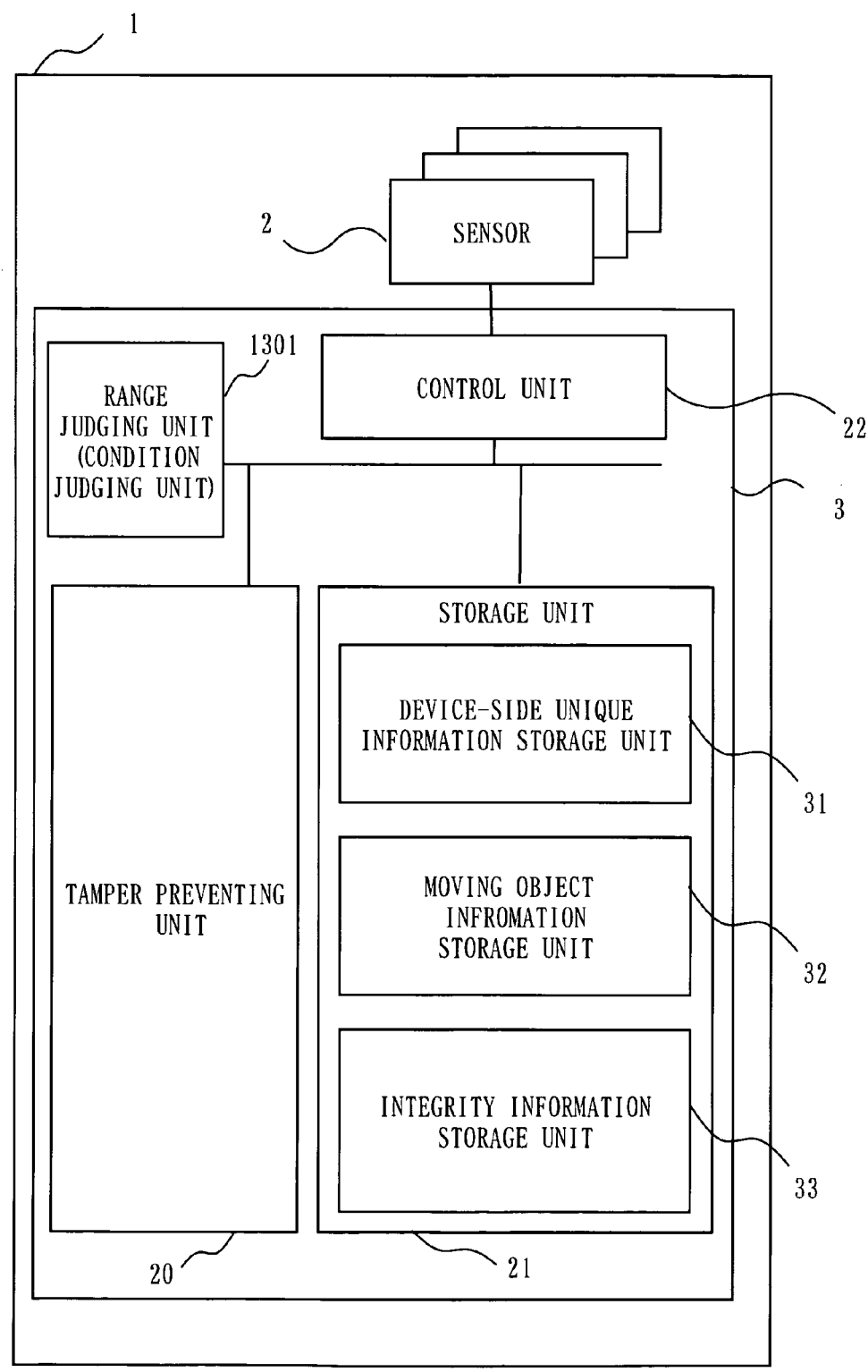
FIG. 24 is a configuration diagram of the moving object information guaranteeing system according to the thirteenth embodiment.
Figure 25:
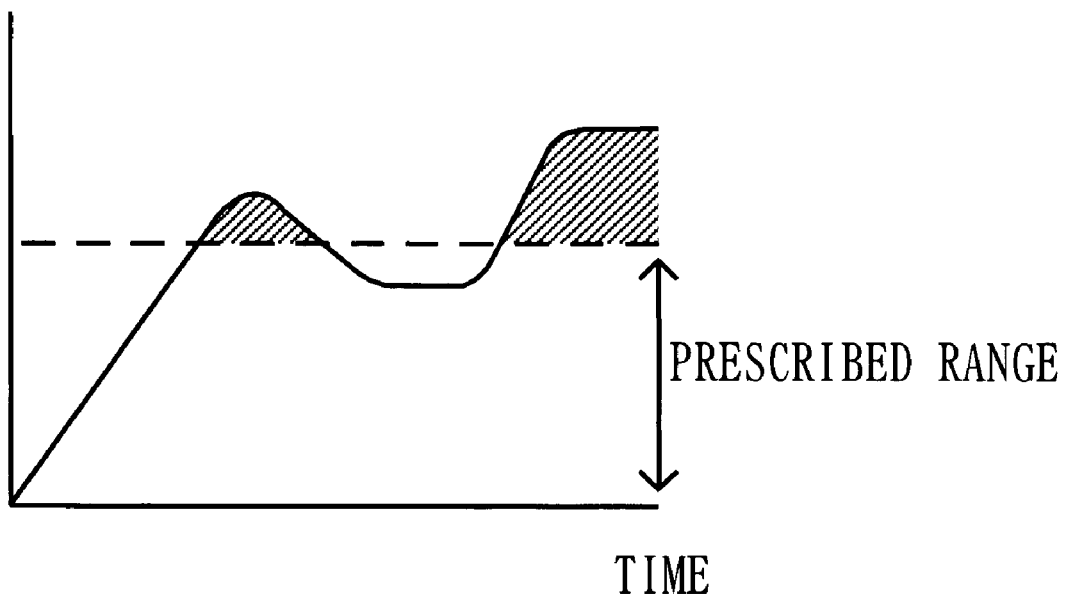
FIG. 25 is a diagram explaining the operation of a range judging unit according to the thirteenth embodiment.

FIG. 24 is a configuration diagram of the moving object information storage device 3 according to the thirteenth embodiment. FIG. 24 is configured to include a range judging unit 1301 (a condition judging unit) in FIG. 2 of the first embodiment. Here, as well as other embodiments, the moving object information storage device 3 can include the separation preventing unit 302, the storage-side communicating unit 801, the communicating partner authenticating unit 901, the sensor confirming unit 1201, etc.

In the figure, the range judging unit 1301 judges if "the moving object information" matches "the prescribed conditions" or not, and if it is judged to match, the moving object information is stored in the moving object information storage unit 32 by the range judging unit 1301. For example, the range judging unit 1301 records "the moving object information" when it exceeds the prescribed range. The range judging unit 1301 judges if it is within "the prescribed range" (an example of conditions) or not. Here, although the range judging unit 1301 is connected to the control unit 22, another configuration can be done, in which the range judging unit 1301 is provided between the sensors and the control unit 22, outputs "the moving object information" to the control unit 22 when it is outside the range (exceeds the range), and does not output when it is within the range.

Next, the operation will be explained by referring to FIG. 25. FIG. 25 shows relation between "the moving object information" and time passage using a velocity sensor as an example of sensors and the velocity information detected by this velocity sensor as an example of the moving object information. "The moving object information" inputted to the moving object information storage device 3 or generated is judged if it is within the range set by the range judging unit 1301. If it is outside the range, corresponding "moving object information" (for example, the above velocity information) is recorded. In FIG. 25, if the prescribed range is up to a broken line, the velocity information corresponding to a shaded part which exceeds the broken line should be recorded according to the thirteenth embodiment.

Further, for another example, when the number of sudden startings exceeds the prescribed number, such a fact can be recorded as "the moving object information".

As discussed above, in the moving object information storage device 3 according to the thirteenth embodiment, the range judging unit records "the moving object information" which exceeds the prescribed range, but does not record "the moving object information" if it is within the range, so that the memory capacity of the moving object information storage unit can be reduced.

Embodiment 14

In the following, the fourteenth embodiment will be explained by referring to FIGS. 26 through 28. In the above embodiments, the user can receive only one service. The fourteenth embodiment will show an embodiment in which plural services can be obtained.

Figure 26:
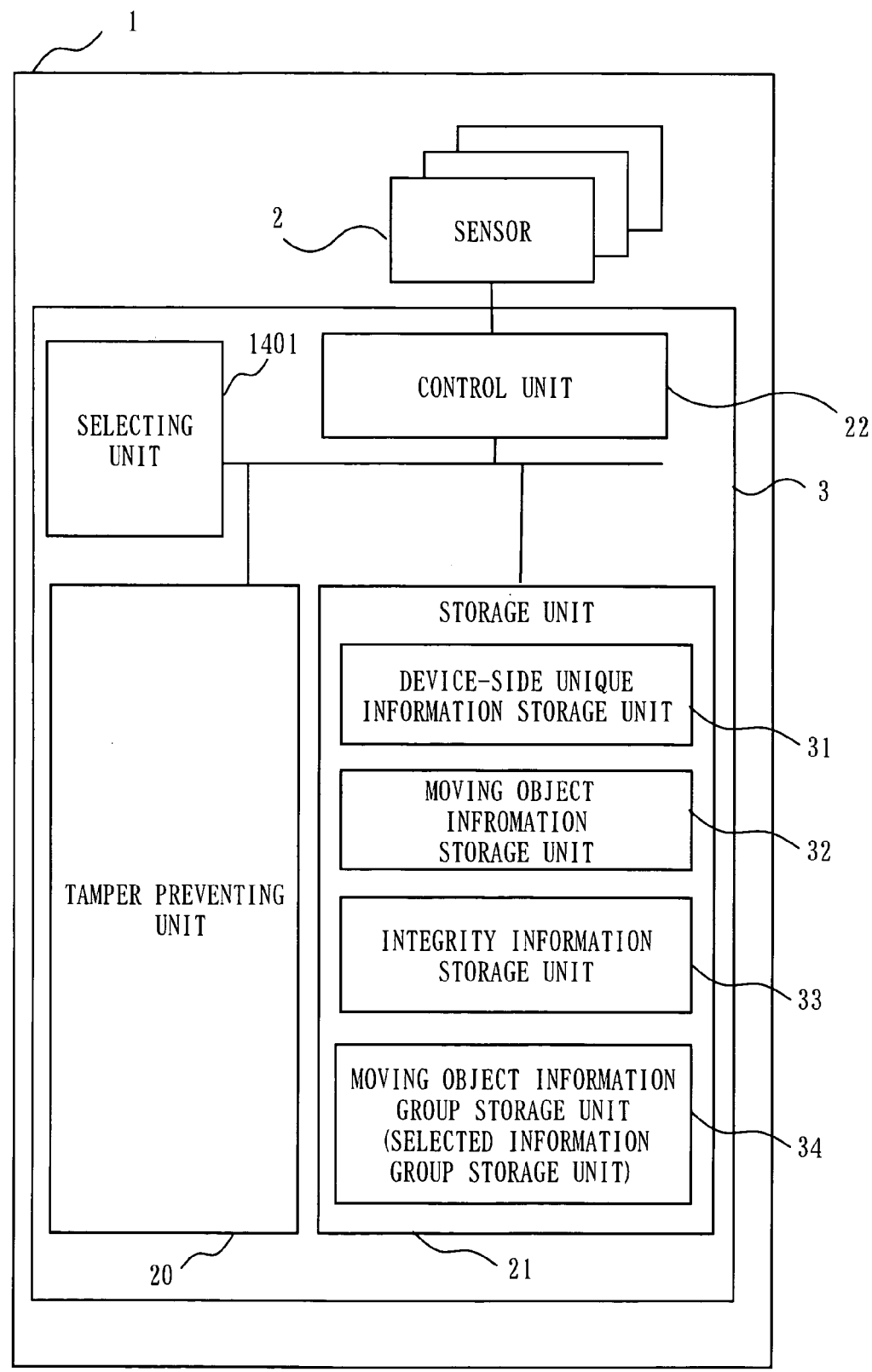
FIG. 26 is a configuration diagram of the moving object information guaranteeing system according to the fourteenth embodiment.

FIG. 26 is a configuration diagram showing the moving object information storage device 3 in the moving object information guaranteeing system according to the fourteenth embodiment. FIG. 26 is configured to include a selecting unit 1401 in the moving object information storage device 3 of FIG. 2. Here, as well as other embodiments, the moving object information storage device 3 can include the separation preventing unit 302, the storage-side communicating unit 801, the communicating partner authenticating unit 901, the sensor confirming unit 1201, the range judging unit 1301, etc.

In FIG. 26, the selecting unit 1401 of the moving object information storage device 3 manages plural service information for the service provider and generates "moving object information" corresponding to each of them.

In FIG. 26, the selecting unit 1401 inputs respective moving object information based on respective sensors, and selects at least one moving object information out of the respective moving object information based on prescribed conditions as service information. A moving object information group storage unit 34 stores a group of one or plurality of the moving object information selected by the selecting unit 1401 as a group of moving object information. The tamper preventing unit 20 obtains specifying information which can specify the moving object, and generates "the integrity information" used for verifying if at least either the specifying information or the moving object information included in the moving object information group is tampered or not based on the obtained specifying information and the moving object information group stored by the moving object information group storage unit. The integrity information storage unit 33 stores the integrity information generated by the tamper preventing unit 20.

Next, concrete operation of the moving object information storage device 3 will be explained by referring to FIG. 27. FIG. 27 is a sequence diagram showing interaction between the moving object information storage device 3 and each of moving object information verification devices 600A and 600B. Here, each of the moving object information verification devices 600A and 600B is the same as the moving object information verification device 600 as shown in, for example, the sixth embodiment. FIG. 27 is an example of a flow in the case of applying the digital signature shown in the sixth embodiment to the tamper preventing unit 20 and the verifying unit 601. In the example of FIG. 27, a service provider A and a service provider B are shown as plural service providers.

(1) The service provider A (the moving object information verification device 600A) stores a signature key A and service information A showing "moving object information" to be used in the moving object information storage device 3 and maintains the verification key A. (S50).

(2) The similar process is done by the service provider B (the moving object information verification device 600B) (S51).

Figures 28, 29:
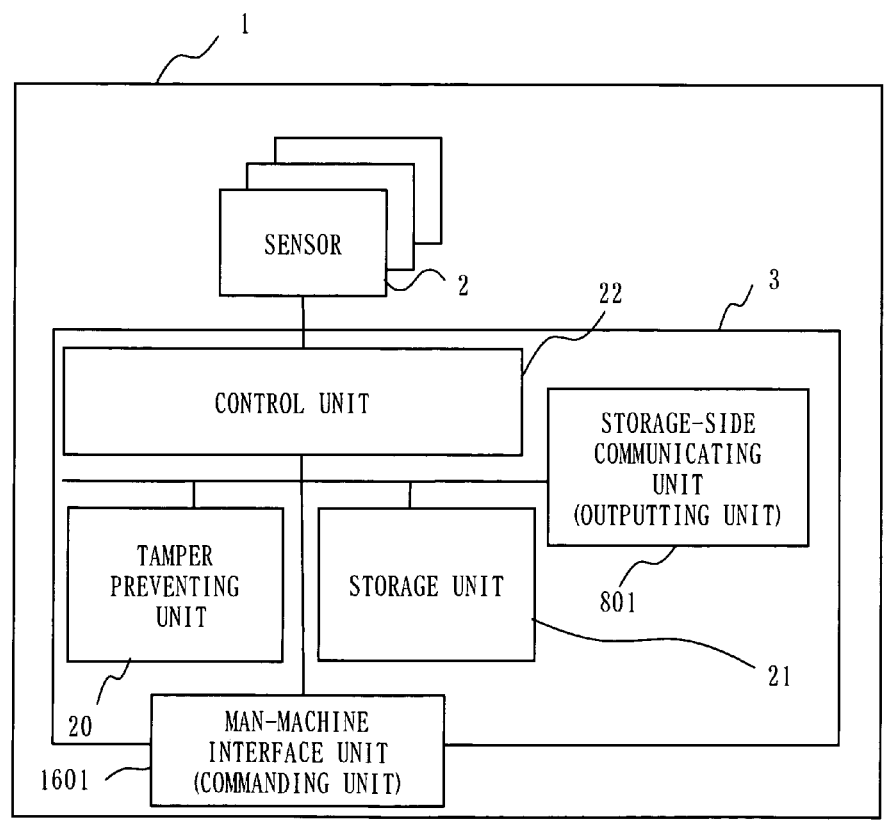
FIG. 28 shows an example of service management table according to the fourteenth embodiment.
FIG. 29 is a configuration diagram of the moving object information guaranteeing system according to the sixteenth embodiment.

(3) The selecting unit 1401 of the moving object information storage device 3 generates, for example, a service management table 1402 shown in FIG. 28 based on each of the service information stored. In the example of FIG. 28, "1" shows to use and "0" shows not to use. Namely, "the moving object information X" and "the moving object information Y" are used for the service A, and for the service B, "the moving object information X" and "the moving object information Z" are used. Further, the selecting unit 1401 also manages the relation between the stored signature key and corresponding services.

(4) Then, using each of the moving object information and the service management table 1402, the selecting unit 1401 selects "the moving object information" necessary for each service and generates "moving object information group A" (selected information group) and "moving object information B" (selected information group) (S52)

(5) The selected "respective moving object information groups" are recorded in the moving object information group storage unit 34 (selected information group storage unit) of the storage unit 21.

(6) The tamper preventing unit 20 generates "integrity information" based on "the moving object information group" and "the device-side unique information" using the corresponding signature key at a necessary timing (S53). At this time, since the selecting unit 1401 also manages the relation between the stored signature key and corresponding service, the tamper preventing unit 20 can generate "the integrity information" using the corresponding signature key.

(7) Then, the moving object information storage device 3 outputs "the moving object information group", "the device-side unique information", and "the integrity information" according to the service provider (the moving object information verification device).

Figure 27:
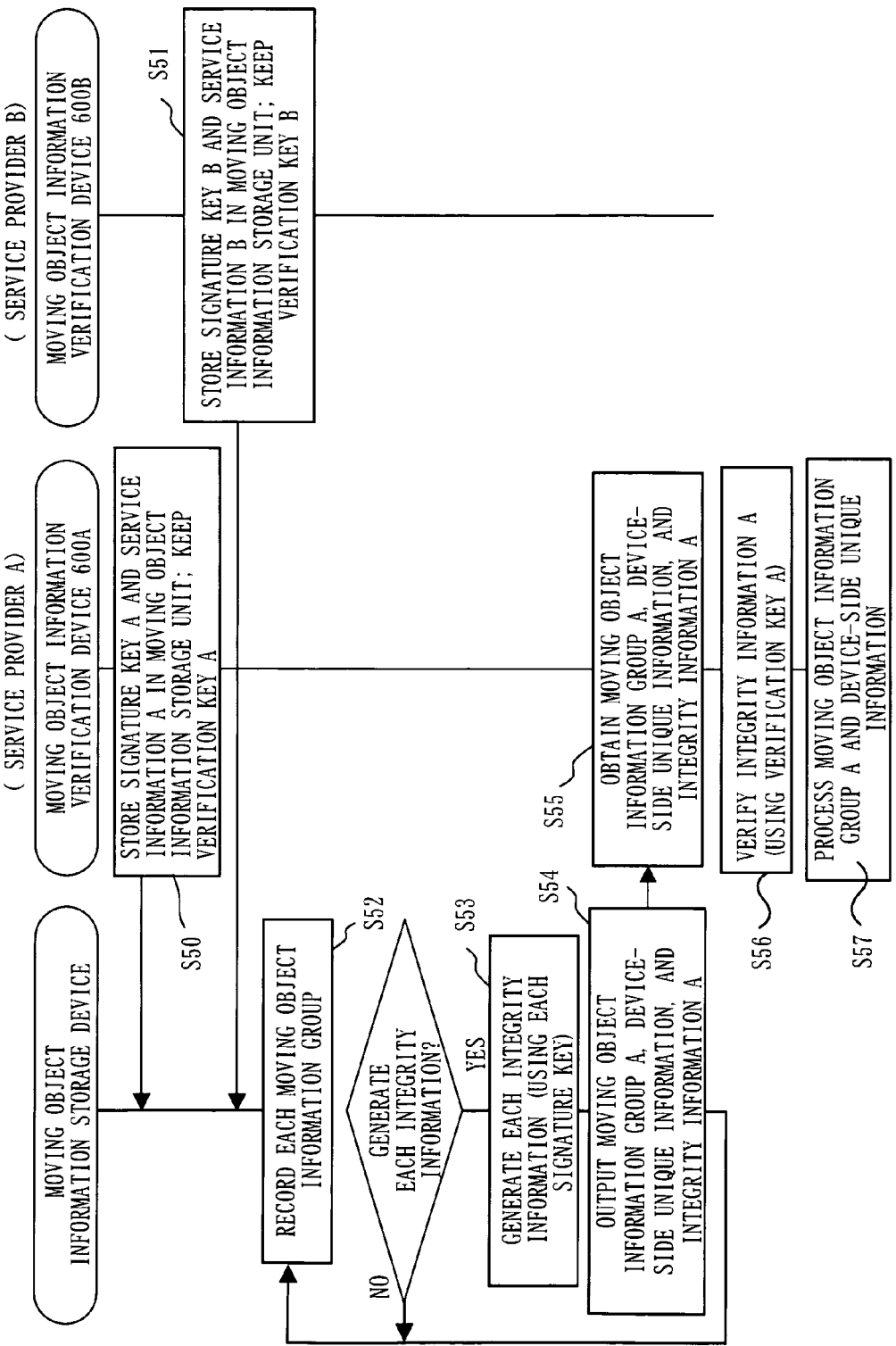
FIG. 27 shows an interaction between the moving object information storage device 3 and each of the moving object information verification devices according to the fourteenth embodiment.

(8) In FIG. 27, "the moving object information group A", "the device-side unique information", and "the integrity information A" are outputted (S54).

(9) The moving object information verification device 600A of the service provider A obtains "the moving object information group", "the device-side unique information", and "the integrity information", verifies and processes them. For example, the moving object information verification device 600A of the service provider A obtains "the moving object information group A", "the device-side unique information", and "the integrity information A" (S55), verifies (S56), and processes (S57).

Here, in this example, after "the integrity information" is generated, "the moving object information", "the device-side unique information", and "the integrity information" are outputted; however, after "the integrity information" is generated before it is recorded in the integrity information storage unit 33 of the storage unit 21, the information can be outputted together, or "the moving object information group" and "the integrity information" can be always outputted as FIG. 22 showing the eleventh embodiment.

As discussed above, since the moving object information storage device 3 can manage/record "the moving object information" corresponding to plural services, plural services can be received using one moving object information storage device 3, and further, services can be added.

Embodiment 15

The moving object information storage device 3 of the fourteenth embodiment records plural "moving object information" corresponding to the services. The fifteenth embodiment will show an embodiment in which "the moving object information group" is generated corresponding to plural services by selecting from "the moving object information" recorded.

The moving object information storage device 3 and a group of sensors 2 in the moving object information guaranteeing system in such a case can be accomplished by the same configuration as FIG. 26 of the fourteenth embodiment. Here, as well as other embodiments, the moving object information storage device 3 can include the separation preventing unit 302, the storage-side communicating unit 801, the communicating partner authenticating unit 901, the sensor confirming unit 1201, the range judging unit 1301, and the selecting unit 1401.

Next, the operation will be explained.

(1) The moving object information storage device 3 records all "moving object information" in the moving object information storage unit 32 of the storage unit 21.

(2) And, when outputting "the moving object information" to the outside of the moving object information storage device 3, the selecting unit 1401 refers to the service information and selects necessary type of "the moving object information" from the moving object information storage unit 32.

(3) The tamper preventing unit 20 generates "the integrity information" from "the moving object information group (selected information group)" composed of the moving object information selected by the selecting unit 1401 and "the device-side unique information (specifying information)".

(4) At this time, since the selecting unit 1401 also manages the relation between the stored signature keys and the corresponding services, the tamper preventing unit 20 can use the corresponding signature key for generating "the integrity information".

(5) Then, the moving object information verification device 600 of the service provider obtains the selected "moving object information group", "device-side unique information" and its "integrity information", and verifies/processes them.

Like this, since the selecting unit 1401 selects and sends the necessary information from the recorded "moving object information", the moving object information storage device 3 of the fifteenth embodiment can deal with plural services, and at the same time can handle plural services with less memory capacity. Further, services can be added.

Embodiment 16

In the following, the sixteenth embodiment will be explained by referring to FIG. 29. In the above embodiments, it is not possible to output "the moving object information" from the moving object information storage device 3 after receiving the user's approval. For example, in the eighth embodiment, communication cost is necessary if a mobile phone is used for the communication. Therefore, it is important to obtain the user's approval at the time of sending the information. Then, the sixteenth embodiment will show an embodiment in which an approval from the user is obtained when outputting "the moving object information".

FIG. 29 is a configuration diagram of the moving object information storage device 3 of the moving object information guaranteeing system according to the sixteenth embodiment. FIG. 29 is configured to include a man-machine interface unit 1601 (an example of a commanding unit) in the moving object information storage device 3 of FIG. 20 of the first embodiment. Here, as well as other embodiments, the moving object information storage device 3 can include the separation preventing unit 302, the storage-side communicating unit 801, the communicating partner authenticating unit 901, the sensor confirming unit 1201, etc.

The man-machine interface unit 1601 provides the user with an operation of the moving object information storage device 3 and responds with the processed result, etc. The man-machine interface unit 1601 receives the operation by an operator and commands the storage-side communicating unit 801 to send (output) based on the operation received. The storage-side communicating unit 801 outputs "the moving object information", "the device-side unique information", and "the integrity information" in response to the command from the man-machine interface unit 1601.

Concretely, in such a configuration, when it is necessary to output "the moving object information", the man-machine interface unit 1601 receives an outputting command from the user by the prescribed operation. Receiving the outputting command from the user, the man-machine interface unit 1601 commands the storage-side communicating unit 801 to output. When the output is commanded by the man-machine interface unit 1601, the storage-side communicating unit 801 outputs the recorded "moving object information", "device-side unique information" and "integrity information".

Further, another configuration can be done so that the man-machine interface unit 1601 generates and outputs "the integrity information" from "the moving object information" and "the device-side unique information" after the outputting command is inputted from the user. Here, the timing of outputting "the moving object information" can be recommended to the user through the man-machine interface unit 1601 by judgment of the moving object information storage device 3 from a request of the service provider to the user or from the remaining memory capacity of the storage unit 21.

Like this, it is possible to obtain the user's approval at the time of outputting, so that the service provider can obtain "the moving object information" at the cost which has been approved by the user.

Embodiment 17

In the following, the seventeenth embodiment will be explained by referring to FIGS. 30 and 31. In the above embodiments, "the moving object information" may be outputted from the moving object information storage device 3 by the third party other than the correct user or the service provider. For example, in the tenth embodiment, "the moving object information" might be extracted from the moving object information storage device 3 using the IC card held by the third party, and the correct user might not be able to receive the service. Further, in the sixteenth embodiment, the third party might transmit "the moving object information" and "the integrity information" at the discretion of the third party. Therefore, the seventeenth embodiment will show an embodiment in which the user or service provider is authenticated as correct at the time of outputting "the moving object information".

Figure 30:
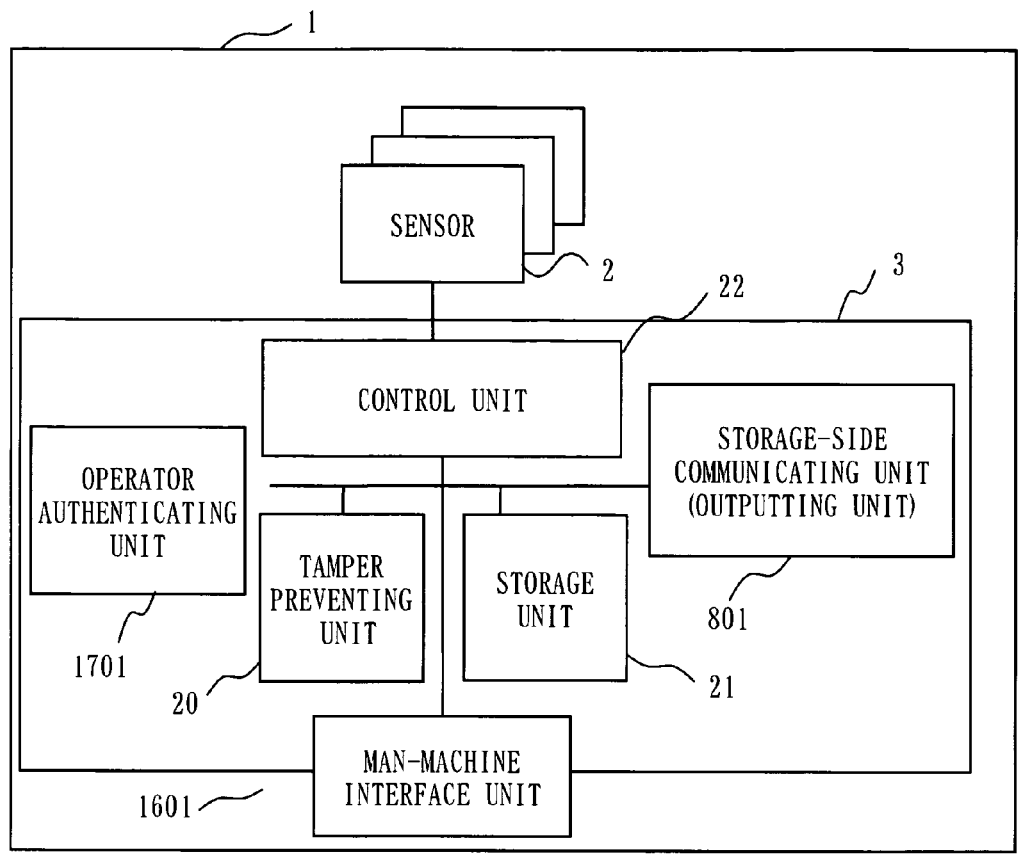
FIG. 30 is a configuration diagram of the moving object information guaranteeing system according to the seventeenth embodiment.
Figure 31:
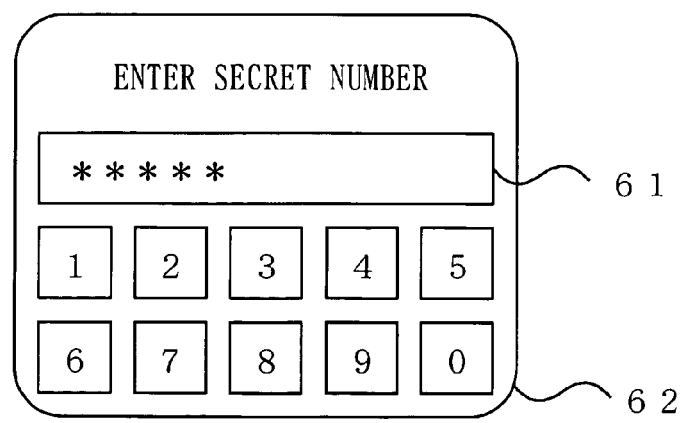
FIG. 31 is an example of touch panel display according to the seventeenth embodiment.

FIG. 30 is a configuration diagram of the moving object information storage device 3 in the moving object information guaranteeing system in such a case. FIG. 30 is configured to include an operator authenticating unit 1701 in addition to FIG. 29 of the sixteenth embodiment. Before outputting "the moving object information", the operator authenticating unit 1701 authenticates the information inputted from the man-machine interface unit 1601. Namely, the operator authenticating unit 1701 authenticates if an operator is correct or not based on the operation received from the operator by the man-machine interface unit 1601. When it is authenticated by the operator authenticating unit 1701 that the operator is correct, the man-machine interface unit 1601 commands the storage-side communicating unit 801 to output.

The operator is a correct user or a correct service provider. Here, as well as other embodiments, the moving object information storage device 3 can include the separation preventing unit 302, the storage-side communicating unit 801, the communicating partner authenticating unit 901, the sensor confirming unit 1201, the range judging unit 1301, and the selecting unit 1401.

In the above configuration, when "the moving object information" is outputted, the moving object information storage device 3 requests the operator to input (operate) information for authentication using the man-machine interface unit 1601. For example, FIG. 31 shows a configuration in which the man-machine interface unit 1601 is provided with a touch panel. FIG. 31 shows an example of an operation screen of a touch panel when a secret number which only the operator knows is used for the authentication mechanism. The touch panel 62 displays a secret number responding screen 61 which displays asterisks in response to the inputted secret number. The operator inputs (an example of the operation) the secret number using the touch panel 62. When the inputted secret number is judged to match the secret number which has been prescribed in the moving object information storage device 3, the operator authenticating unit 1701 recognizes (authenticates) that it is a correct operator. When the operator authenticating unit 1701 authenticates the operator to be correct, the man-machine interface unit 1601 commands the storage-side communicating unit 801 to output. In response to this command, the storage-side communicating unit 801 outputs "the moving object information", "the device-side unique information", and "the integrity information". When the operator authenticating unit 1701 judges that it is not matched, that is, the operator is not correct, the man-machine interface unit 1601 does not command to output. Therefore, the storage-side communicating unit 801 does not output "the moving object information", "the device-side unique information", and "the integrity information", but that it does not match is displayed on the touch panel 62, and it is reported to the operator who has inputted (operated).

As discussed above, the moving object information storage device 3 of the seventeenth embodiment is provided with the operator authenticating unit to authenticate the operator, so that "the moving object information", "the device-side unique information", and "the integrity information" can be outputted by only the correct operator from the moving object information storage device 3, which improves the reliability.

Embodiment 18

In the following, the eighteenth embodiment will be explained by referring to FIG. 32. In the above embodiments, although the system maintains the integrity of "the moving object information", the confidentiality is not maintained; that is, there is probability to be eavesdropped by the third party. Therefore, in the eighteenth embodiment will show an embodiment of a system which maintains the confidentiality of "the moving object information".

Figure 32:
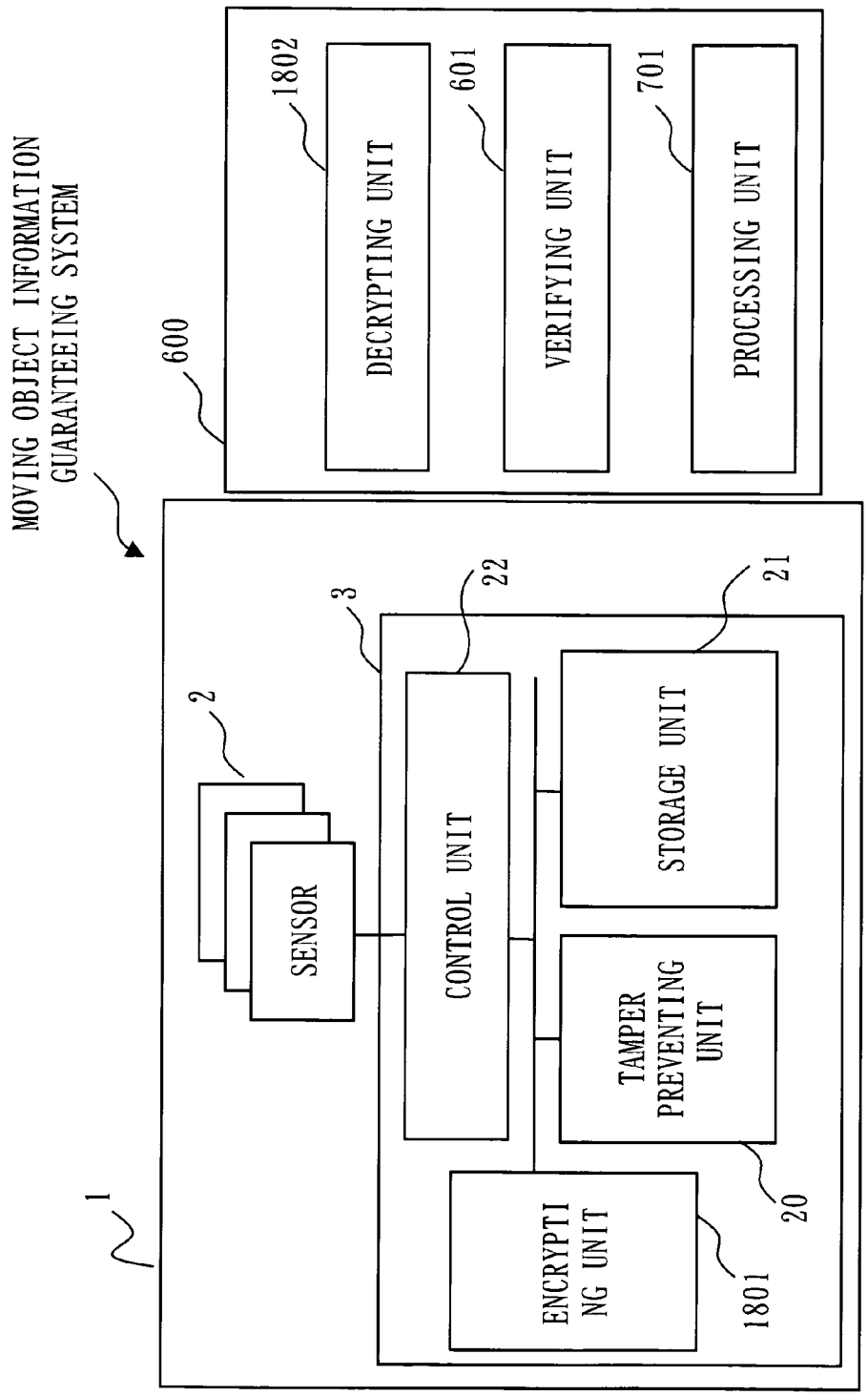
FIG. 32 is a configuration diagram of the moving object information guaranteeing system according to the eighteenth embodiment.

FIG. 32 is a configuration diagram of the moving object information guaranteeing system in the above case. FIG. 32 is configured to include an encrypting unit 1801 provided at the moving object information storage device 3 and a decrypting unit 1802 provided at the moving object information verification device 600 in FIG. 16 showing the seventh embodiment.

The encrypting unit 1801 encrypts "the moving object information". The decrypting unit 1802 decrypts the information obtained. Here, as well as other embodiments, the moving object information storage device 3 can include the separation preventing unit 302, the storage-side communicating unit 801, the communicating partner authenticating unit 901, the sensor confirming unit 1201, the range judging unit 1301, the selecting unit 1401, the man-machine interface unit 1601, etc.

In the above configuration, before outputting "the moving object information", the moving object information storage device 3 generates "the integrity information" as well as the other embodiments. Then, "the moving object information" is encrypted by the encrypting unit 1801. The eighteenth embodiment defines "the moving object information" as an encryption target; the encryption can be done including "the integrity information" and "the device-side unique information". If "the integrity information" is defined as the encryption target, the hash value shown in FIG. 15 can be also used for "the integrity information". Namely, since the encryption is done with "the moving object information", it is unnecessary to encrypt the hash value using the signature key. The encryption key used for the encryption is stored previously in the moving object information storage device 3. Then, the outputted and encrypted "moving object information" is decrypted by the decrypting unit 1802 of the moving object information verification device 600, and the processing is done similarly to other embodiment.

As discussed above, since the encrypted "moving object information" is outputted, it is possible to maintain the confidentiality of personal information related to the user as "the moving object information" even if eavesdropping is done in the communication channel or if the IC card 1001 is lost, so that the service provider can provide the service securely.

Embodiment 19

In the following, the nineteenth embodiment will be explained by referring to FIG. 33. In the above embodiments, "the moving object information" is directly outputted to the service provider (the moving object information verification device) as FIG. 14 which shows the sixth embodiment and FIG. 16 which shows the seventh embodiment. The nineteenth embodiment will show an embodiment in which an output is done through a broker. Here, as well as other embodiments, the moving object information storage device 3 can include the separation preventing unit 302, the storage-side communicating unit 801, the communicating partner authenticating unit 901, the sensor confirming unit 1201, the range judging unit 1301, the selecting unit 1401, and the man-machine interface unit 1601.

Figure 33:
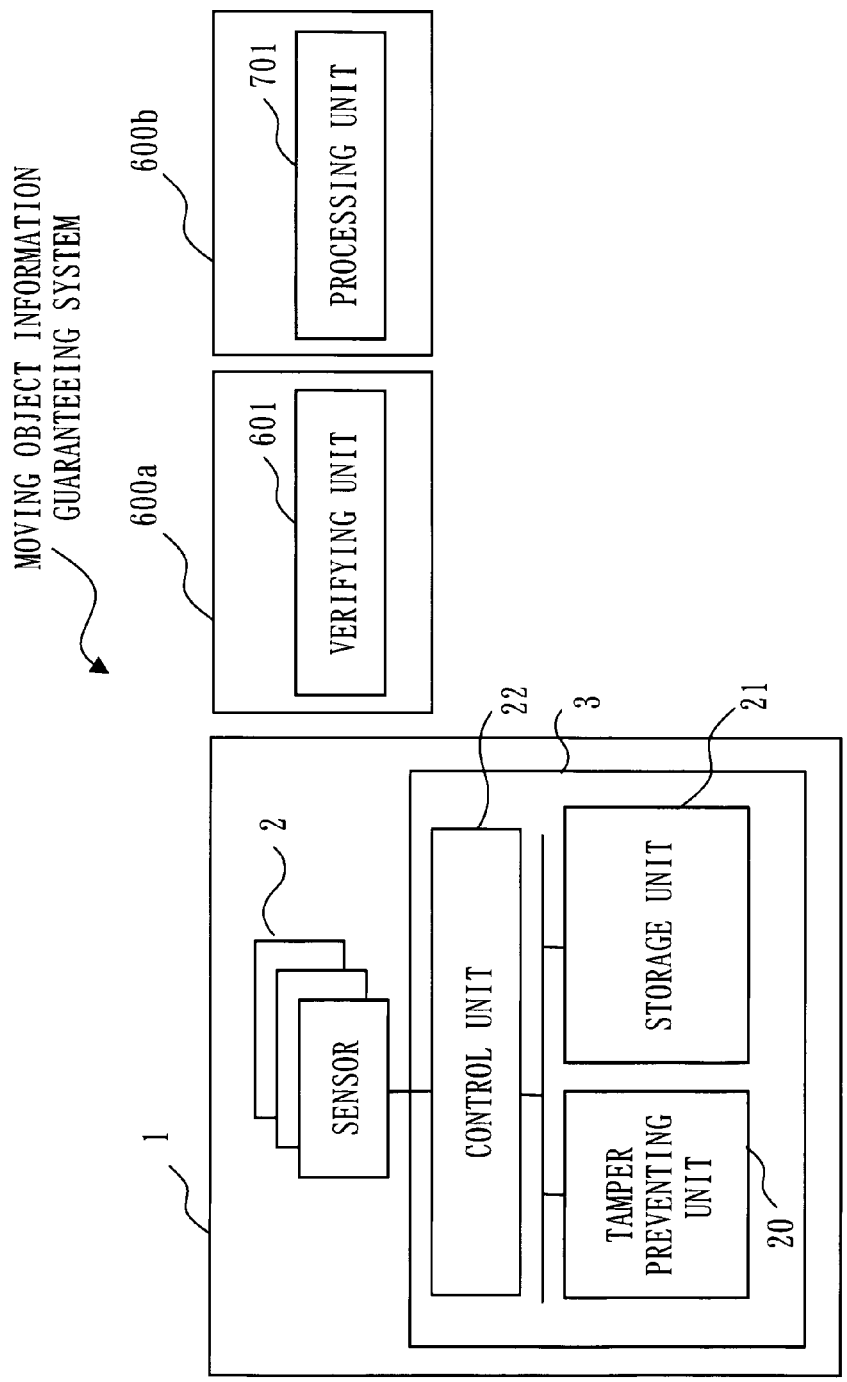
FIG. 33 is a configuration diagram of the moving object information guaranteeing system according to the nineteenth embodiment.

FIG. 33 is a block diagram showing a general configuration of the moving object information guaranteeing system in this case. FIG. 33 is configured to include a moving object information verification device 600a and a moving object information verification device 600b by dividing the verifying unit 601 and the processing unit 701 of the moving object information verification device 600 in FIG. 16 showing the seventh embodiment. The verifying unit 601 is provided at the moving object information verification device 600a kept by the broker, and only the processing unit 701 is provided at the moving object information verification device 600b kept by the service provider.

In the above configuration, in the same manner as other embodiments, the broker obtains "the moving object information", "the device-side unique information", and "the integrity information". Then, the verifying unit 601 verifies "the integrity information" and keeps "the moving object information" which is confirmed that no tampering is done. The service provider receives "the moving object information" from the broker and processes the information by the processing unit 701.

As discussed above, the broker verifies the integrity of "the moving object information" and the service provider can use the verified "moving object information", so that the service provider can inject the resource for providing the service. Further, even if the service provider is changed, for example, an insurance underwriter A is changed to an insurance underwriter B, the user does not need to change the signature key, so that the user does not need to change but can keep using the moving object information storage device 3. Further, when the user receives services from plural different service providers, the broker obtains all "moving object information" from the moving object information storage device 3 and the service provider can obtain only necessary information from the broker, so that it is not necessary to store the signature key or information corresponding to the plural services in the moving object information storage device 3, which enables to reduce the memory capacity of the storage unit 21.

Embodiment 20

Figure 34:
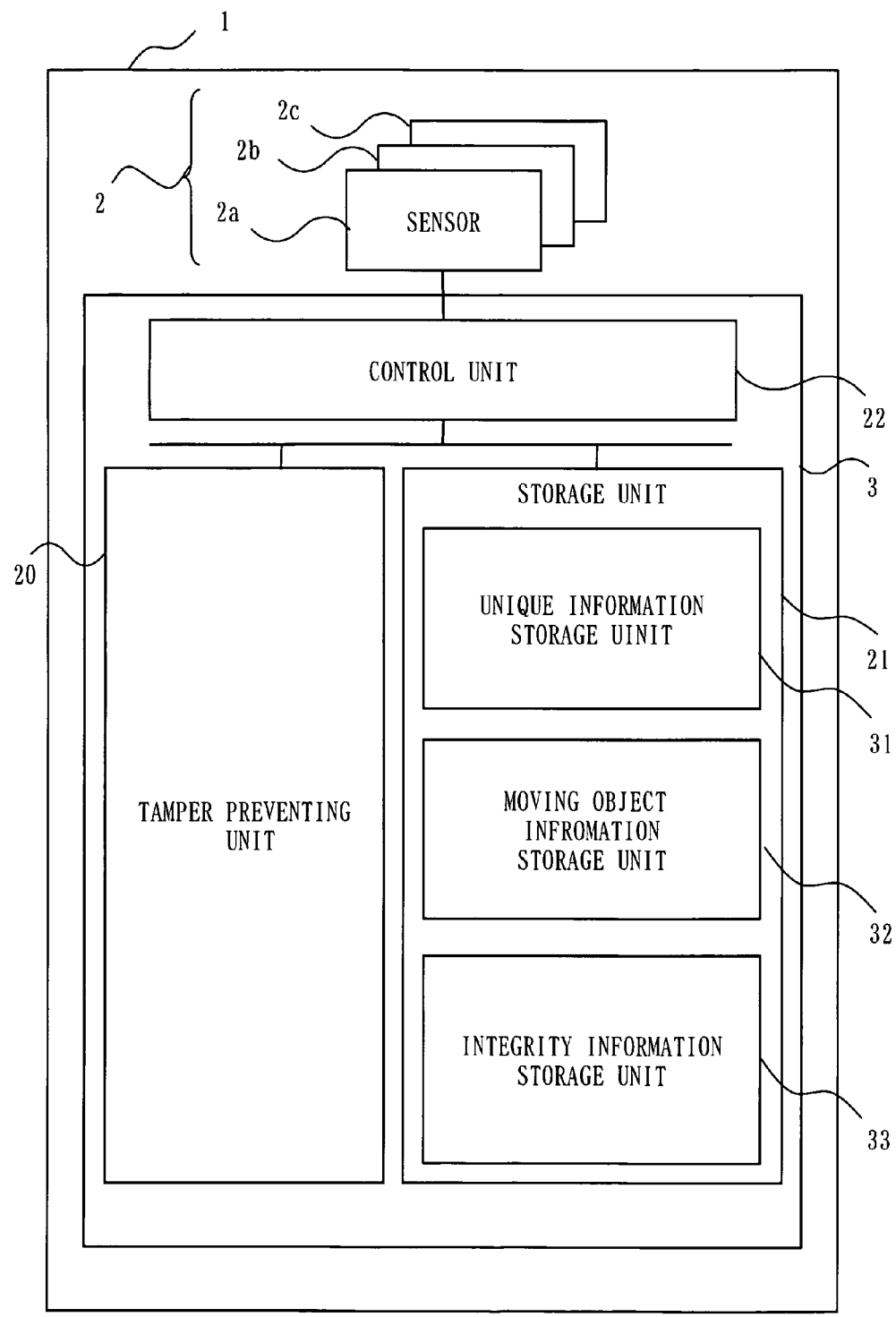
FIG. 34 is a configuration diagram of the moving object information guaranteeing system according to the twentieth embodiment.

In the following, the twentieth embodiment will be explained by referring to FIG. 34. The twentieth embodiment is configured to include at least one sensor in the moving object information storage device 3. In the first through nineteenth embodiments, a group of sensors 2 is provided at the moving object 1 side. As shown in FIG. 34, according to the twentieth embodiment, the group of sensors 2 is provided within the moving object information storage device 3.

Embodiment 21

In the following, the twenty-first embodiment will be explained by referring to FIGS. 35 and 36. The twenty-first embodiment is an embodiment in which the operation of the moving object information storage device 3 of the first embodiment is performed by a program or recording medium having the program recorded therein.

The operations of respective configuration elements of the moving object information storage device 3 shown as "--unit" in the above first embodiment relate to each other, and can be replaced with a series of processes (programs) to be executed by a computer, considering the relation among the operations. By replacing the operations of respective configuration elements with a series of processes, an embodiment of information storage program can be obtained. Further, by recording this information storage program in a computer-readable recording medium, an embodiment of the computer-readable recording medium having the program recorded therein can be obtained.

Figure 35:
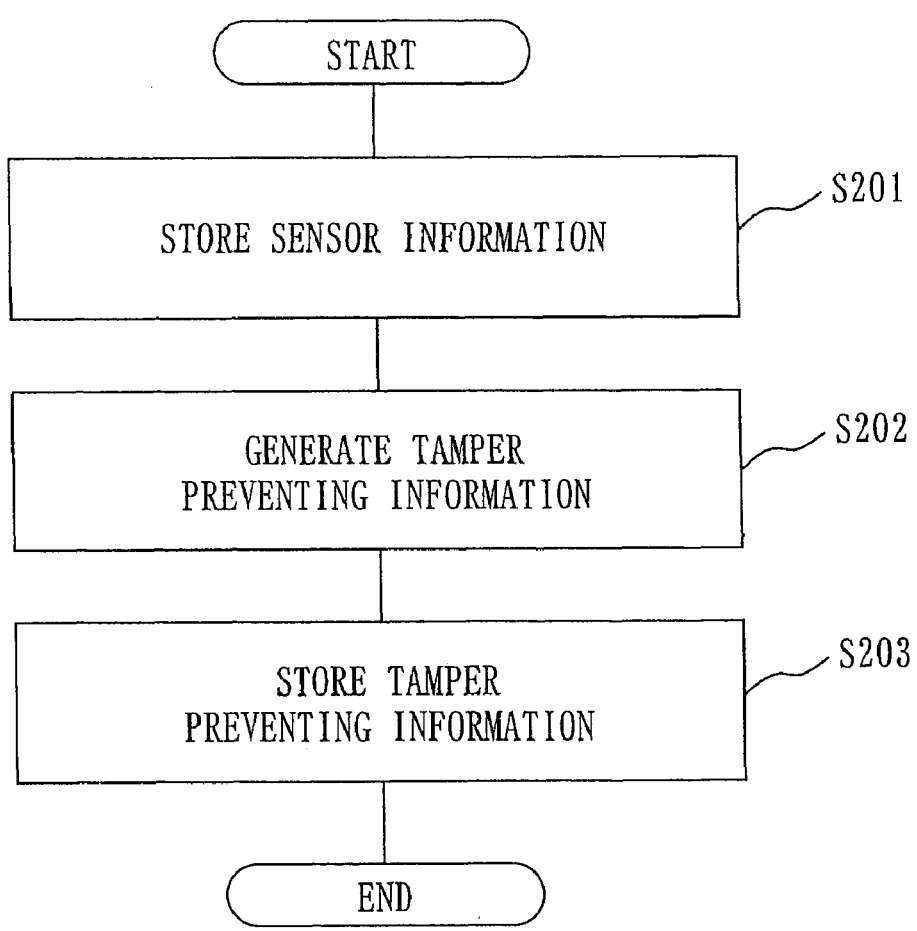
FIG. 35 is a flowchart showing a processing of an information storage program according to the twenty-first embodiment.

FIG. 35 shows a flowchart of:

(1) the operation of the moving object information storage unit 32;

(2) the operation of the tamper preventing unit 20; and (3) the operation of the integrity information storage unit 33 of the moving object information storage device 3 shown in FIG. 2, which are replaced with a series of processes to be executed by a computer to obtain the embodiment of the moving object information storage program.

S201 is a process to store "the moving object information" (sensor information) based on the information detected by the sensor.

S202 is a process to obtain unique information (specifying information) which can specify the moving object, and to generate "the integrity information" (tamper preventing information) based on the obtained unique information and the stored "moving object information".

An embodiment of programs and an embodiment of computer-readable recording medium having programs recorded therein can be configured by programs operable on a computer.

Figure 36:
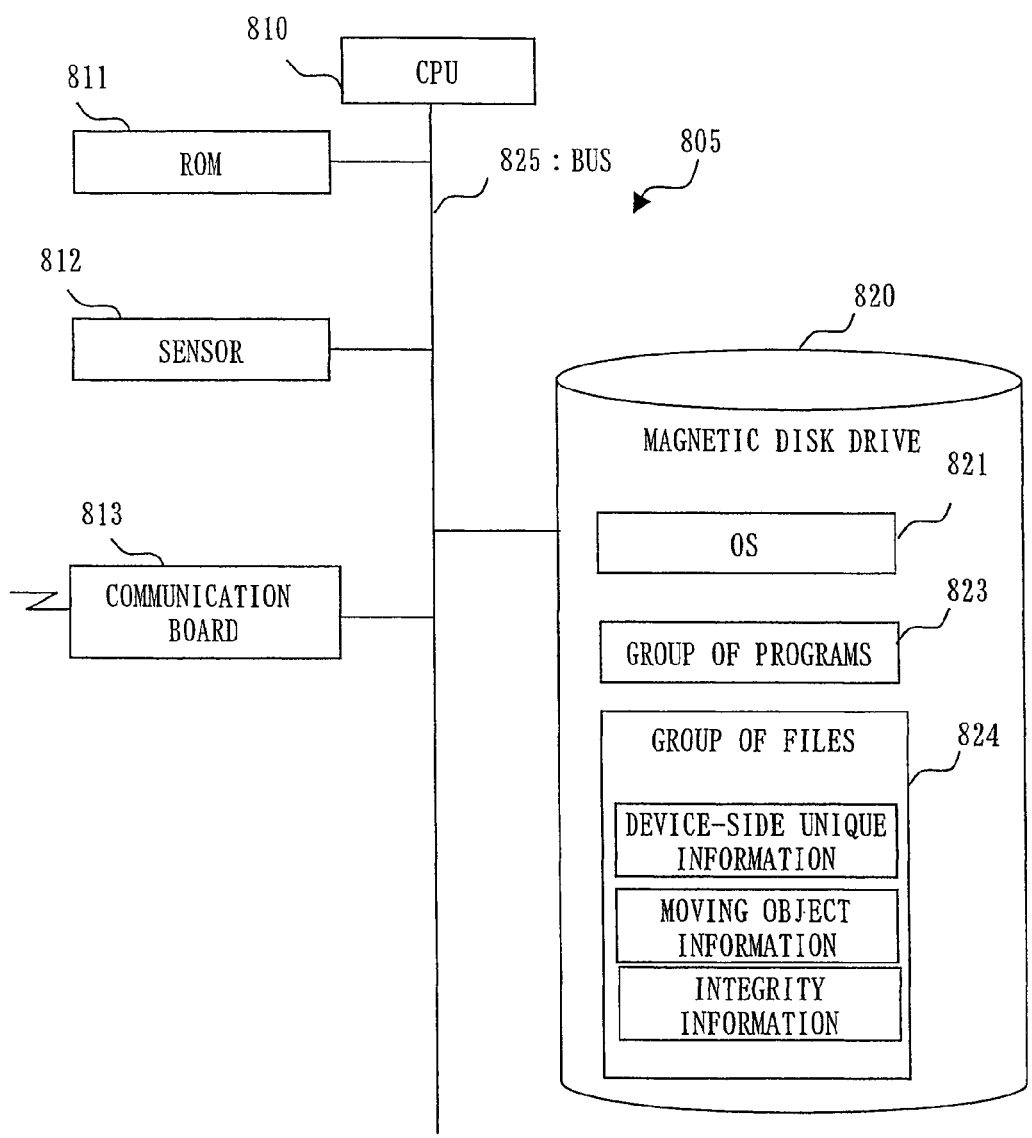
FIG. 36 shows a hardware configuration of a computer system according to the twenty-first embodiment.

FIG. 36 is a hardware configuration of a computer system 805 performing the operation of the moving object information storage device 3. In FIG. 36, the computer system 805 includes a CPU (Central Processing Unit) 810 executing programs. The CPU 810 is connected to a ROM 811, a sensor 812, a communication board 813, and a magnetic disk device 820 via a bus 825.

The magnetic disk device 820 stores an operating system (OS) 821, a group of programs 823, a group of files 824. The group of programs 823 is executed by the CPU 810 and the OS 821.

The group of programs 823 stores programs to execute a function explained as "-- unit" in the explanation of the first embodiment. The programs are read by the CPU 810 and executed.

Further, the group of files 824 stores "the device-side unique information", "the moving object information", "the integrity information", etc. explained in the first embodiment.

"-- unit" explained in FIG. 2 can be implemented by firmware stored in the ROM 811. Or it can be implemented by only software, only hardware, a combination of software and hardware, or a combination with firmware.

Each process in the embodiment of the programs or the embodiment of the computer-readable recording medium having programs recorded therein is executed by the programs; the programs are recorded in the group of programs 823 as discussed above. Then, the group of programs 823 is read by the CPU 810, and each process of the programs is executed by the CPU 810. Further, the software or the programs can be executed by firmware stored in the ROM 811. Or the programs can be executed by a combination of software, firmware, and hardware.

The programs of the twenty-first embodiment make the moving object information storage device which is a computer execute a process to generate "the integrity information" for verifying the integrity of "the moving object information" and the unique information, so that the correspondence between the moving object 1 and "the moving object information" is made clear, and the moving object information storage device storing highly reliable "moving object information" can be provided to the service provider.

In the above embodiments, for a man-ridable moving object having a plurality of sensors detecting information related to moving conditions and moving status, the moving object information storage device has been explained, which includes a storage means to store information of the sensors, a tamper preventing means to prevent tampering with the stored information and the unique information of the moving object, and a control means to control the operation.

In the above embodiments, the moving object information storage device has been explained, of which the control means calculates information of the sensors.

In the above embodiments, the moving object information storage device has been explained, which includes a separation preventing means to prevent separation of the moving object storage device from the moving object.

In the above embodiments, the moving object information storage device has been explained, in which the separation preventing means includes a buttery.

In the above embodiments, the moving object information storage device has been explained, in which the separation preventing means deletes the information in the moving object information storage device in the case of separation.

In the above embodiments, the moving object information verification device has been explained, which includes a verifying unit verifying if the information generated by the moving object information storage device is tampered or not.

In the above embodiments, in a man-ridable moving object having a plurality of sensors detecting information related to moving conditions and moving status, the moving object information guaranteeing system has been explained, which includes the moving object information storage device having storage means to store information of the sensors, tamper preventing means to prevent tampering with the recorded information, and control means to control the operation and/or calculating means to calculate the information of the sensors, and/or separation preventing means to prevent separation of the moving object from the moving object information storage device, and a verifying unit to verify if the information inputted is tampered or not.

In the above embodiments, in a man-ridable moving object having a plurality of sensors detecting information related to moving conditions and moving status, the moving object information guaranteeing system has been explained, which includes the moving object information storage device having recording means to record information of the sensors, tamper preventing means to prevent tampering with the recorded information, and control means to control the operation and/or calculating means to calculate the information of the sensors, and/or separation preventing means to prevent separation of the moving object from the moving object information storage device, a verifying unit to verify if the information inputted is tampered or not, and processing means to process by referring to an output of the verifying means.

In the above embodiments, the moving object information storage device and the moving object information guaranteeing system have been explained, in which the moving object information storage device includes communication means to communicate with an equipment outside of the moving object.

In the above embodiments, the moving object information storage device and the moving object information guaranteeing system have been explained, in which the communication means authenticates a communicating partner, and communicates only if the communicating partner is correct.

In the above embodiments, the moving object information storage device and the moving object information guaranteeing system have been explained, in which the communication means communicates with an IC card and sends information stored in the device to the IC card.

In the above embodiments, the moving object information storage device and the moving object information guaranteeing system have been explained, which always sends the information inside the device to equipments outside of the moving object wirelessly.

In the above embodiments, the moving object information storage device and the moving object information guaranteeing system have been explained, in which the moving object information storage device includes means to confirm authenticity of the sensor.

In the above embodiments, the moving object information storage device and the moving object information guaranteeing system have been explained, in which the moving object information storage device records information which exceeds a prescribed range.

In the above embodiments, the moving object information storage device and the moving object information guaranteeing system have been explained, in which the moving object information storage device records service information of plural service providers, and based on the service information, records plural pieces of information corresponding to the plural services.

In the above embodiments, the moving object information storage device and the moving object information guaranteeing system have been explained, in which the moving object information storage device records service information of plural service providers, and based on the service information, selects and extracts necessary information out of all recorded moving object information.

In the above embodiments, the moving object information storage device and the moving object information guaranteeing system have been explained, in which the moving object information storage device includes man-machine interface means receiving an instruction from a user and outputs moving object information according to the instruction of the user.

In the above embodiments, the moving object information storage device and the moving object information guaranteeing system have been explained, in which the moving object information storage device authenticates the user when outputting the moving object information.

In the above embodiments, the moving object information storage device and the moving object information guaranteeing system have been explained, in which the moving object information storage device includes means to encrypt the moving object information.

In the above embodiments, the moving object information guaranteeing system has been explained, in which the verifying unit to verify if the information inputted is tampered or not and processing means to process by referring to an output of the verifying unit are configured by different servers.

Embodiment 22

The twenty-second embodiment will be explained by referring to FIGS. 37 through 39. The twenty-second embodiment is an embodiment related to an environment information storage device which collects and stores "the environment information". The twenty-second embodiment corresponds to the first embodiment. Here "the environment information" is information related to environment for transportation or environment for storage of an object, such as temperature, humidity, illuminance, air pressure, time and date, location, yawing, weight, tilt, pressure, sound, wind force, impurity rate, opening/closing of a door, for example.

Figure 37:
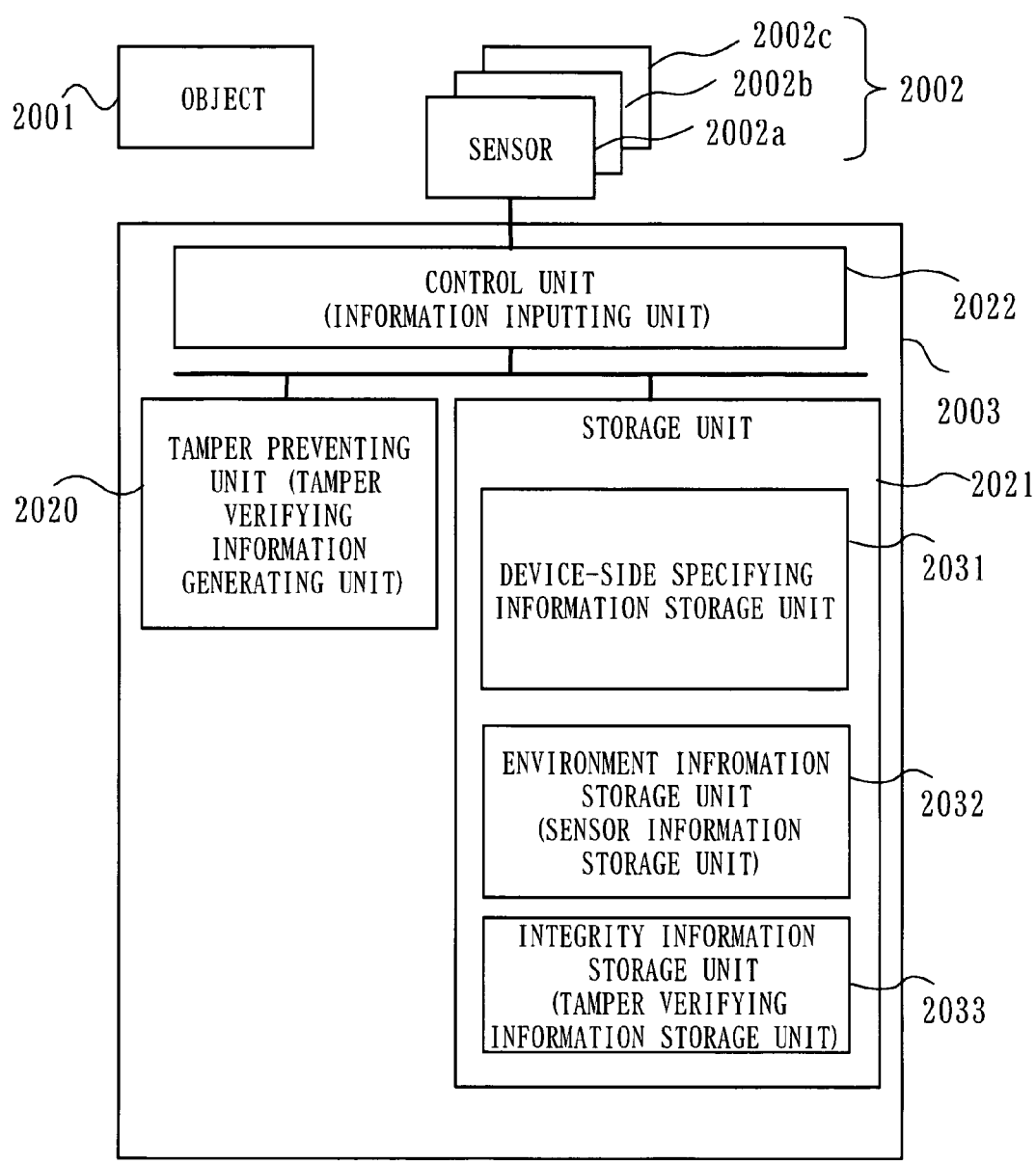
FIG. 37 is a configuration diagram of an environment information storage device 2003 according to the twenty-second embodiment.
Figure 38:
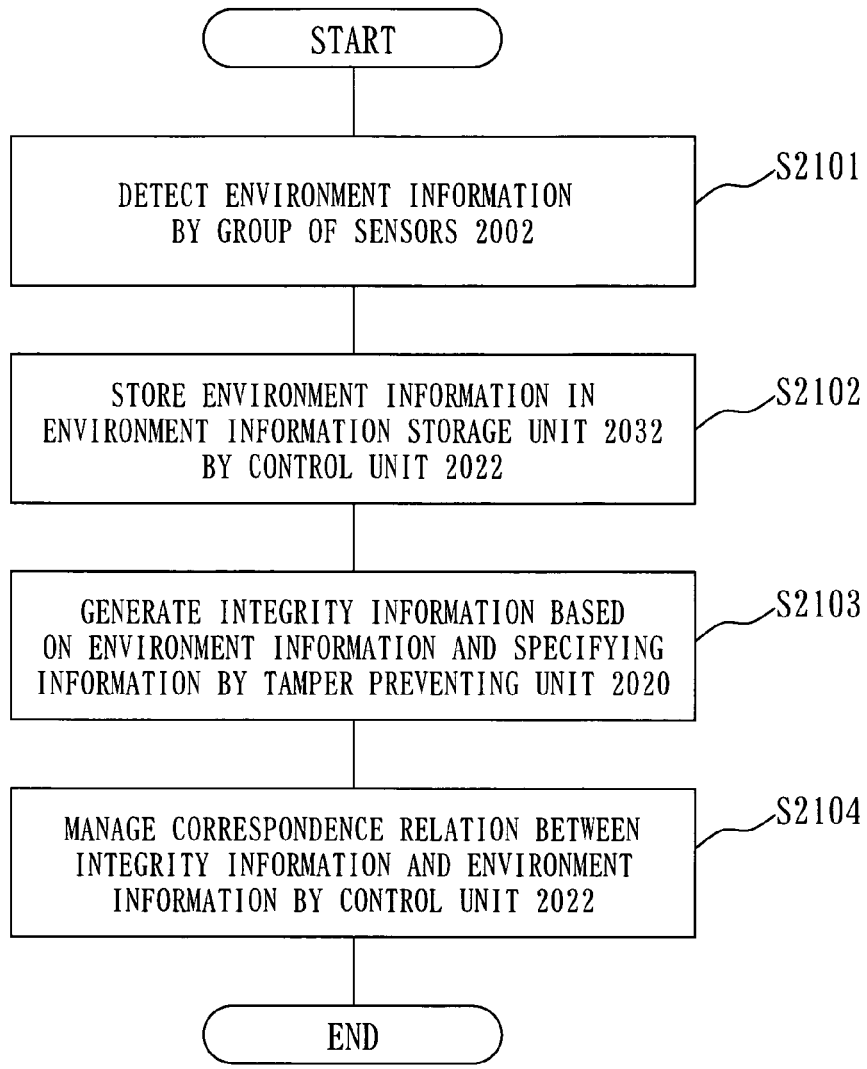
FIG. 38 is a flowchart of the operation of the environment information storage device 2003 according to the twenty-second embodiment.

FIG. 37 is a block diagram showing a configuration of the environment information storage device 2003 (an example of the information storage device) according to the twenty-second embodiment. The environment information storage device 2003 inputs information from each sensor of a group of sensors 2002 including plural sensors 2002a through 2002c. Concretely, the environment information storage device 2003 inputs information from each sensor of the group of sensors 2002 placed at a place for putting objects for transportation or storage such as a loading space or a luggage carrier in traffic means capable of transporting an object such as vehicles, trains, airplanes, or ships, a cargo room, a container, or a warehouse, etc.

In FIG. 37,
(1) The object 2001 is something in storage or transportation.
(2) Each of the sensors 2002a, etc. forming a group of sensors 2002 is provided at a place such as the above "loading space, luggage carrier, cargo room, container, warehouse". Each of the sensors 2002a, etc. detects the environment information related to the environment for transportation or storage of the object.
(3) The environment information storage device 2003 stores the environment information detected by the sensors 2002a, etc. connected.

The sensors 2002a, etc. can calculate the information detected by itself and output the calculated result to the environment information storage device 2003 as the environment information. Or, as discussed later in the twenty-third embodiment, the environment information storage device 2003 can be configured to input information from each of the sensors 2002a, etc., calculate, and store the calculated result as the environment information. Or, the environment information storage device 2003 can be configured to input the information which has been detected by the sensor and not yet calculated, and store the inputted information as the environment information without calculation. The environment information as the calculated result by the sensor, the calculated result by the environment information storage device 2003, or the information inputted by the sensor include abnormal temperature or humidity that exceeds a prescribed range, the number of times of its occurrence, the number of opening/closing of a door, video information during the transportation or storage, etc. Like this, in this specification, "the environment information" includes any of the information which has been detected by the sensor but not calculated yet, the information which has been detected and calculated by the sensor, and the information which has been detected by the sensor and calculated by the environment information storage device 2003 (the calculated result). Namely, "the environment information" (an example of sensor information) is information based on the information inputted from the sensor. Here, "based on" means to include all of the information which has been detected by the sensor but not calculated yet, the information which has been detected and calculated by the sensor, and the information which has been detected by the sensor and calculated by the environment information storage device 2003.

Further, the environment information storage device 2003 can be provided at the same place with the sensor, or can be provided at a different place. For example, in the case of warehouse, the sensor and the environment information storage device 2003 can be provided within the warehouse, or the environment information storage device 2003 can be provided at an office outside the warehouse.

Further, the connection between the sensor and the environment information storage device 2003 can be connected wired or wirelessly.

A configuration of the environment information storage device 2003 will be explained by referring to FIG. 37. The environment information storage device 2003 includes a storage unit 2021 storing environment information, specifying information discussed later, and integrity information discussed later and a tamper preventing unit 2020 (an example of a tamper verifying information generating unit) generating the integrity information verifying integrity (not being tampered) of the environment information recorded in the storage unit 2021, and a control unit 2022 (an example of an information inputting unit) controlling these operations. The storage unit 2021 includes a device-side specifying information storage unit 2031 storing specifying information and an environment information storage unit 2032 (an example of a sensor information storage unit) storing environment information, and an integrity information storage unit 2033 (an example of a tamper verifying information storage unit) storing the integrity information. The storage unit 2021 can be implemented by using hard disk and semi-conductor memory such as EEPROM, RAM, etc.

In the following, the operation will be explained using FIG. 38.

(1) The control unit 2022 of the environment information storage device 2003 starts recording environment information detected by the sensor (S2101) from "necessary timing". This "necessary timing" is, for example, is when an engine starts in the case of traffic means; when a door closes in the case of a warehouse, a cargo room, or a container. Or this "necessary timing" can be a timing for starting transportation or storage of an object such as the environment information detected by one or plural sensors enters a prescribed range such as when a switch (not illustrated) provided at the environment information storage device 2003 is turned ON, or when the illuminance sensor detects the brightness and it becomes dark.

(2) To the control unit 2022, the environment information detected by all the sensors connected is inputted. And the control unit 2022 stores the environment information in the environment information storage unit 2032 of the storage unit 2021 (S2102).

(3) The device-side specifying information storage unit 2031 stores the specifying information beforehand. Here, "the specifying information" is information which can specify environment at which the sensor is placed or a place at which the environment information storage device 2003 is previously appointed to be equipped; concretely, "the specifying information" is license plate information, a vehicle identification number, a production number, etc., that is, information cable to specify a loading space or a container in the case of transportation vehicle such as a truck having one loading space. The tamper preventing unit 2020 generates the integrity information based on the environment information stored in the environment information storage unit 2032 of the storage unit 2021 and the specifying information which can specify the environment stored in the device-side specifying information storage unit 2031 of the storage unit 2021 by the command from the control unit 2022 at the necessary timing (S2103).

(4) Here, "the integrity information" (an example of tamper verifying information) is information used for verifying if the environment information, etc. is tampered or not. In this twenty-second embodiment, the tamper preventing unit 2020 generates the integrity information based on the environment information and the specifying information. In this case, the integrity information is used for verifying if at least either the specifying information or the environment information is tampered or not. Further, as will be discussed later by FIG. 49 in the twenty-seventh embodiment, the tamper preventing unit 2020 can generate the integrity information based on the environment information. In this case, the integrity information is used for verifying if the environment information is tampered or not. A digital signature is noted as an example of a method to generate the integrity information. A concrete example of "the integrity information" generated by the tamper preventing unit 2020 will be discussed later in the twenty-sixth embodiment.

(5) The integrity information generated is stored in the integrity information storage unit 2033 of the storage unit 2021. Or the integrity information stored in the integrity information storage unit 2033 is outputted to the outside of the environment information storage device 2003 with the environment information. These operations depend on a system to which the environment information storage device 2003 is applied. On recording the integrity information generated by the tamper preventing unit 2020 in the integrity information storage unit 2033, the control unit 2022 of the environment information recording device 20003 manages correspondence relation between the integrity information and the environment information based on which the integrity information is generated. This management clarifies the correspondence relation between the integrity information and the environment information based on which the integrity information is generated (S2104).

Figure 39:
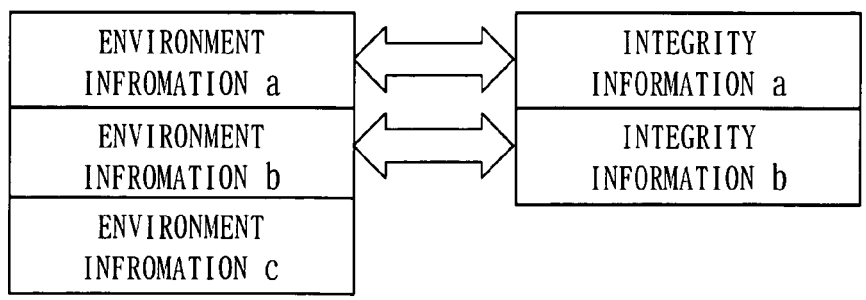
FIG. 39 is a diagram showing correspondence relation between the environment information and the integrity information according to the twenty-second embodiment.

(6) FIG. 39 shows an example of managing the correspondence relation between the environment information and the integrity information. In FIG. 39, "environment information a" corresponds to "integrity information a" and "environment information b" corresponds to "integrity information b". The status shows that the integrity information corresponding to "environment information c" has not been generated. This management clarifies the correspondence relation between the integrity information and the environment information based on which the integrity information is generated.

(7) A timing for generating the integrity information depends on an object to which the environment information storage device 2003 of the twenty-second embodiment is applied; for example, when the storage unit 2021 includes the environment information of which the integrity information has not been generated when an event occurs such as opening/closing a door, when the environment information is outputted to the outside of the environment information storage device 2003, when the environment information is inputted to the environment information storage device 2003, when the prescribed event occurs, etc.

As discussed above, the tamper preventing unit 2020 generates the integrity information which verifies the integrity of the environment information inside of the environment information storage device 2003, so that a highly reliable environment information storage device storing environment information can be accomplished.

Embodiment 23

In the following, the twenty-third embodiment will be explained referring to FIG. 40. The twenty-third embodiment is an embodiment in which the control unit 2022 of the environment information storage device 2003 processes signals detected by the sensors. The twenty-third embodiment corresponds to the second embodiment.

Figure 40:
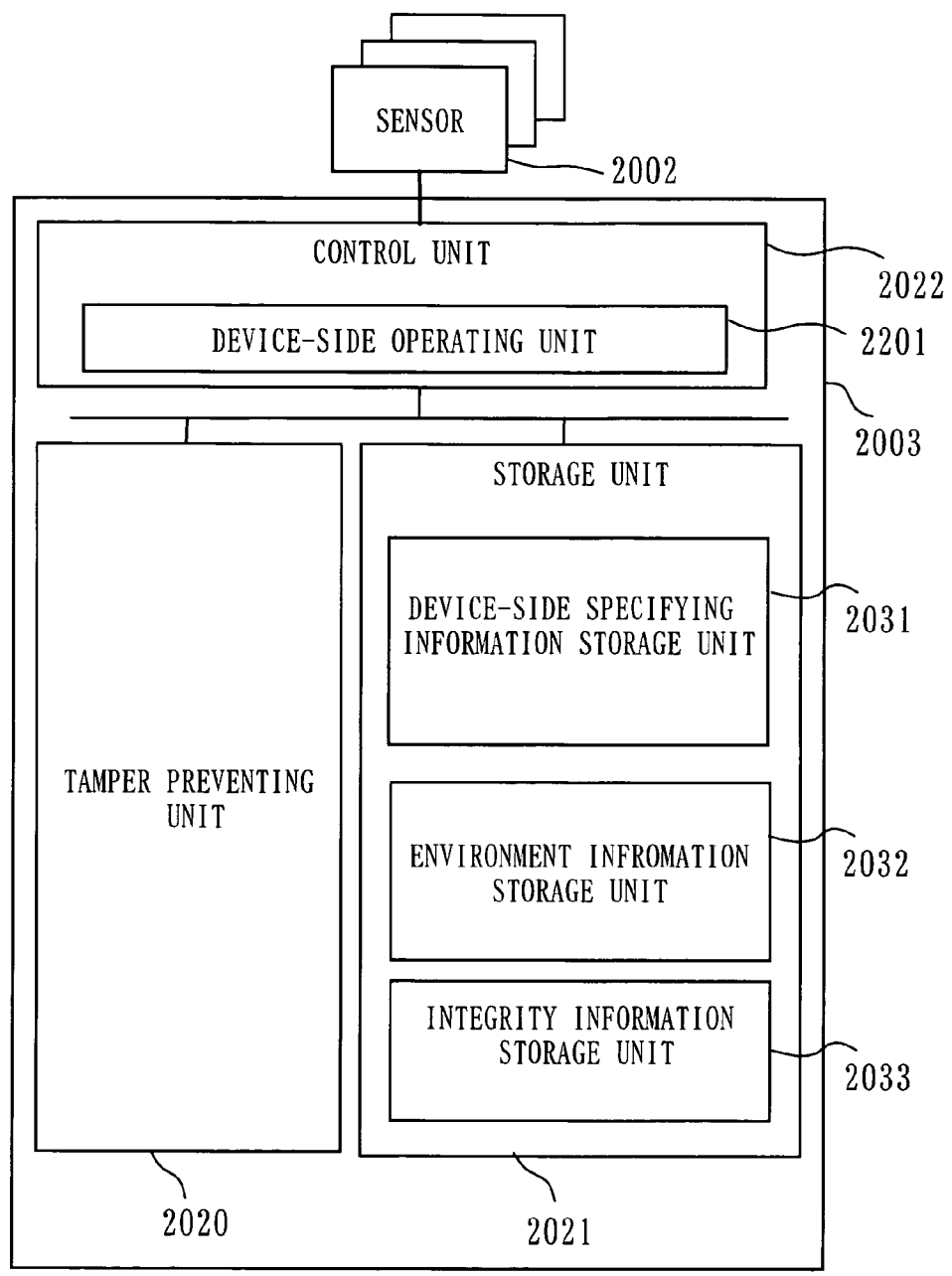
FIG. 40 is a configuration diagram of the environment information storage device 2003 according to the twenty-third embodiment.

FIG. 40 shows a configuration of the environment information storage device 2003 according to the twenty-third embodiment. The environment information storage device 2003 in FIG. 40 has the same configuration as the environment information storage device 2003 in FIG. 37; however, different from FIG. 37, the control unit 2022 includes a device-side operating unit 2201 processing information detected by the sensors connected in the case of FIG. 40. In this configuration, the control unit 2022 processes by the device-side operating unit 2201 the information detected by the sensors and stores the processed result in an environment information storage unit 2032 of the storage unit 2021 as the environment information. The information obtained by such processed result includes information when the environment information exceeds the prescribed range, the environment information and the number of its occurrences when an event occurs, the number of opening/closing of a door, video information during the transportation or storage, and so on.

As discussed above, since the control unit 2022 includes the device-side operating unit 2201 for calculating the signals detected by the sensors, various types of moving conditions or moving status can be obtained and stored without adding sensors depending on information to be obtained. Further, the environment information storage device 2003 can record only the environment information which exceeds the prescribed range or the number of occurrences of events in the environment information storage unit 2032, which can reduce memory capacity of the environment information storage device 2003.

Here, although the calculated result is stored as the environment information in the twenty-third embodiment, it is possible to configure so as to store the information detected by the sensors together as the environment information.

Further, the environment information in the following embodiments includes both of the information detected by the sensors (information which has not been calculated, information which has been calculated) and calculated result of the control unit 2022.

Embodiment 24

In the following, the twenty-fourth embodiment will be explained by referring to FIGS. 41 and 42. The twenty-second and twenty-third embodiments have explained a case in which the environment information storage device 2003 stores the environment information of an object during the transportation or storage. However, it is not confirmed that the object which is in transportation or storage actually exists in the environment. Therefore, the twenty-fourth embodiment will explain a configuration which clarifies the correspondence relation between the object and the environment information.

Figure 41:
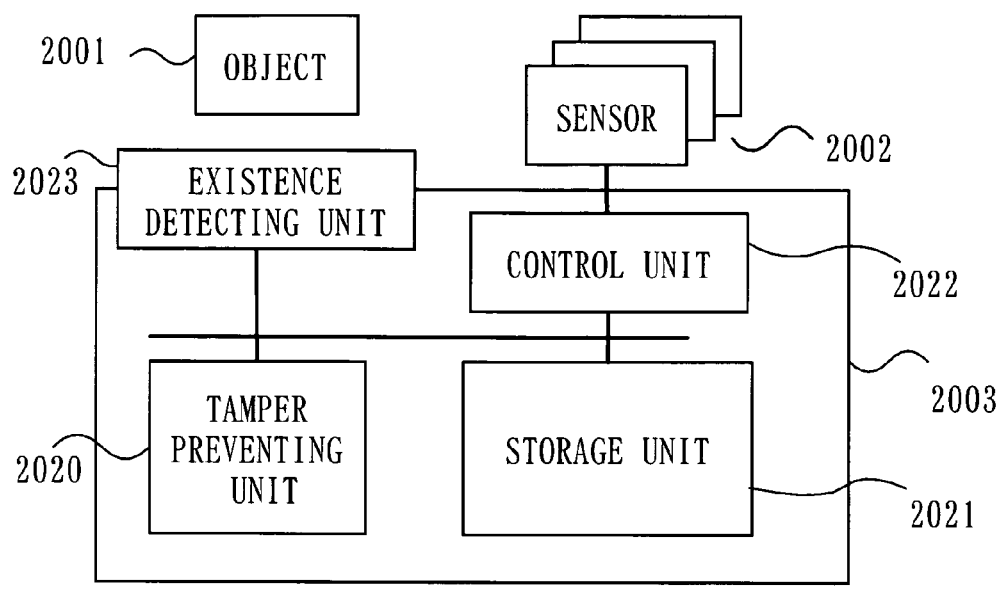
FIG. 41 is a configuration diagram of the environment information storage device 2003 according to the twenty-fourth embodiment.

FIG. 41 is a block diagram showing a configuration of the environment information storage device 2003 of the twenty-fourth embodiment in a place for keeping an object during the transportation or storage. The environment information storage device 2003 of FIG. 41 further includes an existence detecting unit 2023 detecting an existence of an object 2001 in the environment information storage device 2003 of the twenty-second embodiment shown in FIG. 37.

The existence detecting unit 2023 outputs existence information when detecting an existence of the object 2001. In the configuration shown in FIG. 41, the environment information storage device 2003 stores the existence information outputted by the existence detecting unit 2023 in the environment information storage unit 2032 of the storage unit 2021 together with the environment information. Then, a tamper preventing unit 2020 generates the integrity information for information which combines the environment information, the specifying information and the existence information.

Namely, in the twenty-second embodiment, the tamper preventing unit 2020 generates the integrity information from the environment information and the specifying information as:
"the environment information+the specifying information→the integrity information"

On the other hand, in the twenty-fourth embodiment, the tamper preventing unit 2020 generates the integrity information from the environment information, the specifying information, and the existence information as:
"the environment information+the specifying information+the existence information→the integrity information". The integrity information generated from the environment information, the specifying information, and the existence information is information used for verifying if at least either the environment information, the specifying information, or the existence information is tampered or not.

More concrete case will be explained. FIG. 42 is a block diagram showing a configuration of the environment information storage device 2003 and the sensors of the twenty-fourth embodiment in a place for keeping an object during the transportation or storage.

(1) A warehouse/container 2040 shows a warehouse or a container for keeping an object 2001 during the transportation or storage.

(2) A door/cover 2041 shows a door or a cover provided at the warehouse or the container.

(3) An opening/closing detecting sensor 2042 detects opening/closing of the door or the cover.

(4) A wireless tag 2043 is mounted on the object 2001 and includes unique identifying information (5) A wireless tag reader 2044 reads the identifying information of the wireless tag 2043.

(6) An identifying information comparing unit 2045 is connected to the control unit 2022. Further, the identifying information comparing unit 2045 inputs the identifying information from the wireless tag reader 2044, compares the identifying information inputted last time and the identifying information inputted this time, and compared result is outputted to the environment information storage unit 2032 as the existence information. The existence detecting unit 2023 of FIG. 41 is composed of the wireless tag 2043, the wireless tag reader 2044, and the identifying information comparing unit 2045.

(7) Here, as discussed above in the twenty-second embodiment, the environment information storage device 2003 can be provided outside of the warehouse or the container.

Figure 42:
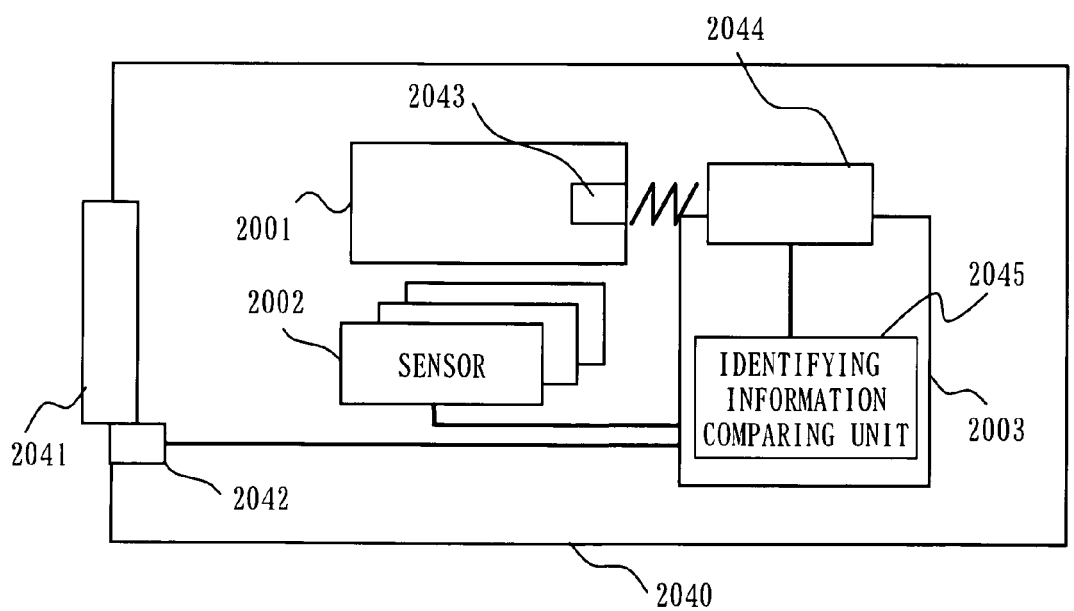
FIG. 42 is a diagram showing a concrete example according to the twenty-fourth embodiment.

In the configuration as shown in FIG. 42, when the door/cover 2041 opens and the object 2001 is carried in, the control unit 2022 of the environment information storage device 2003 detects the opening of the door by a signal from the opening/closing detecting sensor 2042. Linked to this detection, the identifying information comparing unit 2045 reads the identifying information of the wireless tag 2043 through the wireless tag reader 2044 and records it. When there exist plural objects 2001, the identifying information comparing unit 2045 reads the identifying information of all wireless tags attached to respective objects through the wireless tag reader 2044. Further, the control unit 2022 of the environment information storage device 2003 starts recording the environment information.

During the transportation or storage, the identifying information comparing unit 2045 reads the identifying information of the wireless tag 2043 through the wireless tag reader 2044 at a necessary timing. This timing can be always reading, at a predetermined interval, when a door or a cover opens/closes, or when the integrity information is created. Then, the identifying information comparing unit 2045 of the environment information storage device 2003 compares later identifying information than the identifying information read by the wireless tag reader 2044 first, that is, the identifying information which is read at or after second time with the identifying information which is read first, and the compared result is outputted as "existence information". Further, if the wireless tag reader 2044 reads the identifying information when the tamper preventing unit 2020 creates the integrity information, assuming the identifying information read by the wireless tag reader 2044 as the existence information, the tamper preventing unit 2020 can create the integrity information based on the existence information and the environment information. When the identifying information is used directly as the existence information, the identifying information comparing unit 2045 outputs the identifying information inputted from the wireless tag reader 2044 to the environment information storage unit 2032 of the storage unit 2021 directly.

As discussed above, since the environment information storage device includes the existence detecting unit, it is possible to detect if an object exists in the environment recorded by the environment information storage device. Therefore, the correspondence relation can be ensured between the environment information and an object, which enables to accomplish an environment information storage device with higher reliability.

Embodiment 25

In the following, the twenty-fifth embodiment will be explained by referring to FIG. 43. The twenty-fifth embodiment is an embodiment in which the environment information storage device 2003 inputs information from each sensor of plural groups of sensors. The above twenty-second through twenty-fourth embodiments, one environment information storage device is provided for one group of sensors placed at a warehouse or a container. On the other hand, the twenty-fifth embodiment shows a case in which one environment information storage device is provided at plural groups of sensors.

Figure 43:
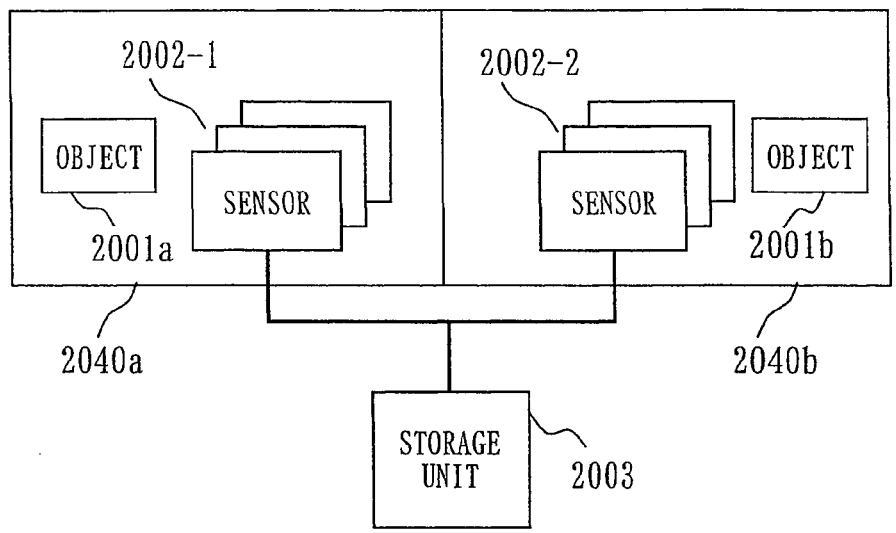
FIG. 43 is a diagram showing relation between plural sensor groups and the environment information storage device 2003 according to the twenty-fifth embodiment.

FIG. 43 is a block diagram showing a configuration of the environment information storage device 2003 and sensors according to the twenty-fifth embodiment in a place for keeping an object 2001 during the transportation or storage. As shown in FIG. 43, the environment information storage device 2003 is provided outside of a warehouse/container 2040*a*, a warehouse/container 2040*b*. Then, each sensor of a group of sensors 2002-1 and a group of sensors 2002-2 placed inside of the warehouse or the container is connected to the environment information storage device 2003. As shown in FIG. 43, the group of sensors 2002-1 corresponds to an object 2001*a*, and the group of sensors 2002-2 corresponds to an object 2001*b*. Here, as well as the twenty-fourth embodiment, the existence detecting unit 2023 is provided at the warehouse or the container and connected to one environment information storage device 2003.

In this configuration, the environment information storage device 2003 obtains and stores environment information from each sensor of the group of sensors 2002-1 and the group of sensors 2002-2 provided at the warehouse or the container. Then, the environment information storage device 2003 generates the integrity information based on the specifying information which can specify the warehouse/container 2040*a* for the environment information obtained from each sensor of the group of sensors 2002-1. Further, the environment information storage device 2003 generates the integrity information based on the specifying information which can specify the warehouse/container 2040*b* for the environment information obtained from each sensor of the group of sensors 2002-2.

As discussed above, the environment information storage device according to the twenty-fifth embodiment obtains and records the environment information from plural groups of sensors placed at plural environments which are different each other such as plural warehouses or containers. Therefore, it is possible to reduce the cost for the environment information storage device.

Embodiment 26

In the following, the twenty-sixth embodiment will be explained by referring to FIGS. 44 through 46. The twenty-sixth embodiment relates to an environment information guaranteeing system 2000 including the environment information storage device 2003 and a terminal device 2600 (an example of a verification device) verifying the correctness of the environment information and the specifying information by inputting the environment information, the specifying information, and the integrity information. The twenty-sixth embodiment corresponds to the sixth embodiment.

The above twenty-second through twenty-fifth embodiments relate to the environment information storage device 2003. In this twenty-sixth embodiment, a case will be explained, in which a terminal device 2600 includes a verifying unit 2601 verifying the correctness of the environment information and the specifying information in the environment information guaranteeing system 2000 including the environment information storage device 2003 and the terminal device 2600.

Figure 44:
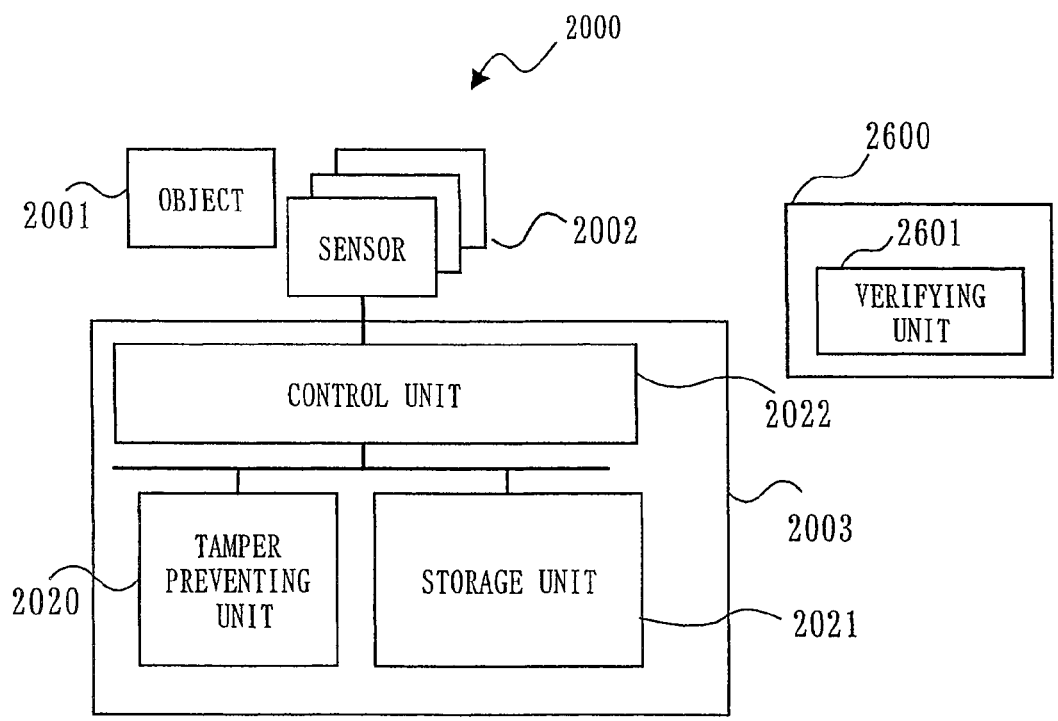
FIG. 44 is a configuration diagram of the environment information guaranteeing system 2000 according to the twenty-sixth embodiment.

FIG. 44 is a block diagram showing a configuration of the environment information guaranteeing system 2000 according to the twenty-sixth embodiment. In FIG. 44, the terminal device 2600 is a terminal device which is available to a confirming person for verifying that the environment information is not tampered. The terminal device 2600 is a mobile phone or a PC (personal computer), for example. The confirming person is a publicly recognized third party organization as well as a requesting person and a user. The verifying unit 2601 of the terminal device 2600 verifies if the environment information is tampered or not. Here, as well as other embodiments, the environment information storage device 2003 can include the existence detecting unit 2023.

Next, the operation will be explained. The operation of the environment information storage device 2003 is the same as the one of the twenty-second through twenty-fifth embodiments. Namely, the environment information storage device 2003 keeps the environment information and the specifying information, or keeps the existence information which has been discussed in the twenty-fourth embodiment depending on a case, and generates the integrity information. Then, the terminal device 2600 verifies that the environment information or the existence information is not tampered. The following shows a flow of the verification will be explained by referring to FIG. 45.

(An Example of Verification)

Figure 45:
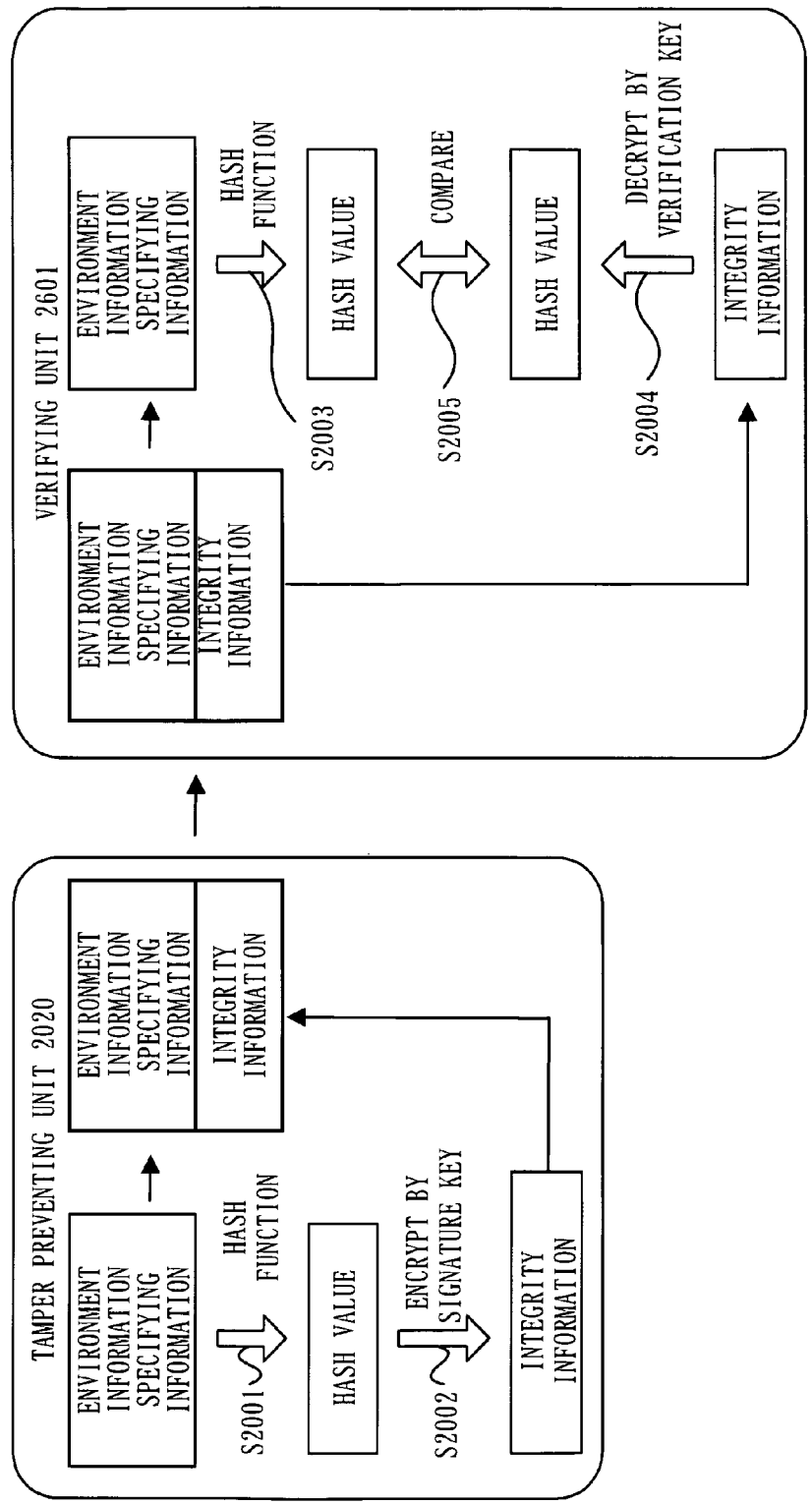
FIG. 45 shows authentication operation according to the twenty-sixth embodiment.

FIG. 45 is a flow of interaction between the tamper preventing unit 2020 and the verifying unit 2601. FIG. 45 shows an example using a digital signature. Generation of the integrity information by the tamper preventing unit 2020 corresponds to the case of the twenty-second embodiment. This digital signature is an example of a case of generating the integrity information.

(The Environment Information Storage Device 2003)

(1) The tamper preventing unit 2020 inputs the environment information (the existence information can be included) and the integrity information to a hash function to obtain a hashed value (S2001). In the twenty-sixth embodiment, a case will be explained, in which the existence information is not included in the environment information. By encrypting the hash value using the signature key, the tamper preventing unit 2020 generates the integrity information (S2002). The signature key which corresponds to a verification key included in the terminal device 2600 is previously stored in the storage unit 2021 of the environment information storage device 2003.

(The Terminal Device 2600)

(2) The terminal device 2600 obtains the environment information, the integrity information, and the integrity information. As for a method for obtaining, it is possible to obtain through recording medium, or it is also possible to obtain by communication between the terminal device 2600 and the environment information storage device 2003.

(3) The verifying unit 2601 of the terminal device 2600 obtains a hash value from the obtained environment information and the obtained specifying information as well as the tamper preventing unit 2020 (S2003).

(4) On the other hand, the verifying unit 2601 decrypts the integrity information obtained from the environment information storage device 2003 using the verification key which is previously stored (S2004), and compares the above hash value with the hash value of decrypted result (S2005).

(5) As a result of comparison, if both hash values are recognized to be the same, the verifying unit 2601 judges the environment information as correct information, that is, it is not tampered. If the hash values are different, the verifying unit 2601 judges at least one of the environment information and the integrity information.

(Another Example of Verification)

Figure 46:
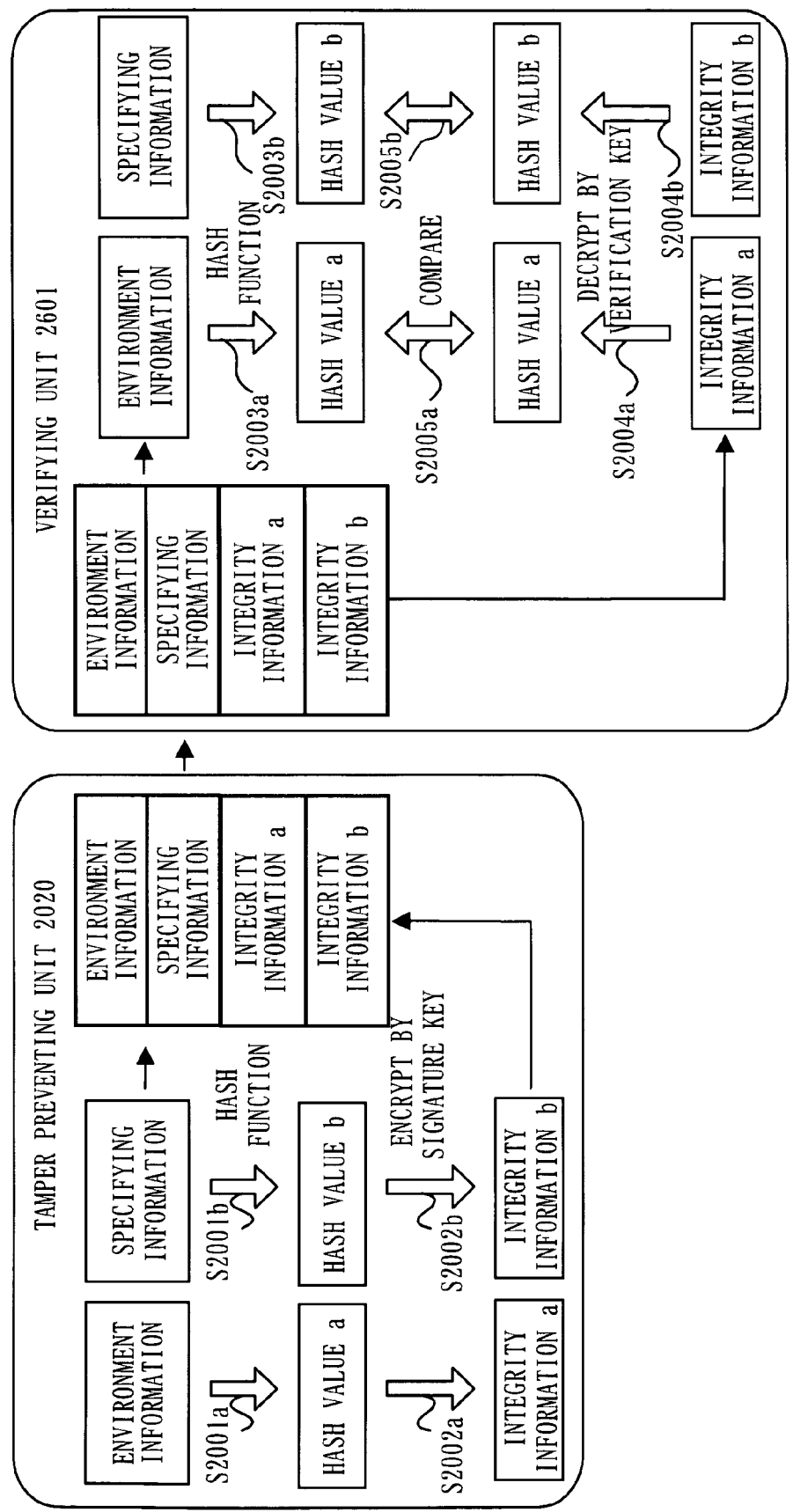
FIG. 46 shows another authentication operation according to the twenty-sixth embodiment.

Further, FIG. 46 shows another example of verification. FIG. 46 shows another example of interaction between the tamper preventing unit 2020 and the verifying unit 2601 in the case of generating the integrity information from the environment information and the specifying information. This example shows a case of using the digital signature.

(The Environment Information Storage Device 2003)

(1) The tamper preventing unit 2020 inputs the environment information (the existence information can be included) to the hash function to obtain a hash value a (S2001a).

(2) In the same way, the tamper preventing unit 2020 obtains a hash value b of the specifying information (S2001b).

(3) Then, the tamper preventing unit 2020 encrypts the hash value a of the environment information and the hash value b of the specifying information using the signature key and generates "integrity information a" corresponding to the environment information and "integrity information b" corresponding to the specifying information (S2002a, S2002b).

(The Terminal Device 2600)

(4) The terminal device 2600 obtains environment information, specifying information, integrity information a, and integrity information b. An obtaining method can be obtaining through storage medium, or obtaining by communication between the terminal device 2600 and the environment information storage device 2003.

(5) Next, the verifying unit 2601 of the terminal device 2600 obtains "hash value a" from the environment information as well as the tamper preventing unit 2020, and at the same time, obtains "hash value b" from the specifying information (S2003a, S2003b).

(6) On the other hand, the verifying unit 2601 decrypts "the integrity information a" and "the integrity information b" using the verification key (S2004a, S2004b), and compares each of "hash value a", "hash value b" and the hash value which is a decrypted result (S2005a, S2005b)

(7) As a result of the comparison, if the hash values which correspond each other are judged to be the same, the verifying unit 2601 judges that the environment information and the specifying information are correct information, namely, the environment information and specifying information are not tampered. As a result of the comparison, if it is judged to be different, the verifying unit 2601 judges that the environment information and specifying information are tampered. Here, the "another" example shows a case in which the environment information can include the existence information; however, the environment information does not include the existence information, but the integrity information can be generated based on the existence information.

Here, in the twenty-sixth embodiment, an example using the digital signature is shown; however, it is sufficient to generate the integrity information to confirm that the environment information (the existence information can be included), the specifying information or the existence information is not tampered, and another method can be done using such as a message authentication code, electronic watermark, CRC (Cyclic Redundancy Check).

As discussed above, by providing the terminal device 2600 with the verifying unit 2601, a confirming person who is not a dealer can verify that the environment information, the existence information, and the specifying information are not tampered. Therefore, a highly reliable environment information guaranteeing system can be accomplished.

Embodiment 27

In the following, the twenty-seventh embodiment will be explained by referring to FIGS. 47 through 50. The twenty-seventh embodiment is configured so that the environment information storage device 2003 and the terminal device 2600 communicate in the environment information guaranteeing system 2000 of the twenty-sixth embodiment. The twenty-seventh embodiment corresponds to the eighth embodiment.

Figure 47:
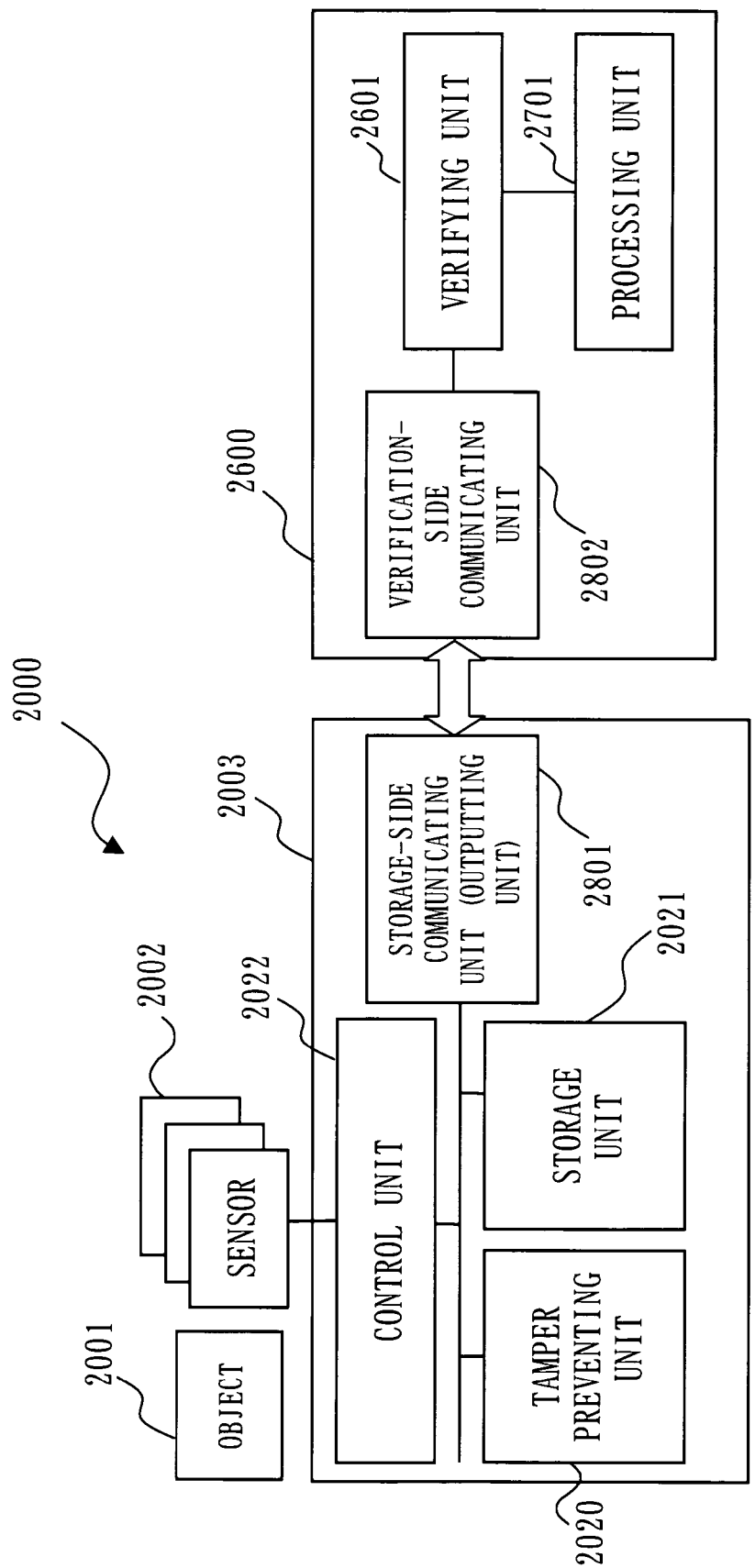
FIG. 47 is a configuration diagram of the environment information guaranteeing system 2000 according to the twenty-seventh embodiment.

FIG. 47 is a block diagram showing a configuration of the environment information guaranteeing system 2000 according to the twenty-seventh embodiment. The environment information storage device 2003 of the twenty-seventh embodiment further includes a storage-side communicating unit 2801 (an example of an outputting unit) to communicate with the terminal device 2600 in addition to the environment information storage device 2003 of the twenty-second embodiment shown in FIG. 37. Further, the terminal device 2600 of the twenty-seventh embodiment includes a verification-side communicating unit 2802 to communicate with the environment information storage device 2003 and a processing unit 2701 to process the environment information, etc. in addition to the terminal device 2600 of the twenty-sixth embodiment shown in FIG. 44.

(1) The storage-side communicating unit 2801 (an example of an outputting unit) is a communicating unit provided at the environment information storage device 2003 and communicates with equipments outside of the environment information storage device 2003 using wireless/wired LAN (Local Area Network), RS232C, Blue tooth (registered trademark), DSRC (Dedicated Short Range Communication), a mobile phone, etc.

(2) Further, the verification-side communicating unit 2802 of the terminal device 2600 receives information sent from the storage-side communicating unit 2801. In FIG. 47, the verification-side communicating unit 2802 directly receives the information sent from the storage-side communicating unit 2801. This is one of examples, and the verification-side communicating unit 2802 can receive information from the storage-side communicating unit 2801 through a relay device provided at a communication channel.

(3) The processing unit 2701 processes the environment information. For example, the processing unit 2701 displays the environment status during the transportation or storage based on the environment information, or displays an abnormal case of the environment information by searching.

(4) Here, as well as other embodiments, the environment information storage device 2003 can include the existence detecting unit 2023.

Figure 48:
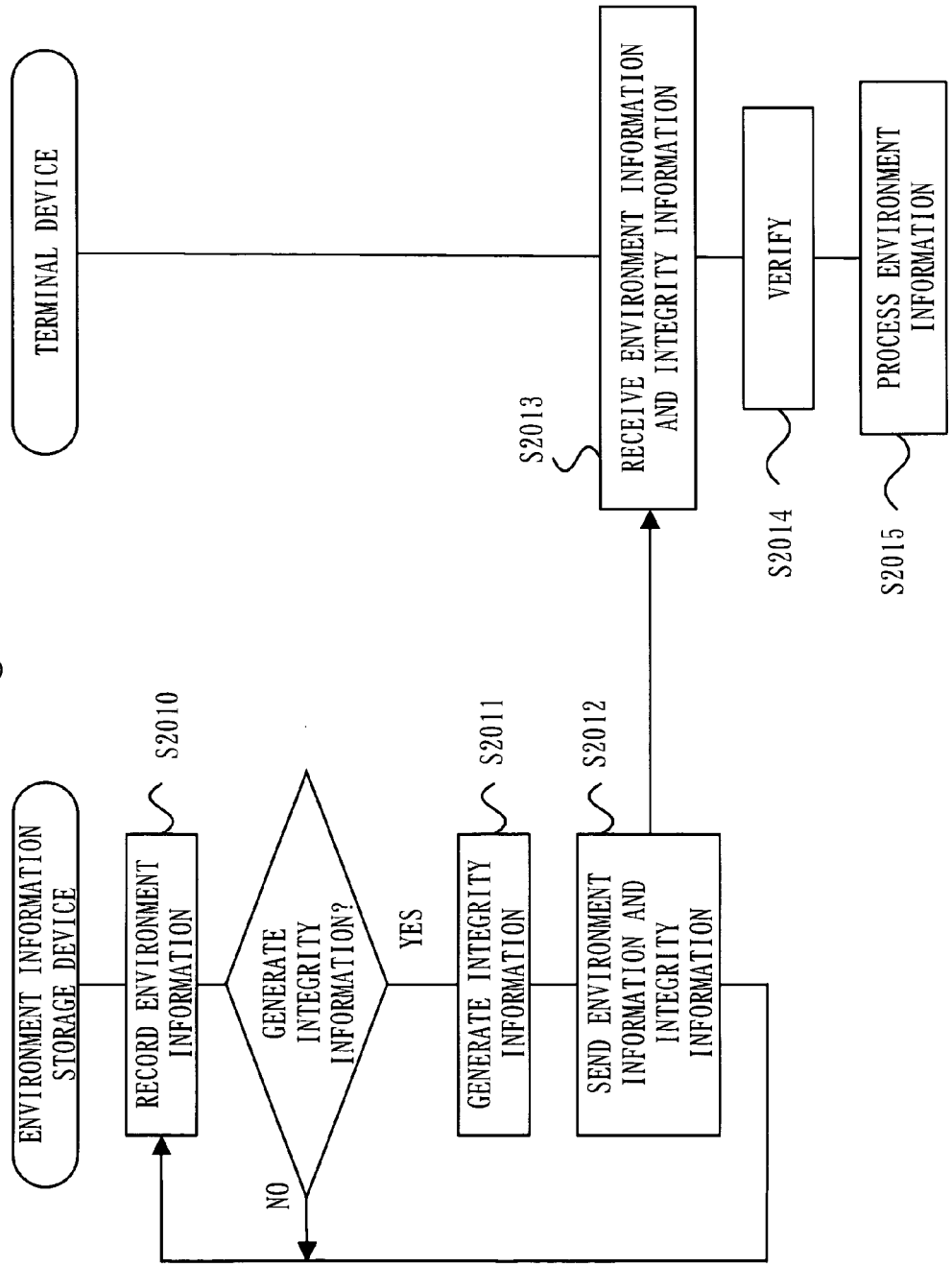
FIG. 48 is a diagram showing the operation according to the twenty-seventh embodiment.
Figure 49:
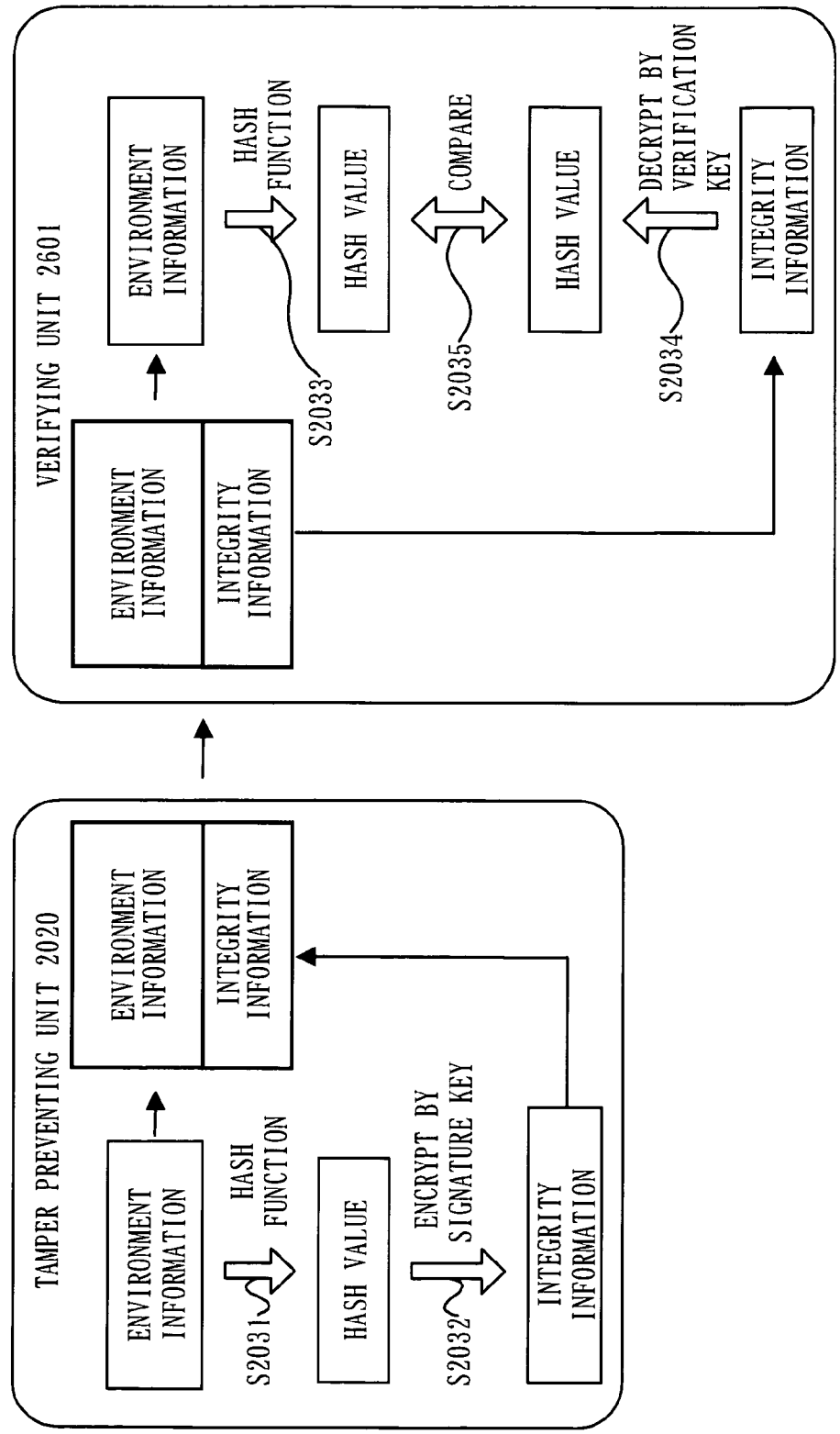
FIG. 49 shows authentication operation according to the twenty-seventh embodiment.

Next, the operation will be explained by referring to FIGS. 48 and 49. FIG. 48 shows a flow in the environment information guaranteeing system between the environment information storage device and a terminal available to a confirming person. The environment information storage device 2003 of the twenty-seventh embodiment generates the integrity information based on the environment information as shown in FIG. 49.

(The Environment Information Storage Device 2003)
(1) The environment information storage device 2003 records the environment information (S2010).
(2) Then, the tamper preventing unit 2020 generates the integrity information (S2011) at a necessary timing as shown in S2031 and S2032 of FIG. 49. The tamper preventing unit 2020 hashes the environment information.
(3) The storage-side communicating unit 2801 sends the environment information and the integrity information to the terminal device 2600 (S2012).

(The Terminal Device 2600)
(4) The terminal device 2600 available to the confirming person receives the environment information and the integrity information by the verification-side communicating unit 2802 (S2013).
(5) The verifying unit 2601 verifies the integrity information (S2014) as shown in S2033 through S2035 of FIG. 49.
(6) Then, if the authentication result by the verifying unit 2601 shows correct, the processing unit 2701 processes the environment information (S2015).

In the above example of (1) through (6), the environment information storage device 2003 sends the environment information and the integrity information after generating the integrity information (S2011, S2012). However, as shown in FIG. 39, the environment information storage device 2003 can send plural pieces of integrity information altogether with corresponding environment information after plural pieces of integrity information are generated. Namely, the timing to generate the integrity information by the environment information storage device 2003 and the timing to send the environment information and the integrity information can be any of the following (a) through (e):
(a) always; (b) when the transportation or storage finishes; (c) when a prescribed event occurs;
(d) a predetermined time interval; and (e) when communication is available.

Figure 50:
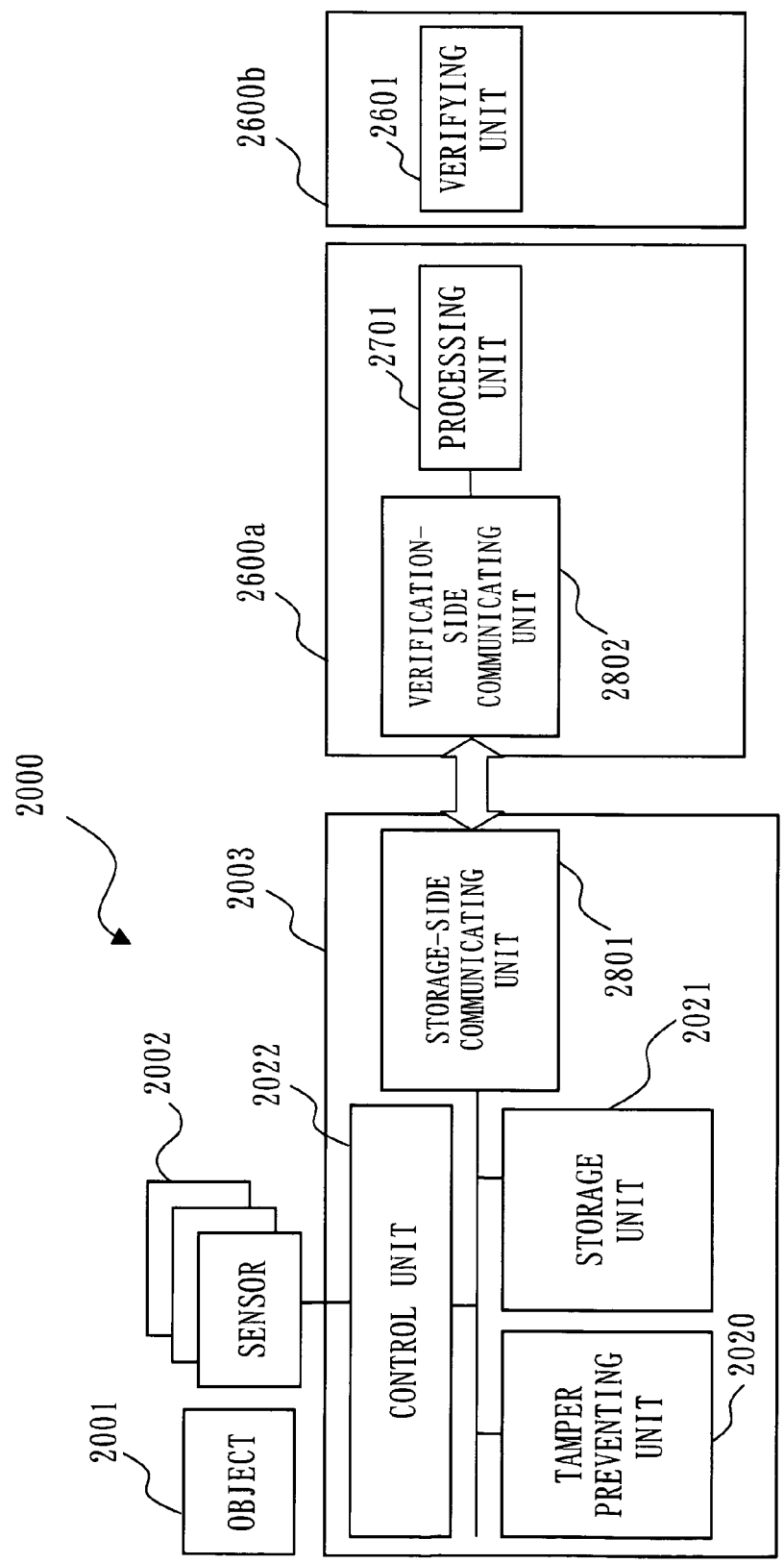
FIG. 50 is a diagram showing another system configuration according to the twenty-seventh embodiment.

Here, FIG. 48 shows a flow to process the environment information after verification is done by the terminal device 2600 (S2014, S2015). However, another flow can be applied, in which the terminal device 2600 processes the received environment information and according to the necessity, processes and verifies the environment information FIG. 50 is a block diagram showing another configuration of the environment information guaranteeing system 2000 according to the twenty-seventh embodiment. FIG. 50 is configured so that the terminal device 2600 of FIG. 47 is divided into a terminal device 2600*a* and a terminal device 2600*b*. As shown in FIG. 50, the first terminal device 2600*a* includes the verification-side communicating unit 2802 and the processing unit 2701. Further, the second terminal device 2600*b* includes the verifying unit 2601. In the case of such configuration, a requesting person or a user confirms the environment status from the environment information using the terminal device 2600*a* (a mobile phone, for example). Then, according to the necessity, a publicly-authorized third party organization verifies the correctness of the environment information by verifying the integrity information using the tamper preventing unit 2006*b* (a verification device) as a confirming person.

As discussed above, the environment information storage device 2003 of the twenty-seventh embodiment sends the environment information and the integrity information to the outside device using the storage-side communicating unit 2801. The outside device can verify/process the information, so that a highly convenient environment information guaranteeing system can be accomplished.

Embodiment 28

In the following, the twenty-eighth embodiment will be explained by referring to FIG. 51. The twenty-eighth embodiment is an embodiment in which the environment information storage device 2003 includes a sensor inside in the environment information guaranteeing system 2000. The twenty-eighth embodiment corresponds to the twentieth embodiment.

Figure 51:
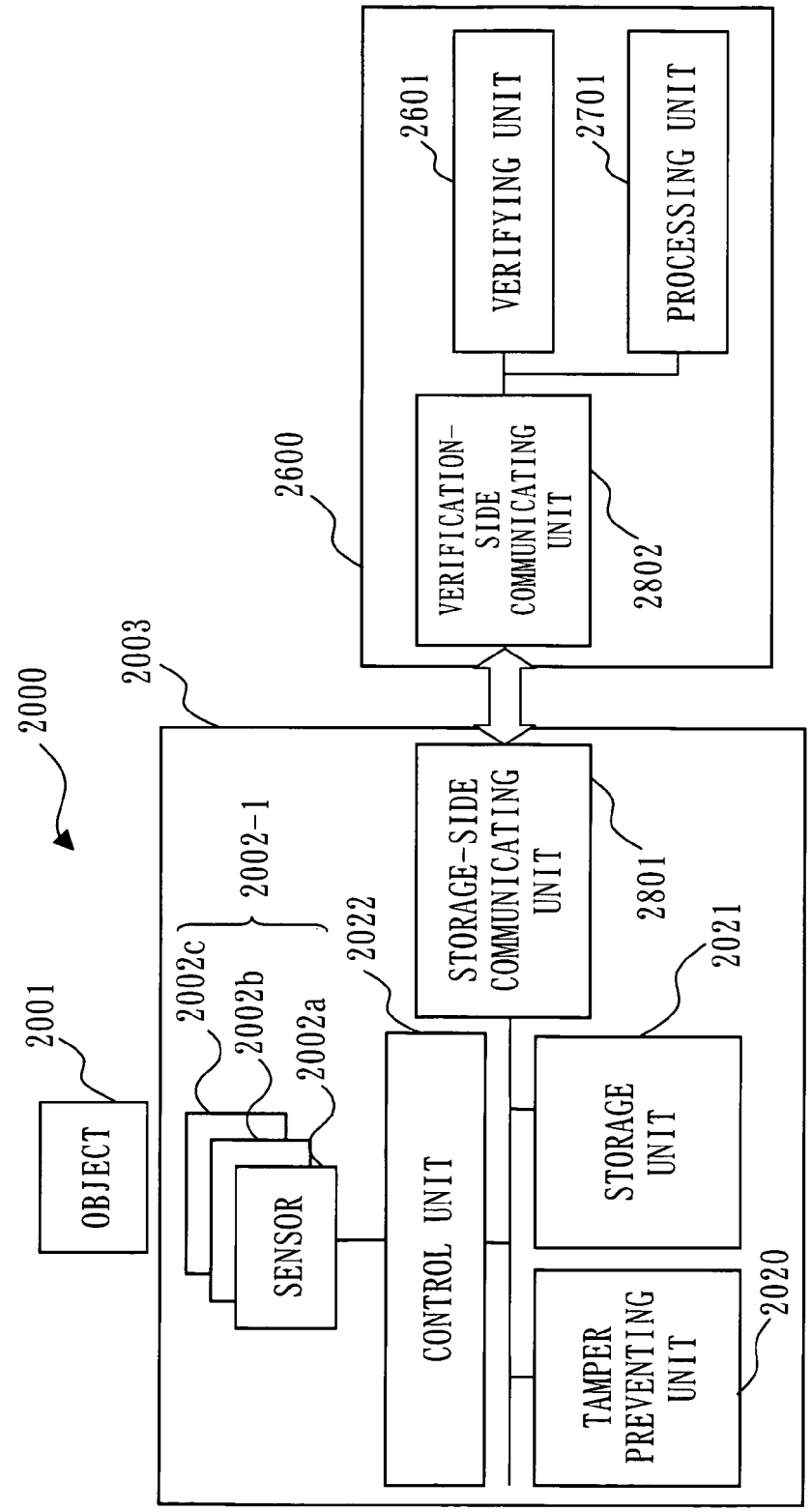
FIG. 51 is a configuration diagram of the environment information guaranteeing system 2000 according to the twenty-eighth embodiment.

FIG. 51 is a block diagram showing a configuration of the environment information guaranteeing system 2000 according to the twenty-eighth embodiment. In FIG. 51, a sensor 2002*a*, a sensor 2002*b*, a sensor 2002*c*, etc. detecting the environment information are provided inside of the environment information storage device 2003. The environment information storage device 2003 can be provided in the environment in which an object is placed or can be attached to the object.

Next, the operation of the environment information storage device 2003 according to the twenty-eighth embodiment will be explained; however, the operation is the same as the one of the twenty-second embodiment except that the environment information storage device 2003 includes the sensors 2002*a*, etc. inside.

The environment information storage device 2003 starts recording of the environment information detected by the sensors 2002*a*, etc. from a necessary timing. This timing can be timings at which the transportation or storage starts such as when an engine starts in the case of traffic means, when a warehouse, a cargo room, or a container closes, when a switch provided separately at the environment information storage device 2003 is turned ON, when the environment information of one or plural sensors enter within the prescribed range such as when an illuminance sensor detects the brightness and it becomes dark, etc.

The environment information detected by all the sensors connected is inputted to the control unit 2022. Then, the control unit 2022 stores the environment information in the device-side specifying information storage unit 2031 of the storage unit 2021. Then, at a necessary timing, by a command of the control unit 2022, the tamper preventing unit 2020 generates the integrity information of the environment information stored in the device-side specifying information storage unit 2031 similarly to S2031 and S2032 shown in FIG. 49 which shows the twenty-seventh embodiment. Then, the integrity information and the environment information are sent through the storage-side communicating unit 2801. The terminal 2600 available to the confirming person receives the environment information and the integrity information by the verification-side communicating unit 2802. Then, the verifying unit 2601 verifies the integrity information, and the processing unit 2701 processes the environment information.

In the twenty-eighth embodiment, the environment information and the integrity information is sent after generating the integrity information; however, after plural pieces of integrity information is generated, the environment information and the integrity information can be sent altogether. Namely, timing to generate the integrity information and timing to send the environment information and the integrity information can be any of the following timings of (a) through (e). (a) always, (b) when the transportation or storage finishes, (c) when a prescribed event occurs, (d) with a predetermined time interval, and (e) when communication is available. Further, as shown in FIG. 50, a configuration can be separated into the first terminal device 2600*a* having the verification-side communicating unit 2802 and the processing unit 2701 and the second terminal device 2600*b* having the verifying unit 2601.

As discussed above, by including the sensor inside the environment information storage device 2003, modification is not necessary such as providing a new sensor at a loading space, a luggage carrier, a cargo room, a container, a warehouse, etc., so that a highly reliable environment information guaranteeing system can be accomplished with low cost.

Embodiment 29

In the following, the twenty-ninth embodiment will be explained by referring to FIGS. 52 and 53. In the above twenty-seventh and twenty-eighth embodiments, the environment information storage device 2003 may possibly send information to an improper terminal device 2600. Here, in the twenty-ninth embodiment, a configuration will be explained, in which the environment information storage device 2003 is provided with a communicating partner authenticating unit 2901 (an example of an outputting destination authenticating unit) at the storage-side communicating unit 2801. The twenty-ninth embodiment corresponds to the ninth embodiment.

Figure 52:
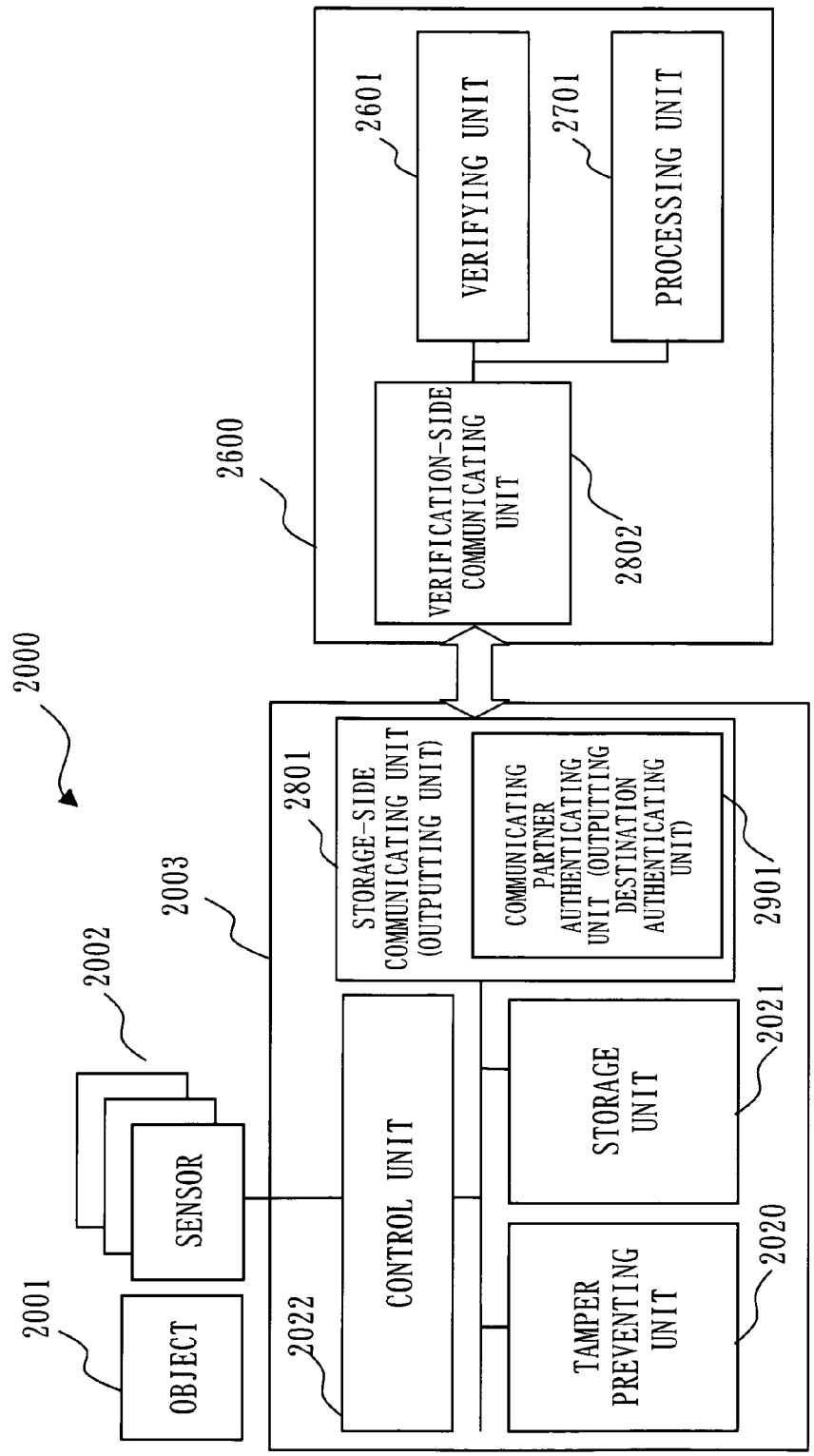
FIG. 52 is a configuration diagram of the environment information guaranteeing system 2000 according to the twenty-ninth embodiment.

FIG. 52 is a block diagram showing a configuration of the environment information guaranteeing system 2000 according to the twenty-ninth embodiment. FIG. 52 is different from FIG. 51 in that the storage-side communicating unit 2801 includes a communicating partner authenticating unit 2901. The communicating partner authenticating unit 2901 authenticates a communicating partner. Here, as well as other embodiments, the environment information storage device 2003 can include the existence detecting unit 2023 or can include a sensor inside.

Next, the operation will be explained. The operation of the environment information guaranteeing system 2000 according to the twenty-ninth embodiment is the same as the one of other embodiments. Namely, the environment information storage device 2003 records the environment information and generates the integrity information. Then, the environment information storage device 2003 transfers the environment information and the integrity information to the terminal device 2600 through the storage-side communicating unit 2801. The feature of the twenty-ninth embodiment is that the communicating partner authenticating unit 2901 authenticates the terminal device 2600 which is a communicating partner before this transfer.

Figure 53:
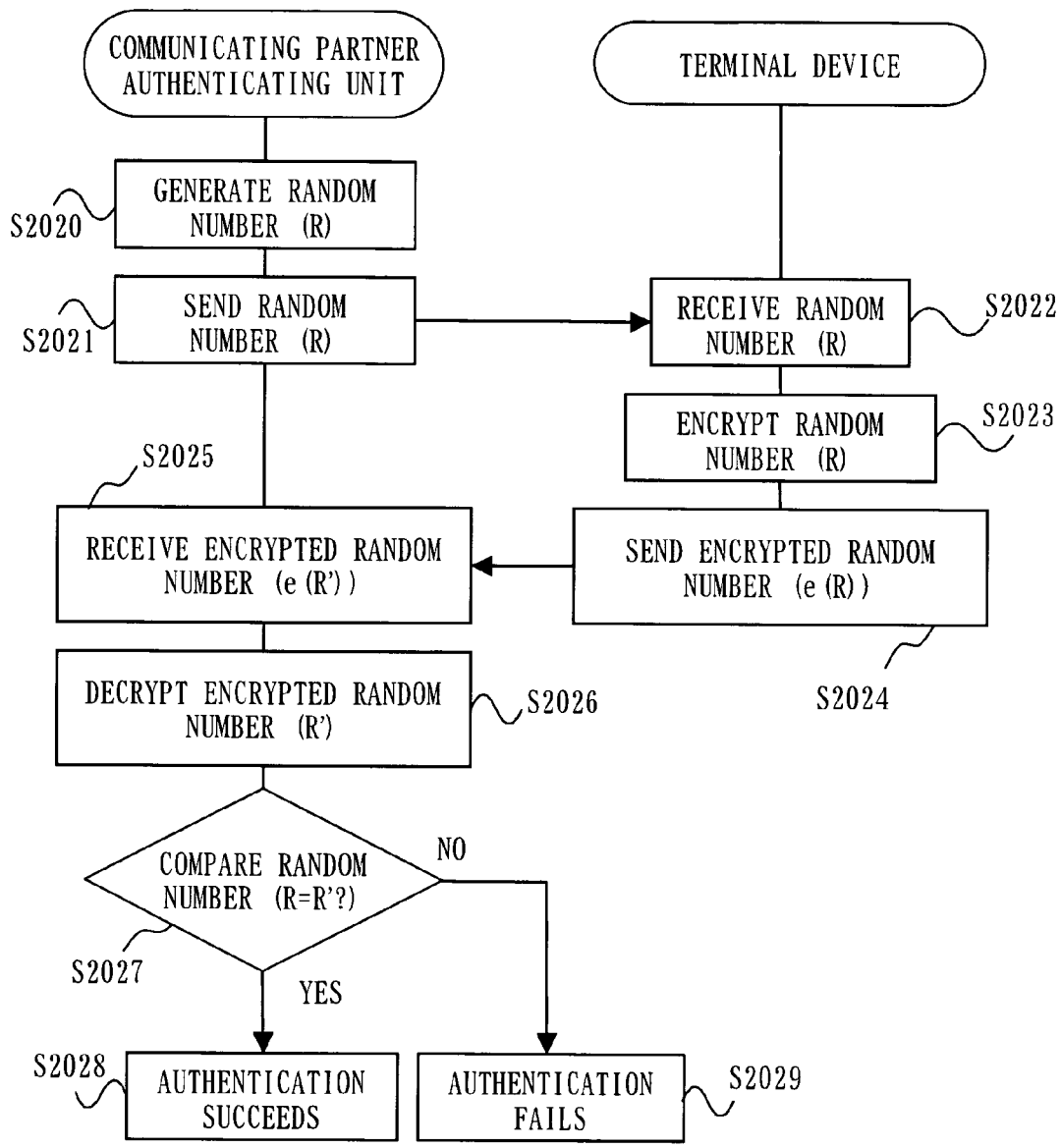
FIG. 53 shows authentication operation according to the twenty-ninth embodiment.

FIG. 53 shows an example of an authenticating method by the communicating partner authenticating unit 2901. In FIG. 53, it is assumed that the environment information storage device 2003 and the terminal device 2600 have an encryption key.

(1) The communicating partner authenticating unit 2901 generates a random number (R) (S2020) and sends to the terminal device 2600 (S2021).

(2) The terminal device 2600 receives the random number (R) (S2022), and after encrypting (e(R)) (S2023), sends to the environment information storage device 2003 (S2024).

(3) The communicating partner authenticating unit 2901 of the environment information storage device 2003 receives response data (e(R')) (S2025), decrypts it (S2026), and compares with the random number (R) generated previously (S2027).

(4) If the comparison results match (S2028), the operation finishes normally, and if mismatch (S2029), the operation finishes abnormally.

Here, in the twenty-ninth embodiment, the communicating partner authenticating unit 2901 of the environment information storage device 2003 carries out the comparison (S2027) after decrypting the received encrypted random number. However, this is one of examples, and the communicating partner authenticating unit 2901 can also encrypt the random number generated by itself and compare the encrypted result and the encrypted random number received from the terminal device 2600. Then, if the authentication succeeds, the storage-side communicating unit 2801 sends the environment information and the integrity information to the terminal device 2600. The terminal device 2600 verifies and processes using the environment information and the integrity information received at the verification-side communicating unit 2802. If the authentication fails, the storage-side communicating unit 2801 does not communicate with the terminal device 2600, but records information that the authentication fails in the storage unit 2021.

In the twenty-ninth embodiment, the random number encrypted at the terminal device is confirmed by the communicating partner authenticating unit 2901 (S2027); however, the terminal device can generate a message authentication code or a digital signature for the received random number to send back to the environment information storage device 2003, and the communicating partner authenticating unit 2901 of the environment information storage device 2003 verifies them.

As discussed above, the environment information and the integrity information are sent to the communicating partner after the storage-side communicating unit 2801 confirms the correct communicating partner as well as authenticating the communicating partner, which prevents fraudulent act such as analyzing the environment information and the integrity information, and an environment information storage device and an environment information guaranteeing system with higher reliability can be accomplished.

Embodiment 30

In the following, the thirtieth embodiment will be explained by referring to FIGS. 54 and 55. In the above twenty-second through twenty-ninth embodiments, the integrity (being not tempered) of the information outputted from the environment information storage device 2003 is verified. However, if the sensors are tampered, the tampering with the sensors cannot be detected. Therefore, the thirtieth embodiment will show an embodiment in which it is confirmed that the sensors are correct. The thirtieth embodiment corresponds to the twelfth embodiment.

Figure 54:
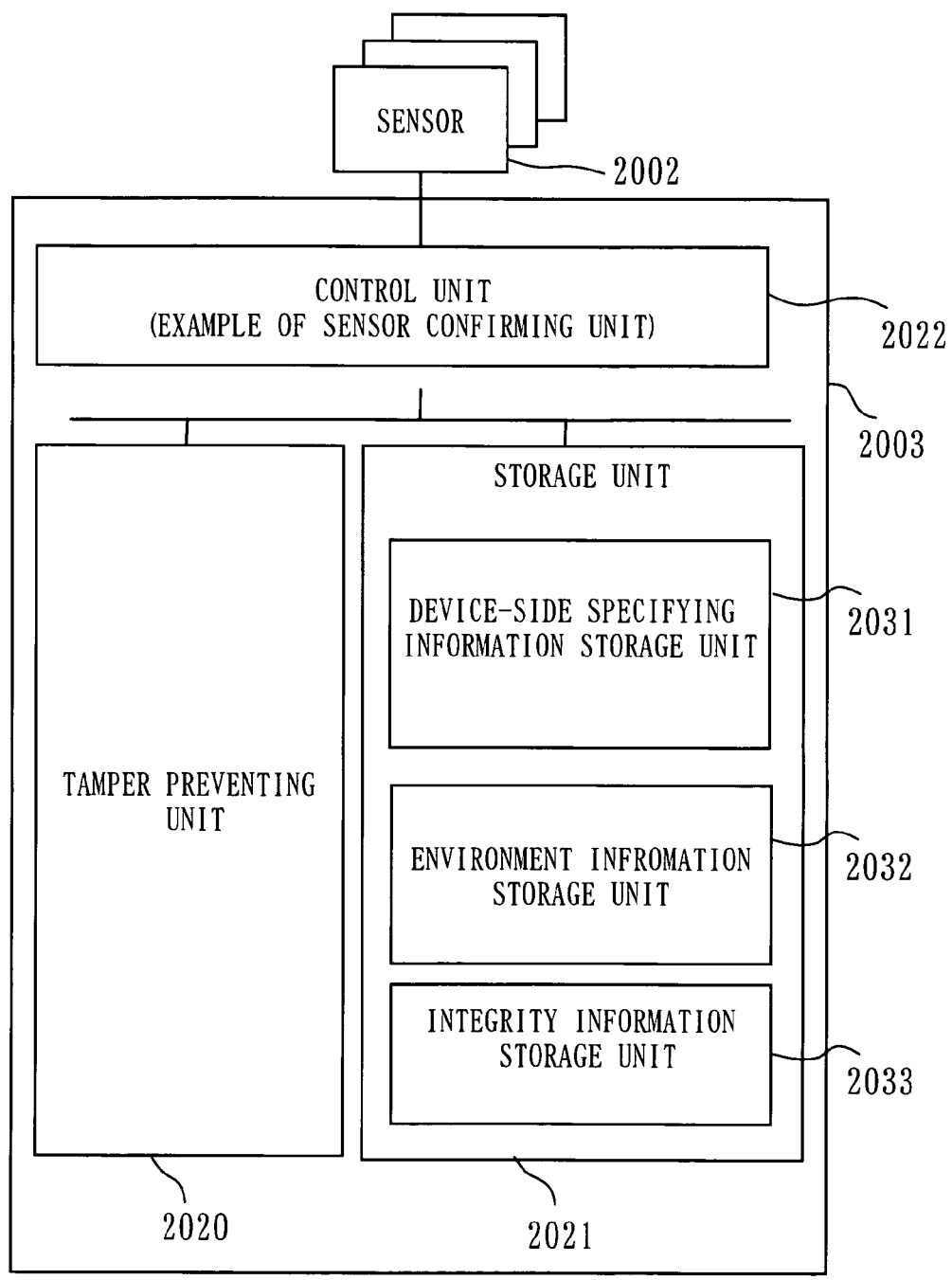
FIG. 54 is a configuration diagram of the environment information storage device 2003 according to the thirtieth embodiment.
Figure 55:
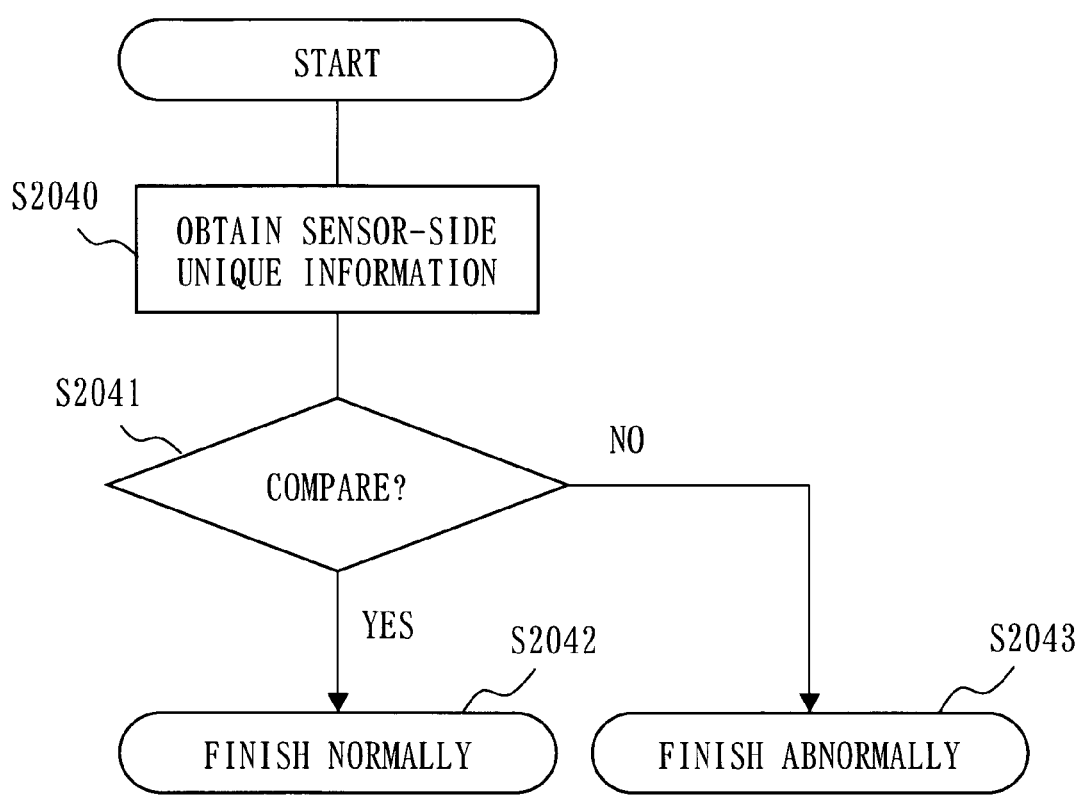
FIG. 55 shows authentication operation according to the thirtieth embodiment.

FIG. 54 shows a configuration of the environment information storage device 2003 according to the thirtieth embodiment. The environment information storage device 2003 of FIG. 54 has the same configuration with the environment information storage device 2003 of the twenty-second embodiment shown in FIG. 37; however, it is different that the control unit 2022 (one example of a sensor confirming unit)

includes a function to confirm that each sensor is correct. Here, although the control unit 2022 detects the correctness of the sensors, the configuration can include another configuration element to confirm the correctness of the sensors. Further, as well as other embodiments, the environment information storage device 2003 can include the existence detecting unit 2023 or the communicating partner authenticating unit 2901. Further, the environment information storage device 2003 can include a sensor inside.

Next, the operation will be explained using FIG. 55. The control unit 2022 confirms the sensor connected at a necessary timing. FIG. 55 is a flowchart showing an example of confirmation method.

(1) It is assumed that the sensor keeps "unique information" (sensor-side unique information, hereinafter) which is unique to the sensor. It is also assumed that the environment information storage device 2003 stores "storage-device-side unique information" corresponding to the "sensor-side unique information". When the sensor is a regular product which is not tampered, "the sensor-side unique information" and "the storage-device-side unique information" match. The control unit 2022 obtains "the sensor-side unique information" from the sensor at a necessary timing (S2040).

(2) Then, the control unit 2022 compares the obtained "sensor-side unique information" with the stored "storage-device-side unique information" (S2041).

(3) If the comparison results match, the control unit 2022 judges as normal and finishes normally (S2042), and records the contents for which the comparison finishes normally in the storage unit 2021. When the comparison results mismatch or when "the sensor-side unique information" cannot be obtained, the control unit 2022 judges as abnormal and finishes (S2043), and records that the operation abnormally finishes in the storage unit 2021. The control unit 2022 performs the above process for all sensors connected.

As discussed above, the control unit 2022 of the environment information storage device 2003 confirms the sensors are correct, which prevents fraudulent act to the sensors, so that an environment information storage device and an environment information guaranteeing system with higher reliability can be accomplished.

Embodiment 31

Figure 56:
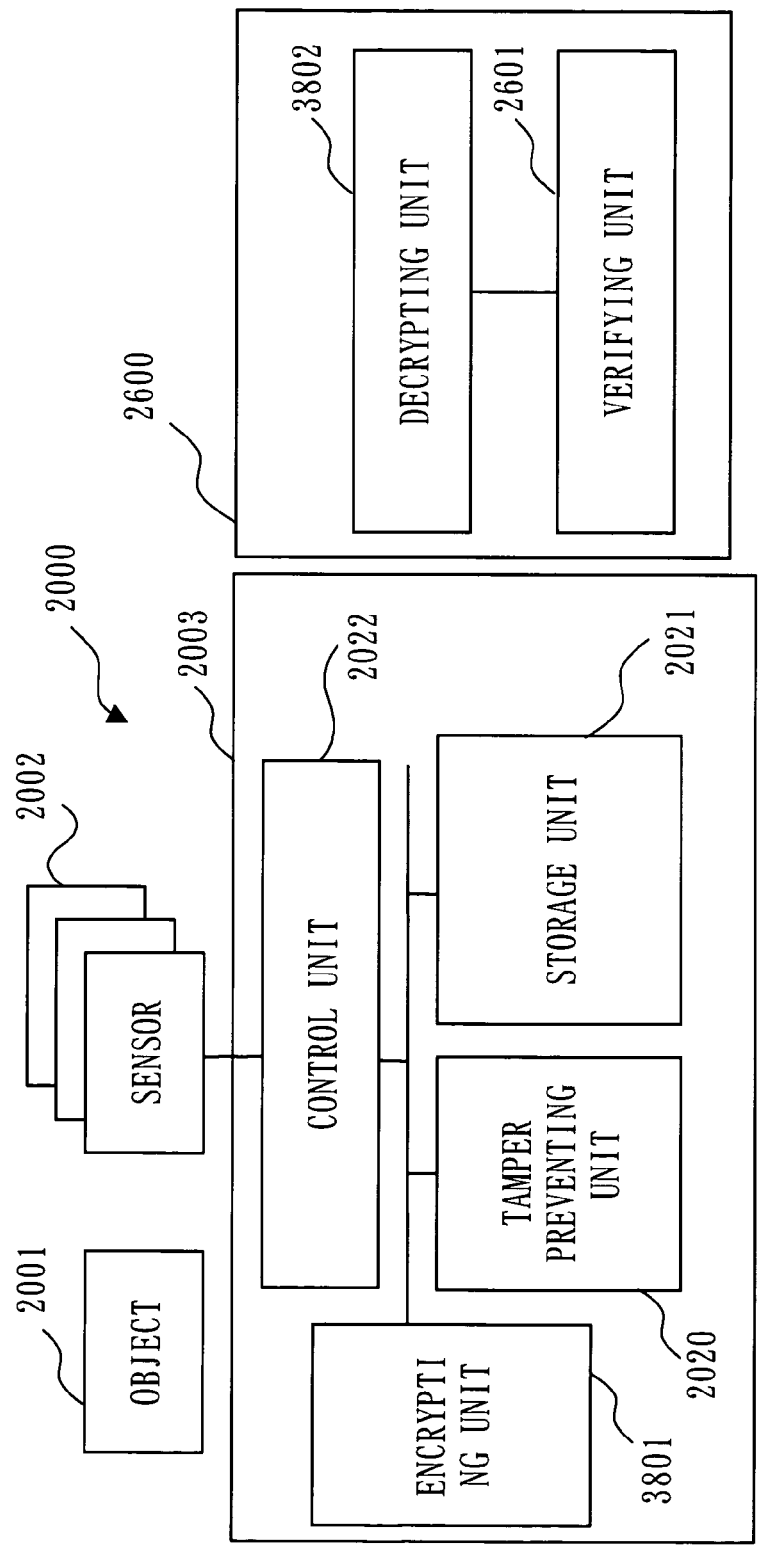
FIG. 56 is a configuration diagram of the environment information guaranteeing system 2000 according to the thirty-first embodiment.

In the following, the thirty-first embodiment will be explained by referring to FIG. 56. The above twenty-second through thirtieth embodiments show a system which maintains only the integrity of the environment information; however, the confidentiality is not maintained. Namely, the environment information might be wiretapped by the third party. Therefore, the thirty-first embodiment shows a case in which the confidentiality of the environment information is maintained. The thirty-first embodiment corresponds to the eighteenth embodiment FIG. 56 is a block diagram showing a configuration of the environment information guaranteeing system 2000 according to the thirty-first embodiment. FIG. 56 is a configuration in which the environment information storage device 2003 includes an encrypting unit 3801 and the terminal device 2600 includes a decrypting unit 3802 in addition to the twenty-sixth embodiment of FIG. 44. The encrypting unit 3801 encrypts the environment information. The decrypting unit 3802 decrypts the obtained information. Here, as well as other embodiments, the environment information storage device 2003 can include the existence detecting unit 2023, the communicating partner authenticating unit 2901, or a function to confirm sensors. Further, the environment information storage device 2003 can include a sensor inside.

In the configuration shown in FIG. 56, the environment information storage device 2003 encrypts the environment information using the encrypting unit 3801 before outputting the environment information or after generating the integrity information. According to the thirty-first embodiment, a target for encryption is the environment information; however, other information such as the specifying information or the integrity information, etc. can be included for the encryption. Then, the environment information which is encrypted and outputted is decrypted by the decrypting unit 3802 of the terminal device 2600 and verified as well as other embodiments.

Like this, the environment information storage device 2003 of the thirty-first embodiment outputs the environment information encrypted by the encrypting unit 3801, so that an environment information storage device or an environment information guaranteeing system which can maintain the confidentiality of the environment information even if the environment information is wiretapped in the communication channel.

Embodiment 32

In the following, the thirty-second embodiment will be explained by referring to FIG. 57. The thirty-second embodiment is an embodiment in which the environment information storage device 2003 stores storage information discussed later.

The above twenty-second through the thirty-first embodiments, the explanation is done that the information such as the specifying information to specify the environment (the twenty-second embodiment), the key used for authentication (the twenty-ninth embodiment), the encrypting key used for encryption (the thirty-first embodiment), etc. are stored in the environment information storage device 2003 beforehand. The "storage information" which is stored in the environment information storage device beforehand such as the specifying information varies according to the organization or the environment in which the system is operated. Therefore, each of the environment information storage device 2003 usually has a different value. Further, the storage information which is once stored sometimes needs to be changed. Consequently, the storage information needs to be recorded/changed after shipment of the environment information storage device.

On the other hand, the storage information is important information in the system to maintain the integrity of the environment information. Therefore, storage of the storage information must be done by a correct organization, persons who belongs to it, a correct terminal, and a correct equipment. Or only correct storage information must be stored as the storage information. Therefore, the following will show an embodiment in which the storage information is stored in the environment information storage device 2003.

Figure 57:
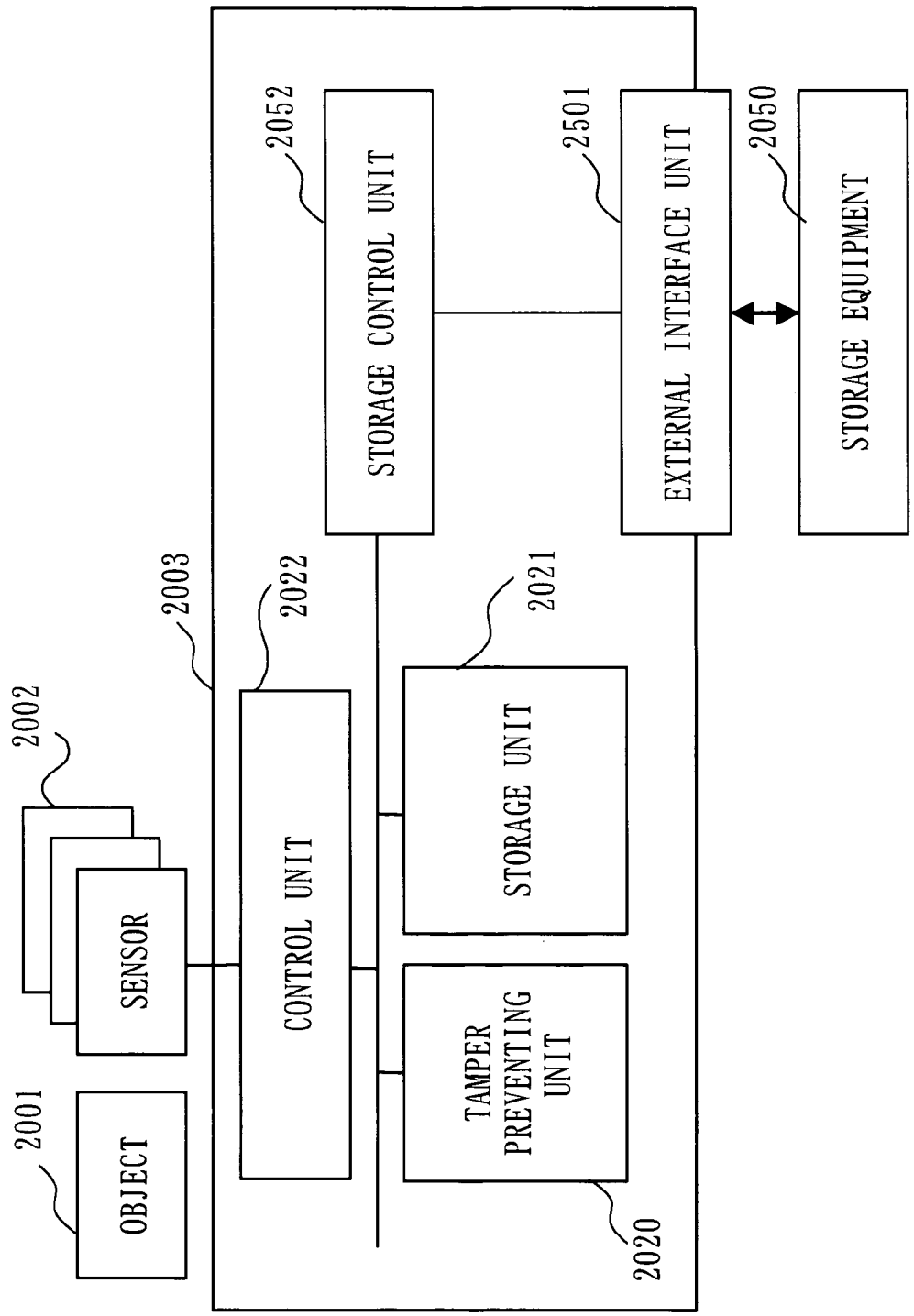
FIG. 57 is a configuration diagram of the environment information storage device 2003 according to the thirty-second embodiment.

FIG. 57 is a block diagram showing a configuration of the environment information storage device 2003 according to the thirty-second embodiment. The environment information storage device 2003 of FIG. 57 further includes an external interface unit 2051 and a storage control unit 2052 in addition to the environment information storage device 2003 of the twenty-second embodiment shown in FIG. 37.

(1) A storage equipment 2050 is an equipment to transfer the storage information to the environment information storage device 2003 by communicating with the external interface unit 2051 such as a contact/uncontact IC card or a PC (Personal Computer).

(2) The external interface unit 2051 is an interface provided at the environment information storage device 2003 to store the storage information such as contact/uncontact IC card interface, wireless/wired LAN interface, RS232C interface, Blue tooth (registered trademark) interface, etc.

(3) The storage control unit 2052 confirms the correctness of the storage equipment and/or the correctness of the transferred storage information through the external interface unit 2051.

(4) Here, as well as other embodiments, the environment information storage device 2003 can include the existence detecting unit 2023, the communicating partner authenticating unit 2901, or a function to confirm sensors. Further, the environment information storage device 2003 can include a sensor inside.

(Authentication of the Storage Equipment)

In the above configuration of FIG. 57, the environment information storage device 2003 authenticates the storage equipment by the storage control unit 2052 before storing the storage information transferred from the storage equipment 2050. When the external interface unit 2051 inputs the storage information (predetermined information) from the storage equipment 2050, the storage control unit 2052 authenticates if the storage equipment 2050 is correct by communicating with the storage equipment 2050. If it is judged to be correct, the storage information is stored in the device-side specifying information storage unit 2031. Before inputting the storage information, the storage control unit 2052 authenticates the storage equipment 2050 and stores the storage information only if it is authenticated as correct. Or the storage control unit 2052 can authenticate the storage control unit 2052 after inputting the storage information from the storage control unit 2052, and can store the storage information only if it is authenticated as correct. There are some methods for authentication of the storage equipment 2050; a method by a secret number stored in the environment information storage device 2003 beforehand; or an authentication method shown in FIG. 53 of the twenty-ninth embodiment, etc. The secret number used for the authentication and the encryption key used for encryption can be stored when the environment information storage device 2003 is manufactured. By this authentication, if the storage equipment is the correct one, the storage control unit 2052 stores the transferred storage information in the storage unit 2021.

(Authentication of the Storage Information)

Further, before storing the storage information transferred from the storage equipment, the environment information storage device 2003 can confirm the correctness of the storage information by the storage control unit 2052. Namely, the storage control unit 2052 authenticates if the storage information inputted by the external interface unit 2051 is correct or not, and stores the storage information in the device-side specifying information storage unit 2031 if the storage information is judged to be correct. As the authentication method at this time, the same method can be used with the method for maintaining the integrity of the integrity information which has been discussed with FIGS. 45 and 46 in the twenty-sixth embodiment. Namely, it is the method for confirming the integrity (being tampered or not) of the storage information.

Here, any one of the authentication of the storage equipment 2050 and the confirmation of the storage information can be carried out. Or both authentication can be combined and used. Further, the storage information transferred from the storage equipment 2050 can be encrypted like the thirty-first embodiment.

Here, in FIG. 57, the storage control unit 2052 is connected to the control unit 2022, the storage unit 2021, and the tamper preventing unit 2020. However, this is one of examples, another configuration can be done in which the storage control unit 2052 is connected only to the storage unit 2021.

Like this, the environment information storage device 2003 according to the thirty-second embodiment includes the storage control unit, so that the storage information by the correct organization, a person belonging to it, the correct terminal or equipment is stored, or only correct storage information is stored. Consequently, the environment information storage device 2003 of the thirty-second embodiment can increase the convenience of the system, and at the same time, safer environment information guaranteeing system can be accomplished. Further, when the secret number or the encryption key used by the storage control unit 2052 is changed, by configuring so as to be changeable through the process employing this means, the reliability/security of the environment information storage device 2003 can be increased and the convenience can be also increased.

Embodiment 33

In the following, the thirty-third embodiment will be explained by referring to FIG. 58. The thirty-third embodiment is an embodiment in which the environment information storage device 2003 includes a clock unit 2060 for generating information related to time and date.

Figure 58:
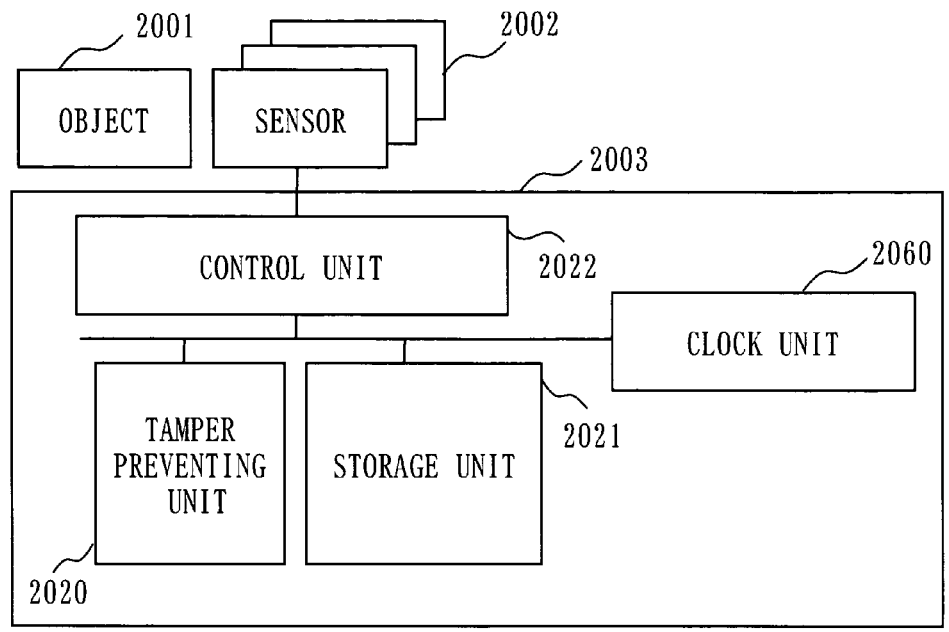
FIG. 58 is a configuration diagram of the environment information storage device 2003 according to the thirty-third embodiment.

FIG. 58 is a diagram showing a configuration of the environment information storage device 2003 according to the thirty-third embodiment. Different from the environment information storage device 2003 of the twenty-second embodiment shown in FIG. 37, the environment information storage device 2003 of the thirty-third embodiment further includes the clock unit 2060.

The clock unit 2060 is connected to the control unit 2022, and at the same time generates information related to time and date, for example, generates a date and a time. Here, as well as other embodiments, the environment information storage device 2003 can include the existence detecting unit 2023, the communicating partner authenticating unit 2901, or a function to confirm sensors. Further, the environment information storage device 2003 can include the sensor inside.

In the above configuration of FIG. 58, the environment information storage device 2003 uses the information generated by the clock unit 2060 when the control unit 2022 records the environment information in the storage unit 2021. For example, when calculating a time at which the environment information is obtained or a time period when a specific event occurs, the control unit 2022 uses the information provided by the clock unit 2060 and adds the time obtained or the calculated time period to the environment information.

As discussed above, the environment information storage device 2003 includes the clock unit 2060 inside, so that it is unnecessary to obtain the information of time and date from the outside of the environment information storage device 2003. Because of this, tampering with time and date information becomes difficult. Therefore, it is possible to provide a highly reliable environment information storage device.

Here, by using the configuration discussed in the thirty-second embodiment in order to adjust the time and date information kept by the clock unit 2060, the time and date by the clock unit 2060 becomes highly reliable information. Namely, information is obtained from the storage equipment 2050 as discussed above in the thirty-second embodiment in order to adjust the time and date information kept by the clock unit 2060. At this time, the storage control unit 2052 is configured to authenticate the storage equipment 2050 or to authenticate the information to be obtained. Further, the clock unit 2060 is provided according to the thirty-third embodiment; however, a function of the clock unit 2060 can be embedded in the control unit 2022.

Embodiment 34

In the following, the thirty-fourth embodiment will be explained by referring to FIG. 59. The thirty-fourth embodiment will explain a case in which the environment information storage device 2003 includes an automatically adjusting unit 2061 which automatically adjusts information related to time and date.

Figure 59:
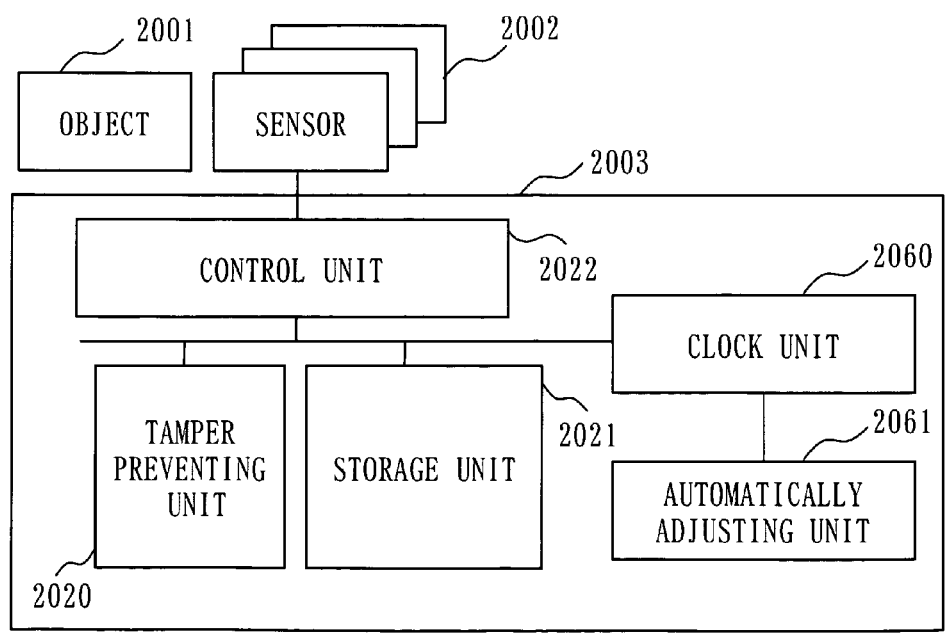
FIG. 59 is a configuration diagram of the environment information storage device 2003 according to the thirty-fourth embodiment.

FIG. 59 is a diagram showing a configuration of the environment information storage device 2003 according to the thirty-fourth embodiment. Different from the environment information storage device 2003 of FIG. 58, the environment information storage device 2003 of the thirty-fourth embodiment further includes the automatically adjusting unit 2061. The automatically adjusting unit 2061 receives information related to the standard time from the outside of the environment information storage device 2003 and adjusts the clock unit 2060 based on the received information. Here, as well as other embodiments, the environment information storage device 2003 can include the existence detecting unit 2023, the communicating partner authenticating unit 2901, or a function to confirm sensors. Further, the environment information storage device 2003 can include the sensor inside.

In the above configuration of FIG. 58, the environment information storage device 2003 uses the time and date information provided by the clock unit 2060 modified by the automatically adjusting unit 2061. For example, the information provided by the clock unit 2060 modified is used in order to calculate a time when the environment information is obtained or a time period when a specific event occurs.

As discussed above, the environment information storage device 2003 includes the automatically adjusting unit 2061 which automatically adjusts the time and date information inside, so that tampering with the time and date information becomes difficult, and further maintenance for adjustment is unnecessary. Therefore, the reliability and convenience of the environment information storage device can be improved.

Embodiment 35

In the following, the thirty-fifth embodiment will be explained by referring to FIGS. 60 and 61. The thirty-fifth embodiment corresponds to the twenty-first embodiment. The thirty-fifth embodiment is an embodiment in which the environment information storage device 2003 shown in the twenty-second embodiment is grasped as an environment information storage method and an environment information storage program. The environment information storage device 2003 is a computer. A series of the operations of a control unit 2022 (an information inputting unit), an environment information storage unit 2032 (a sensor information storage unit), a tamper preventing unit 2020 (a tamper verifying information generating unit), and an integrity information storage unit 2033 (a tamper verifying information storage unit) of the environment information storage device 2003 which is a computer relate to each other, and this series of the operations can be grasped as an environment information storage method.

Figure 60:
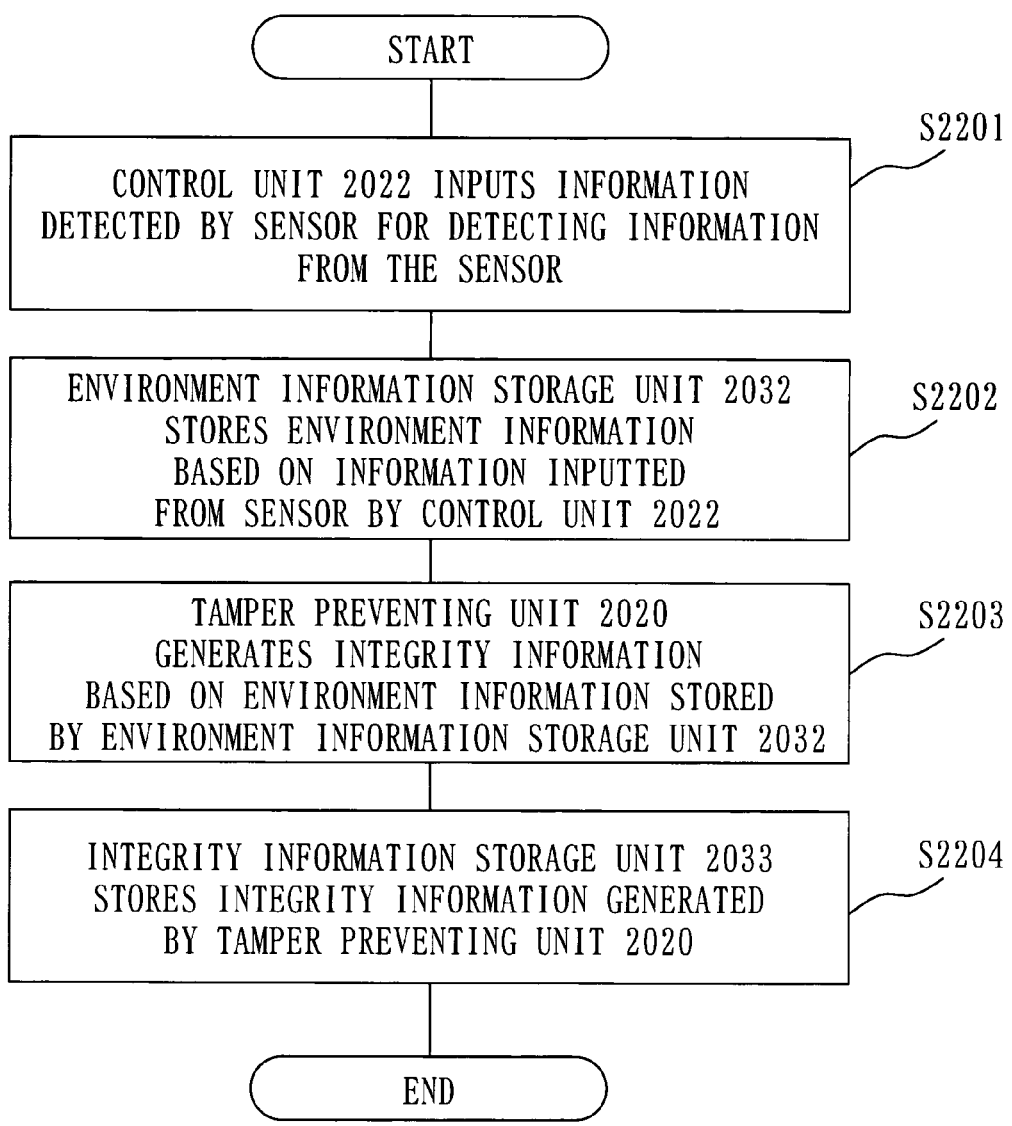
FIG. 60 is a flowchart of an environment information storage method according to the thirty-fifth embodiment.

FIG. 60 is a flowchart of a case in which the operation of the control unit 2022, etc. of the environment information storage device 2003 of FIG. 37 is grasped as an environment information storage program.

(1) At S2201, the control unit 2022 inputs information detected by a sensor for detecting information.

(2) At S2202, the environment information storage unit 2032 stores environment information (sensor information) based on the information inputted from the sensor by the control unit 2022.

(3) At S2203, the tamper preventing unit 2020 generates integrity information (tamper verifying information) used for verifying if the environment information is tampered or not based on the environment information stored by the environment information storage unit 2032.

(4) At S2204, the integrity information storage unit 2033 stores the integrity information generated by the tamper preventing unit 2020.

Figure 61:
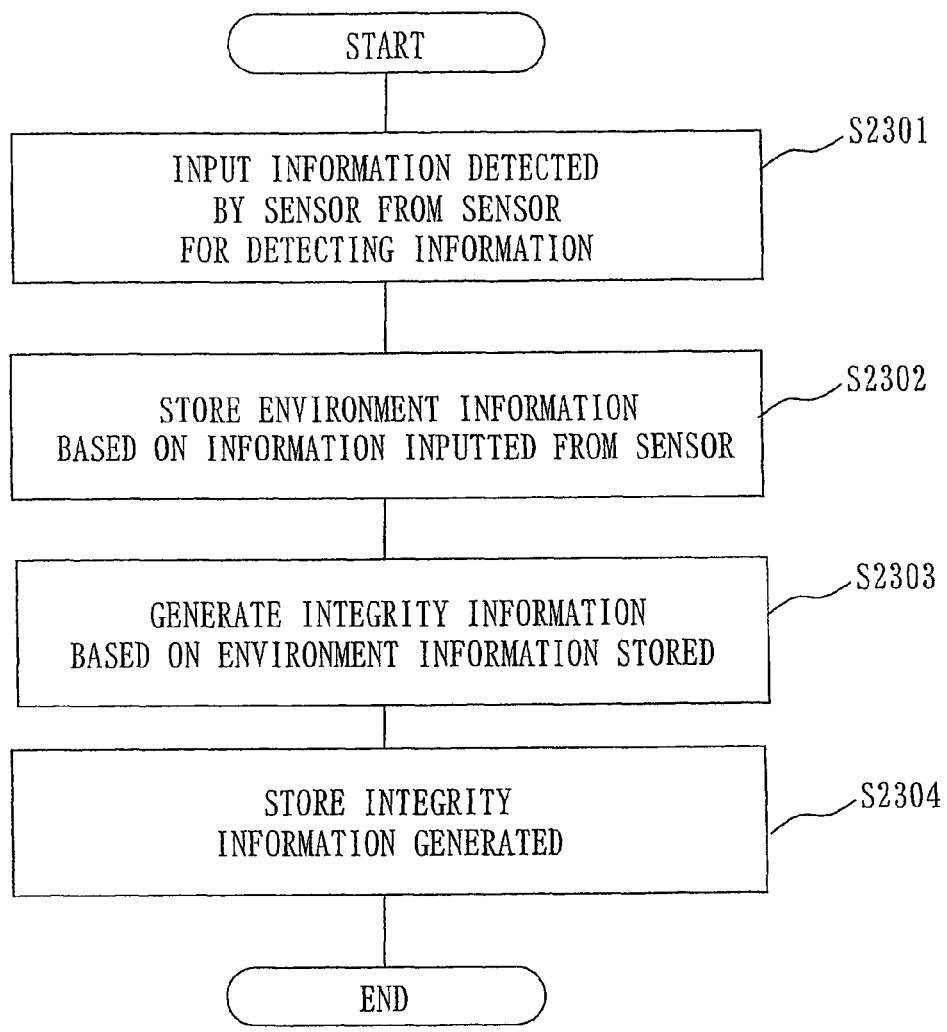
FIG. 61 is a flowchart of an environment information storage program according to the thirty-fifth embodiment.

Further, FIG. 61 shows a flowchart of an environment information storage program to be executed by the environment information storage device 2003 of FIG. 37 which is a computer.

(1) S2301 is a process to input information detected by a sensor from the sensor for detecting information.

(2) S2302 is a process to store environment information (sensor information) based on the information inputted from the sensor.

(3) S 2303 is a process to generate integrity information used for verifying if the environment information is tampered or not based on the environment information stored.

(4) S2304 is a process to store the integrity information generated.

As discussed above, the environment information storage method and the environment information storage program generate the integrity information for verifying the integrity of the environment information, so that a highly reliable environment information storage device for storing the environment information can be accomplished.

In the foregoing embodiments, in a system including plural sensors for detecting information related to environment of an object during the transportation or storage and monitoring the status/environment of the object, the environment information storage device has been explained, in which a storage unit for storing information of the sensor and specifying information which can specify the environment; a tamper preventing unit for preventing tampering with the information stored; and a control unit for controlling these operations.

In the foregoing embodiments, the environment information storage device has been explained, in which the control unit calculates the sensor information and the storage unit records calculated result of the control unit.

In the foregoing embodiments, the environment information storage device has been explained, in which the existence detecting unit detects that an object exists in the environment, and the storage unit also records output information of the existence detecting unit.

In the foregoing embodiments, in an environment information guaranteeing system including the environment information storage device and a verification device, the environment information guaranteeing system has been explained, in which the environment information storage device includes the storage unit for storing the sensor information, calculated result of the control unit, and the specifying information which can specify the environment; the tamper preventing unit for preventing tampering with the information stored; the control unit for controlling these operations and calculating the sensor information; and the existence detecting unit for detecting that the object exists in the environment, and the verification device includes a verifying unit for verifying if the information inputted is tampered or not.

In the foregoing embodiments, in the environment information guaranteeing system including the environment information storage device and the verification device, the environment information guaranteeing system has been explained, in which the environment information storage device includes the storage unit for storing the sensor information, the calculated result of the control unit, and the specifying information which can specify the environment; the tamper preventing unit for preventing tampering with the information stored; the control unit for controlling these operations and calculating the sensor information; and the existence detecting unit for detecting that the object exists in the environment; and a communicating unit for communicating with an equipment outside, and the verification device includes the verifying unit for verifying if the information inputted is tampered or not; a receiving unit for receiving information from the equipment outside; and a processing unit for processing by referring to an output of the verifying unit.

In the foregoing embodiments, the environment information storage device has been explained, which includes plural sensors for detecting information related to the environment of the object during the transportation or storage; the existence detecting unit for detecting that the object exists in the environment; the tamper preventing unit for preventing tampering with the information detected by the sensors and existence detecting unit or the calculated result; the control unit for controlling these operations and calculating the sensor information; the communicating unit for communicating the equipment outside; and the storage unit storing the information detected by the sensors and the existence detecting unit, the output of the tamper preventing unit, and the specifying information which can specify the environment.

In the foregoing embodiments, in the environment information guaranteeing system including the environment information storage device and the verification device, the environment information guaranteeing system has been explained, in which the environment information storage device includes plural sensors for detecting information related to the environment of the object during the transportation or storage; the existence detecting unit for detecting that the object exists in the environment; the tamper preventing unit for preventing tampering with the information detected by the sensors and existence detecting unit or the calculated result; the control unit for controlling these operations and calculating the sensor information; the communicating unit for communicating the equipment outside; and the storage unit for storing the information detected by the sensors and the existence detecting unit, the output of the tamper preventing unit, and the specifying information which can specify the environment, and the verification device includes the verifying unit for verifying if the information inputted is tampered or not; the receiving unit for receiving the information from the environment information storage device; and the processing unit for processing by referring to the output of the verifying unit.

In the foregoing embodiments, the environment information storage device has been explained, which includes a communicating partner authenticating unit for authenticating a communicating partner and communicates only if the communicating partner is correct.

In the foregoing embodiments, the environment information storage device has been explained, which confirms authenticity of the sensors.

In the foregoing embodiments, the environment information storage device has been explained, which encrypts the environment information and the specifying information which can specify the environment.

In the foregoing embodiments, the environment information storage device has been explained, which confirms correctness of storage equipment or storage information before storing the storage information.

In the foregoing embodiments, the environment information storage device has been explained, which generates information related to time and date inside of the environment information storage device itself.

In the foregoing embodiments, the environment information storage device has been explained, which can automatically adjust the information related to time and date inside of the environment information storage device itself.

Explanation of Signs

1: a moving object; 2: a group of sensors, 2a, 2b, 2c: sensors; 3: a moving object information storage device; 20: a tamper preventing unit; 21: a storage unit; 22: a control unit; 31: a device-side unique information storage unit; 32: a moving object information storage unit; 33: an integrity information storage unit; 34: a moving object information group storage unit; 60: a seal; 61: a screen for responding to a secret number; 62: a touch panel; 201: a device-side operating unit; 301: a moving-object-side unique information processing unit; 302: a separation preventing unit; 303: a special screw; 311: a moving-object-side unique information storage unit; 401: a buttery; 402: a signal line; 501: an information deleting unit; 600, 600a, 600b: a moving object information verification device; 601: a verifying unit; 701: a processing unit; 801: a storage-side communicating unit; 802: a verification-side communicating unit; 805: a computer system; 810: a CPU; 811: a ROM; 812: a sensor; 813: a communication board; 820: a magnetic disk device; 821: an OS; 823: a group of programs; 824: a group of files; 901: a communicating partner authenticating unit; 1001: an IC card; 1201: a sensor confirming unit; 1301: a range judging unit; 1401: a selecting unit; 1402: a service management table; 1601: a man-machine interface unit; 1701: an operator authenticating unit; 1801: an encrypting unit; 1802: a decrypting unit; 2000: an environment information guaranteeing system; 2001: an object; 2002: a group of sensors; 2002-1, 2002-2: a group of sensors; 2002a, 2002b, 2002c: sensors; 2003: an environment information storage device; 2020: a tamper preventing unit; 2021: a storage unit; 2022: a control unit; 2023: an existence detecting unit; 2031: a specifying information storage unit; 2032: an environment information storage unit; 2033: an integrity information storage unit; 2040, 2040a, 2040b: a warehouse/container; 2041: a door/cover; 2042: an opening/closing detecting sensor; 2043: a wireless tag; 2044: a wireless tag reader; 2045: an identifying information comparing unit; 2050: a storage equipment; 2051: an external interface unit; 2052: a storage control unit; 2060: a clock unit; 2061: an automatically adjusting unit; 2201: a device-side operating unit; 2600, 2600a, 2600b: terminal devices; 2601: a verifying unit; 2701: a processing unit; 2801: a storage-side communicating unit; 2802: a verification-side communicating unit; 2901: a communicating partner authenticating unit; 3201: a sensor confirming unit; 3801: an encrypting unit; and 3802: a decrypting unit.

The invention claimed is:

1. An information storage device for storing information related to a moving object in which the information storage device is equipped, the moving object including a moving-object-side specifying information storage unit storing moving-object-side specifying information which specifically identifies the moving object, the information storage device comprising:
- a device-side specifying information storage unit that stores device-side specifying information which identifies the moving object in which the information storage device is equipped;
- an information storage unit that stores sensor information received from a sensor, said sensor information being related to the moving object;
- a tamper verifying information generating unit that generates tamper verifying information based on obtained specifying information and the stored sensor information, the tamper verifying information for verifying whether or not the specifying information or the sensor information has been tampered with;
- a tamper verifying information storage unit that stores the generated tamper verifying information; and
- a moving object judging unit that determines whether the moving object in which the information storage device is currently equipped is an appointed moving object which has previously been appointed for the information storage device to be equipped in, and
- wherein the moving object judging unit retrieves the device-side specifying information stored in the device-side specifying information storage unit and the moving-object-side specifying information stored in the moving-object-side specifying information storage unit, and determines whether or not the equipped moving object is the appointed moving object based on the device-side specifying information and the moving-object-side specifying information.

2. The information storage device of claim 1, further comprising
- a separation detecting unit that detects if the information storage device is separated from the moving object.

3. The information storage device of claim 1 further comprising
- an information deleting unit that deletes the sensor information stored in the sensor information storage unit when the moving object judging unit determines the equipped moving object is not the appointed moving object.

4. The information storage device of claim 1, wherein when the moving object judging unit determines that the equipped moving object is the appointed moving object, the tamper verifying information generating unit selects either the device-side specifying information or the moving-object-side specifying information, and generates the tamper verifying information based on the selected information and the sensor information.

5. The information storage device of claim 1,
- wherein the equipped moving object comprises a moving-object-side authenticating unit that receives an authenticating request and performs an authentication process based on a prescribed rule, and
- wherein the moving object judging unit sends the authenticating request to the moving-object-side authenticating unit, and determines if the equipped moving object is the appointed moving object or not by performing the authentication process with the moving-object-side authenticating unit based on the prescribed rule.

6. The information storage device of claim 1, further comprising a sensor confirming unit that confirms whether or not the sensor information is valid.

7. The information storage device of claim 1, further comprising:
- a condition judging unit that receives the sensor information, determines whether the received sensor information matches a prescribed condition or not, and stores the received sensor information in the sensor information storage unit if it is determined to meet the predefined condition.

8. The information storage device of claim 1, further comprising:
- an outputting unit that outputs the sensor information stored by the sensor information storage unit, the specifying information obtained by the tamper verifying information generating unit, and the tamper verifying information stored by the tamper verifying information storage unit.

9. The information storage device of claim 8,
- wherein the outputting unit comprises a destination authenticating unit that authenticates whether an output destination is an appointed device.

10. The information storage device of claim 8,
- wherein the outputting unit outputs the sensor information, the specifying information, and the tamper verifying information to a portable storage medium.

11. The information storage device of claim 8,
- wherein the outputting unit outputs the sensor information, the specifying information, and the tamper verifying information at a predetermined interval.

12. The information storage device of claim 8, further comprising:
- a commanding unit that controls the outputting unit based on commands received from an operator.

13. The information storage device of claim 12, further comprising:
- an operator authenticating unit that authenticates the operator based on the received operation,
- wherein the commanding unit commands the outputting unit to output the sensor information, the specifying information, and the tamper verifying information when the operator is authenticated.

14. The information storage device of claim 1, further comprising:
- a sensor confirming unit that confirms whether or not the sensor information is valid; and
- a controlling unit for controlling the information storage unit so that the sensor information is stored only if the sensor confirming unit confirms that the sensor information is valid.

15. An information storage device for storing information related to a moving object in which the device is equipped, the moving object including a moving-object-side specifying information storage unit storing moving-object-side specifying information which specifically identifies the moving object, the information storage device comprising:
- a selecting unit that receives sensor information from a plurality of sensors, the sensor information being related to the moving object, and selects a portion of the received sensor information based on a prescribed condition;
- a selected information group storage unit that stores the selected sensor information;
- a tamper verifying information generating unit that generates tamper verifying information based on obtained specifying information and the selected sensor information stored in the selected information group storage unit, the tamper verifying information for verifying whether or not the specifying information or the selected sensor information has been tampered with;

a tamper verifying information storage unit that stores the generated tamper verifying information; and a moving object judging unit that determines whether the moving object in which the information storage device is currently equipped is an appointed moving object which has previously been appointed for the information storage device to be equipped in, and wherein the moving object judging unit retrieves device-side specifying information which identifies the moving object in which the information storage device is equipped and is stored in a device-side specifying information storage unit and the moving-object-side specifying information stored in the moving-object-side specifying information storage unit, and determines whether or not the equipped moving object is the appointed moving object based on the device-side specifying information and the moving-object-side specifying information.

16. An information storage device for storing information relating to a moving object, the moving object including a moving-object-side specifying information storage unit storing moving-object-side specifying information which specifically identifies the moving object, the device comprising:

a device-side specifying information storage unit that stores device-side specifying information which identifies the moving object in which the information storage device is equipped;

an information receiving unit that receives sensor information from a sensor, said sensor information being related to the moving object;

a sensor information storage unit that stores the received sensor information;

a tamper verifying information generating unit that generates tamper verifying information used for verifying whether or not the sensor information or the device-side specifying information has been tampered with;

a tamper verifying information storage unit that stores the generated tamper verifying information;

a moving object judging unit that determines whether the moving object in which the information storage device is currently equipped is an appointed moving object which has previously been appointed for the information storage device to be equipped in, and wherein the moving object judging unit retrieves the device-side specifying information stored in the device-side specifying information storage unit and the moving-object-side specifying information stored in the moving-object-side specifying information storage unit, and determines whether or not the equipped moving object is the appointed moving object based on the device-side specifying information and the moving-object-side specifying information.

17. The information storage device of claim 16, wherein the sensor information is related to an environment in which the sensor itself is provided, and wherein the device-side specifying information storage unit stores specifying information which specifies either the environment in which the sensor is provided or the environment in which the information storage device is provided.

18. The information storage device of claim 16, further comprising:

an existence detecting unit that determines whether a predetermined object has been removed from an environment in which the sensor is provided, and wherein the tamper verifying information generating unit, based on the stored sensor information and the determination by the existence detecting unit, generates tamper verifying information for verifying whether the sensor information or the detected result has been tampered with.

19. The information storage device of claim 16, further comprising:

an outputting unit that outputs the sensor information stored by the sensor information storage unit, the predetermined information stored by the device-side specifying information storage unit, and the tamper verifying information stored by the tamper verifying information storage unit to another device.

20. The information storage device of claim 19, wherein the outputting unit comprises an outputting destination authenticating unit that authenticates the another device when the sensor information, the predetermined information, and the tamper verifying information are outputted.

21. The information storage device of claim 16, further comprising:

a sensor confirming unit that confirms whether or not the sensor information is valid.

22. The information storage device of claim 16, further comprising:

an external interface unit inputting predetermined information from a-storage equipment storing the predetermined information; and a storage control unit that authenticates the storage equipment by communicating with the storage equipment when the predetermined information is inputted from the storage equipment by the external interface unit, and if it is judged to be authentic, storing the predetermined information in the device-side specifying information storage unit.

23. The information storage device of claim 16, further comprising:

an external interface unit inputting predetermined information from a-storage equipment storing the predetermined information; and a storage control unit that authenticates the predetermined information inputted by the external interface unit, and if it is judged to be authentic, storing the predetermined information in the device-side specifying information storage unit.

24. An information storage device equipped in a moving object and storing information related to the moving object, the moving object including a moving-object-side specifying information storage unit storing moving-object-side specifying information which specifically identifies the moving object, the device comprising:

a device-side specifying information storage unit that stores device-side specifying information which identifies the moving object in which the information storage device is equipped;

a selecting unit that receives sensor information from a plurality of respective sensors, the sensor information being related to the moving object, and selects, as a selected information group, that information from the received sensor information which satisfies a plurality of prescribed conditions;

a selected information group storage unit that stores the selected information group;

a tamper verifying information generating unit that obtains specifying information which specifies the moving object, and generates, based on the obtained specifying information and the selected information group, tamper verifying information for determining whether the specifying information or the sensor information included in the selected information group has been tampered with;

a tamper verifying information storage unit for storing the tamper verifying information generated by the tamper verifying information generating unit;

a moving object judging unit that determines whether the moving object in which the information storage device is currently equipped is an appointed moving object which has previously been appointed for the information storage device to be equipped in, and wherein the moving object judging unit retrieves the device-side specifying information stored in the device-side specifying information storage unit and the moving-object-side specifying information stored in the moving-object-side specifying information storage unit, and determines whether or not the equipped moving object is the appointed moving object based on the device-side specifying information and the moving-object-side specifying information.

25. An information storage device equipped in a moving object and storing information related to the moving object, the moving object including a moving-object-side specifying information storage unit storing moving-object-side specifying information which specifically identifies the moving object, the device comprising:

a device-side specifying information storage unit that stores device-side specifying information which identifies the moving object in which the information storage device is equipped;

a sensor information storage unit that stores respective sensor information received from a plurality of sensors, the sensor information being related to the moving object;

a selecting unit that selects the sensor information received from at least one sensor of the plurality of sensors, based on a plurality of prescribed conditions, and stores the respective sensor information received from the at least one selected sensor as a selected information group;

a tamper verifying information generating unit that obtains specifying information which specifies the moving object, and generates, based on the obtained specifying information and the selected information group, tamper verifying information for determining whether the specifying information or the sensor information included in the selected information group has been tampered with;

a tamper verifying information storage unit for storing the tamper verifying information generated by the tamper verifying information generating unit;

a moving object judging unit that determines whether the moving object in which the information storage device is currently equipped is an appointed moving object which has previously been appointed for the information storage device to be equipped in, and wherein the moving object judging unit retrieves the device-side specifying information stored in the device-side specifying information storage unit and the moving-object-side specifying information stored in the moving-object-side specifying information storage unit, and determines whether or not the equipped moving object is the appointed moving object based on the device-side specifying information and the moving-object-side specifying information.

26. An information storage device equipped in a moving object, the moving object including a moving-object-side specifying information storage unit storing moving-object-side specifying information which specifically identifies the moving object, the device comprising:

a device-side specifying information storage unit that stores device-side specifying information which identifies a moving object in which the information storage device is equipped;

an existence detecting unit that detects whether a predetermined object has been removed from an environment in which the object is placed;

an information inputting unit receiving information from a sensor, the information relating to the environment in which the object is placed;

an environment information storage unit that stores the received environment information;

a tamper verifying information generating unit, that generates, based on the stored environment information and a detected result of the existence detecting unit, tamper verifying information for determining whether the environment information or the detected result has been tampered with;

a tamper verifying information storage unit storing the tamper verifying information generated by the tamper verifying information generating unit; and a moving object judging unit that determines whether the moving object in which the information storage device is currently equipped is an appointed moving object which has previously been appointed for the information storage device to be equipped in, and wherein the moving object judging unit retrieves the device-side specifying information stored in the device-side specifying information storage unit and the moving-object-side specifying information stored in the moving-object-side specifying information storage unit, and determines whether or not the equipped moving object is the appointed moving object based on the device-side specifying information and the moving-object-side specifying information.

* * * * *